(12) United States Patent
Tao et al.

(10) Patent No.: US 8,817,357 B2
(45) Date of Patent: Aug. 26, 2014

(54) MECHANICAL LAYER AND METHODS OF FORMING THE SAME

(75) Inventors: Yi Tao, San Jose, CA (US); Fan Zhong, Fremont, CA (US); Wilhelmus A. de Groot, Palo Alto, CA (US)

(73) Assignee: Qualcomm MEMS Technologies, Inc., San Diego, CA (US)

( * ) Notice: Subject to any disclaimer, the term of this patent is extended or adjusted under 35 U.S.C. 154(b) by 363 days.

(21) Appl. No.: 13/082,955

(22) Filed: Apr. 8, 2011

(65) Prior Publication Data

US 2011/0249315 A1 Oct. 13, 2011

Related U.S. Application Data

(60) Provisional application No. 61/322,776, filed on Apr. 9, 2010.

(51) Int. Cl.
*G02B 26/00* (2006.01)

(52) U.S. Cl.
CPC .................................. *G02B 26/001* (2013.01)
USPC ....................................................... 359/290

(58) Field of Classification Search
CPC ...... G02B 26/001; G02B 26/00; G02B 26/02; G02B 26/08; G02B 26/0833; G02B 26/007; G02B 26/0808; G02B 26/0816; G02B 26/002; G02B 26/0866; G02B 26/0875
USPC .................. 359/290, 291, 578, 528, 529, 522
See application file for complete search history.

(56) References Cited

U.S. PATENT DOCUMENTS

| | | | |
|---|---|---|---|
| 2,534,846 A | 12/1950 | Ambrose et al. | |
| 2,590,906 A | 4/1952 | Tripp | |
| 2,677,714 A | 5/1954 | Auwarter | |
| 3,037,189 A | 5/1962 | Barrett et al. | |
| 3,210,757 A | 10/1965 | Jacob | |
| 3,247,392 A | 4/1966 | Thelen | |

(Continued)

FOREIGN PATENT DOCUMENTS

| DE | 4108966 | 9/1992 |
|---|---|---|
| DE | 10228946 | 1/2004 |

(Continued)

OTHER PUBLICATIONS

Pape et al., Characteristics of the deformable mirror device for optical information processing, Optical Engineering, 22(6):676-681, Nov.-Dec. 1983.

(Continued)

*Primary Examiner* — William Choi
*Assistant Examiner* — Sharrief Broome
(74) *Attorney, Agent, or Firm* — Knobbe Martens Olson & Bear, LLP

(57) ABSTRACT

This disclosure provides mechanical layers and methods of forming the same. In one aspect, an electromechanical systems device includes a substrate and a mechanical layer having an actuated position and a relaxed position. The mechanical layer is spaced from the substrate to define a collapsible gap. The gap is in a collapsed condition when the mechanical layer is in the actuated position and in a non-collapsed condition when the mechanical layer is in the relaxed position. The mechanical layer includes a reflective layer, a conductive layer, and a supporting layer. The supporting layer is positioned between the reflective layer and the conductive layer and is configured to support the mechanical layer.

35 Claims, 24 Drawing Sheets

(56) References Cited

U.S. PATENT DOCUMENTS

| | | |
|---|---|---|
| 3,296,530 A | 1/1967 | William |
| 3,439,973 A | 4/1969 | Paul et al. |
| 3,443,854 A | 5/1969 | Weiss |
| 3,653,741 A | 4/1972 | Marks |
| 3,656,836 A | 4/1972 | de Cremoux et al. |
| 3,679,313 A | 7/1972 | Rosenberg |
| 3,701,586 A | 10/1972 | Goetz |
| 3,728,030 A | 4/1973 | Hawes |
| 3,813,265 A | 5/1974 | Marks |
| 3,886,310 A | 5/1975 | Guldberg |
| 3,955,190 A | 5/1976 | Teraishi |
| 3,955,880 A | 5/1976 | Lierke |
| 4,099,854 A | 7/1978 | Decker et al. |
| 4,196,396 A | 4/1980 | Smith |
| 4,228,437 A | 10/1980 | Shelton |
| 4,377,324 A | 3/1983 | Durand et al. |
| 4,389,096 A | 6/1983 | Hori et al. |
| 4,392,711 A | 7/1983 | Moraw et al. |
| 4,403,248 A | 9/1983 | te Velde |
| 4,421,381 A | 12/1983 | Ueda et al. |
| 4,425,572 A | 1/1984 | Takafuji et al. |
| 4,441,789 A | 4/1984 | Pohlack |
| 4,441,791 A | 4/1984 | Hornbeck |
| 4,445,050 A | 4/1984 | Marks |
| 4,459,182 A | 7/1984 | te Velde |
| 4,482,213 A | 11/1984 | Piliavin et al. |
| 4,497,974 A | 2/1985 | Deckman et al. |
| 4,498,953 A | 2/1985 | Cook et al. |
| 4,500,171 A | 2/1985 | Penz et al. |
| 4,518,959 A | 5/1985 | Ueda et al. |
| 4,519,676 A | 5/1985 | te Velde |
| 4,531,126 A | 7/1985 | Sadones |
| 4,560,435 A | 12/1985 | Brown et al. |
| 4,566,935 A | 1/1986 | Hornbeck |
| 4,571,603 A | 2/1986 | Hornbeck et al. |
| 4,596,992 A | 6/1986 | Hornbeck |
| 4,615,595 A | 10/1986 | Hornbeck |
| 4,626,840 A | 12/1986 | Glasper et al. |
| 4,655,554 A | 4/1987 | Armitage |
| 4,662,746 A | 5/1987 | Hornbeck |
| 4,663,083 A | 5/1987 | Marks |
| 4,663,181 A | 5/1987 | Murali |
| 4,666,254 A | 5/1987 | Itoh et al. |
| 4,672,254 A | 6/1987 | Dolat et al. |
| 4,681,403 A | 7/1987 | te Velde et al. |
| 4,705,361 A | 11/1987 | Frazier et al. |
| 4,710,732 A | 12/1987 | Hornbeck |
| 4,748,366 A | 5/1988 | Taylor |
| 4,779,959 A | 10/1988 | Saunders |
| 4,786,128 A | 11/1988 | Birnbach |
| 4,790,635 A | 12/1988 | Apsley |
| 4,822,993 A | 4/1989 | Dillon et al. |
| 4,856,863 A | 8/1989 | Sampsell et al. |
| 4,857,978 A | 8/1989 | Goldburt et al. |
| 4,859,060 A | 8/1989 | Katagiri et al. |
| 4,864,290 A | 9/1989 | Waters |
| 4,880,493 A | 11/1989 | Ashby et al. |
| 4,895,500 A | 1/1990 | Hok et al. |
| 4,896,033 A | 1/1990 | Gautier |
| 4,900,136 A | 2/1990 | Goldburt et al. |
| 4,900,395 A | 2/1990 | Syverson et al. |
| 4,925,259 A | 5/1990 | Emmett |
| 4,937,496 A | 6/1990 | Neiger et al. |
| 4,954,789 A | 9/1990 | Sampsell |
| 4,956,619 A | 9/1990 | Hornbeck |
| 4,965,562 A | 10/1990 | Verhulst |
| 4,973,131 A | 11/1990 | Carnes |
| 4,980,775 A | 12/1990 | Brody |
| 4,982,184 A | 1/1991 | Kirkwood |
| 5,014,259 A | 5/1991 | Goldberg et al. |
| 5,018,256 A | 5/1991 | Hornbeck |
| 5,022,745 A | 6/1991 | Zahowski et al. |
| 5,028,939 A | 7/1991 | Hornbeck et al. |
| 5,037,173 A | 8/1991 | Sampsell et al. |
| 5,044,736 A | 9/1991 | Jaskie et al. |
| 5,061,049 A | 10/1991 | Hornbeck |
| 5,062,689 A | 11/1991 | Koehler |
| 5,075,796 A | 12/1991 | Schildkraut et al. |
| 5,078,479 A | 1/1992 | Vuilleumier |
| 5,079,544 A | 1/1992 | DeMond et al. |
| 5,083,857 A | 1/1992 | Hornbeck |
| 5,091,983 A | 2/1992 | Lukosz |
| 5,096,279 A | 3/1992 | Hornbeck et al. |
| 5,099,353 A | 3/1992 | Hornbeck |
| 5,124,834 A | 6/1992 | Cusano et al. |
| 5,136,669 A | 8/1992 | Gerdt |
| 5,142,405 A | 8/1992 | Hornbeck |
| 5,142,414 A | 8/1992 | Koehler |
| 5,153,771 A | 10/1992 | Link et al. |
| 5,162,787 A | 11/1992 | Thompson et al. |
| 5,168,406 A | 12/1992 | Nelson |
| 5,170,156 A | 12/1992 | DeMond et al. |
| 5,170,283 A | 12/1992 | O'Brien et al. |
| 5,172,262 A | 12/1992 | Hornbeck |
| 5,179,274 A | 1/1993 | Sampsell |
| 5,192,395 A | 3/1993 | Boysel et al. |
| 5,192,946 A | 3/1993 | Thompson et al. |
| 5,206,629 A | 4/1993 | DeMond et al. |
| 5,206,632 A | 4/1993 | Dupont et al. |
| 5,212,582 A | 5/1993 | Nelson |
| 5,214,419 A | 5/1993 | DeMond et al. |
| 5,214,420 A | 5/1993 | Thompson et al. |
| 5,216,537 A | 6/1993 | Hornbeck |
| 5,226,099 A | 7/1993 | Mignardi et al. |
| 5,228,013 A | 7/1993 | Bik |
| 5,231,532 A | 7/1993 | Magel et al. |
| 5,233,385 A | 8/1993 | Sampsell |
| 5,233,456 A | 8/1993 | Nelson |
| 5,233,459 A | 8/1993 | Bozler et al. |
| 5,254,980 A | 10/1993 | Hendrix et al. |
| 5,272,473 A | 12/1993 | Thompson et al. |
| 5,278,652 A | 1/1994 | Urbanus et al. |
| 5,280,277 A | 1/1994 | Hornbeck |
| 5,285,196 A | 2/1994 | Gale |
| 5,287,096 A | 2/1994 | Thompson et al. |
| 5,293,272 A | 3/1994 | Jannson et al. |
| 5,296,950 A | 3/1994 | Lin et al. |
| 5,305,640 A | 4/1994 | Boysel et al. |
| 5,311,360 A | 5/1994 | Bloom et al. |
| 5,312,513 A | 5/1994 | Florence et al. |
| 5,315,370 A | 5/1994 | Bulow |
| 5,323,002 A | 6/1994 | Sampsell et al. |
| 5,324,683 A | 6/1994 | Fitch et al. |
| 5,325,116 A | 6/1994 | Sampsell |
| 5,326,430 A | 7/1994 | Cronin et al. |
| 5,327,286 A | 7/1994 | Sampsell et al. |
| 5,331,454 A | 7/1994 | Hornbeck |
| 5,339,116 A | 8/1994 | Urbanus et al. |
| 5,345,328 A | 9/1994 | Fritz et al. |
| 5,355,357 A | 10/1994 | Yamamori et al. |
| 5,358,601 A | 10/1994 | Cathey |
| 5,365,283 A | 11/1994 | Doherty et al. |
| 5,367,878 A | 11/1994 | Muntz et al. |
| 5,374,346 A | 12/1994 | Bladon et al. |
| 5,381,232 A | 1/1995 | Van Wijk |
| 5,381,253 A | 1/1995 | Sharp et al. |
| 5,401,983 A | 3/1995 | Jokerst et al. |
| 5,411,769 A | 5/1995 | Hornbeck |
| 5,444,566 A | 8/1995 | Gale et al. |
| 5,446,479 A | 8/1995 | Thompson et al. |
| 5,448,314 A | 9/1995 | Heimbuch et al. |
| 5,452,024 A | 9/1995 | Sampsell |
| 5,452,138 A | 9/1995 | Mignardi et al. |
| 5,454,904 A | 10/1995 | Ghezzo et al. |
| 5,454,906 A | 10/1995 | Baker et al. |
| 5,457,493 A | 10/1995 | Leddy et al. |
| 5,457,566 A | 10/1995 | Sampsell et al. |
| 5,459,602 A | 10/1995 | Sampsell |
| 5,459,610 A | 10/1995 | Bloom et al. |
| 5,461,411 A | 10/1995 | Florence et al. |
| 5,471,341 A | 11/1995 | Warde et al. |
| 5,474,865 A | 12/1995 | Vasudev |
| 5,485,304 A | 1/1996 | Kaeriyama |
| 5,489,952 A | 2/1996 | Gove et al. |

(56) References Cited

U.S. PATENT DOCUMENTS

| | | |
|---|---|---|
| 5,497,172 A | 3/1996 | Doherty et al. |
| 5,497,197 A | 3/1996 | Gove et al. |
| 5,497,262 A | 3/1996 | Kaeriyama |
| 5,499,037 A | 3/1996 | Nakagawa et al. |
| 5,499,062 A | 3/1996 | Urbanus |
| 5,500,635 A | 3/1996 | Mott |
| 5,500,761 A | 3/1996 | Goossen et al. |
| 5,506,597 A | 4/1996 | Thompson et al. |
| 5,515,076 A | 5/1996 | Thompson et al. |
| 5,517,347 A | 5/1996 | Sampsell |
| 5,523,803 A | 6/1996 | Urbanus et al. |
| 5,526,051 A | 6/1996 | Gove et al. |
| 5,526,172 A | 6/1996 | Kanack |
| 5,526,327 A | 6/1996 | Cordova, Jr. |
| 5,526,688 A | 6/1996 | Boysel et al. |
| 5,526,951 A | 6/1996 | Bailey et al. |
| 5,528,707 A | 6/1996 | Sullivan et al. |
| 5,535,047 A | 7/1996 | Hornbeck |
| 5,544,268 A | 8/1996 | Bischel et al. |
| 5,548,301 A | 8/1996 | Kornher et al. |
| 5,550,373 A | 8/1996 | Cole et al. |
| 5,551,293 A | 9/1996 | Boysel et al. |
| 5,552,924 A | 9/1996 | Tregilgas |
| 5,552,925 A | 9/1996 | Worley |
| 5,559,358 A | 9/1996 | Burns et al. |
| 5,561,523 A | 10/1996 | Blomberg et al. |
| 5,563,398 A | 10/1996 | Sampsell |
| 5,567,334 A | 10/1996 | Baker et al. |
| 5,570,135 A | 10/1996 | Gove et al. |
| 5,579,149 A | 11/1996 | Moret et al. |
| 5,581,272 A | 12/1996 | Conner et al. |
| 5,583,688 A | 12/1996 | Hornbeck |
| 5,589,852 A | 12/1996 | Thompson et al. |
| 5,597,736 A | 1/1997 | Sampsell |
| 5,600,383 A | 2/1997 | Hornbeck |
| 5,602,671 A | 2/1997 | Hornbeck |
| 5,606,441 A | 2/1997 | Florence et al. |
| 5,608,468 A | 3/1997 | Gove et al. |
| 5,610,438 A | 3/1997 | Wallace et al. |
| 5,610,624 A | 3/1997 | Bhuva |
| 5,610,625 A | 3/1997 | Sampsell |
| 5,614,937 A | 3/1997 | Nelson |
| 5,619,059 A | 4/1997 | Li et al. |
| 5,619,061 A | 4/1997 | Goldsmith et al. |
| 5,619,365 A | 4/1997 | Rhoades et al. |
| 5,619,366 A | 4/1997 | Rhoads et al. |
| 5,629,790 A | 5/1997 | Neukermans et al. |
| 5,633,652 A | 5/1997 | Kanbe et al. |
| 5,636,052 A | 6/1997 | Arney et al. |
| 5,636,185 A | 6/1997 | Brewer et al. |
| 5,638,084 A | 6/1997 | Kalt |
| 5,638,946 A | 6/1997 | Zavracky |
| 5,641,391 A | 6/1997 | Hunter et al. |
| 5,646,729 A | 7/1997 | Koskinen et al. |
| 5,646,768 A | 7/1997 | Kaeiyama |
| 5,650,881 A | 7/1997 | Hornbeck |
| 5,654,741 A | 8/1997 | Sampsell et al. |
| 5,657,099 A | 8/1997 | Doherty et al. |
| 5,659,374 A | 8/1997 | Gale, Jr. et al. |
| 5,661,591 A | 8/1997 | Lin et al. |
| 5,661,592 A | 8/1997 | Bornstein et al. |
| 5,665,997 A | 9/1997 | Weaver et al. |
| 5,673,139 A | 9/1997 | Johnson |
| 5,673,785 A | 10/1997 | Schlaak et al. |
| 5,677,783 A | 10/1997 | Bloom et al. |
| 5,683,591 A | 11/1997 | Offenberg |
| 5,686,979 A | 11/1997 | Weber et al. |
| 5,699,074 A | 12/1997 | Sutherland et al. |
| 5,699,181 A | 12/1997 | Choi |
| 5,703,710 A | 12/1997 | Brinkman et al. |
| 5,710,656 A | 1/1998 | Goossen |
| 5,719,068 A | 2/1998 | Suzawa et al. |
| 5,726,480 A | 3/1998 | Pister |
| 5,734,177 A | 3/1998 | Sakamoto |
| 5,739,945 A | 4/1998 | Tayebati |
| 5,740,150 A | 4/1998 | Uchimaru et al. |
| 5,745,193 A | 4/1998 | Urbanus et al. |
| 5,745,281 A | 4/1998 | Yi et al. |
| 5,751,469 A | 5/1998 | Arney et al. |
| 5,771,116 A | 6/1998 | Miller et al. |
| 5,771,321 A | 6/1998 | Stern |
| 5,784,190 A | 7/1998 | Worley |
| 5,784,212 A | 7/1998 | Hornbeck |
| 5,786,927 A | 7/1998 | Greywall et al. |
| 5,793,504 A | 8/1998 | Stoll |
| 5,795,208 A | 8/1998 | Hattori |
| 5,808,780 A | 9/1998 | McDonald |
| 5,808,781 A | 9/1998 | Arney et al. |
| 5,815,141 A | 9/1998 | Phares |
| 5,818,095 A | 10/1998 | Sampsell |
| 5,825,528 A | 10/1998 | Goossen |
| 5,835,255 A * | 11/1998 | Miles ........................... 359/291 |
| 5,838,484 A | 11/1998 | Goossen et al. |
| 5,842,088 A | 11/1998 | Thompson |
| 5,867,302 A | 2/1999 | Fleming |
| 5,870,221 A | 2/1999 | Goossen |
| 5,880,921 A | 3/1999 | Tham et al. |
| 5,881,449 A | 3/1999 | Ghosh et al. |
| 5,905,482 A | 5/1999 | Hughes et al. |
| 5,912,758 A | 6/1999 | Knipe et al. |
| 5,914,804 A | 6/1999 | Goossen |
| 5,920,418 A | 7/1999 | Shiono et al. |
| 5,933,183 A | 8/1999 | Enomoto et al. |
| 5,943,158 A | 8/1999 | Ford et al. |
| 5,949,571 A | 9/1999 | Goossen et al. |
| 5,959,763 A | 9/1999 | Bozler et al. |
| 5,961,848 A | 10/1999 | Jacquet et al. |
| 5,963,788 A | 10/1999 | Barron et al. |
| 5,986,796 A | 11/1999 | Miles |
| 5,994,174 A | 11/1999 | Carey et al. |
| 6,002,661 A | 12/1999 | Abe et al. |
| 6,028,689 A | 2/2000 | Michalicek et al. |
| 6,028,690 A | 2/2000 | Carter et al. |
| 6,031,653 A | 2/2000 | Wang |
| 6,038,056 A | 3/2000 | Florence et al. |
| 6,040,937 A | 3/2000 | Miles |
| 6,046,659 A | 4/2000 | Loo et al. |
| 6,046,840 A | 4/2000 | Huibers |
| 6,049,317 A | 4/2000 | Thompson et al. |
| 6,055,090 A | 4/2000 | Miles |
| 6,056,406 A | 5/2000 | Park et al. |
| 6,061,075 A | 5/2000 | Nelson et al. |
| 6,065,424 A | 5/2000 | Shacham-Diamand et al. |
| 6,097,145 A | 8/2000 | Kastalsky et al. |
| 6,099,132 A | 8/2000 | Kaeriyama |
| 6,100,477 A | 8/2000 | Randall et al. |
| 6,100,861 A | 8/2000 | Cohen et al. |
| 6,100,872 A | 8/2000 | Aratani et al. |
| 6,113,239 A | 9/2000 | Sampsell et al. |
| 6,115,014 A | 9/2000 | Aoki et al. |
| 6,124,851 A | 9/2000 | Jacobson |
| 6,142,358 A | 11/2000 | Cohn et al. |
| 6,147,680 A | 11/2000 | Tareev |
| 6,147,790 A | 11/2000 | Meier et al. |
| 6,154,586 A | 11/2000 | MacDonald et al. |
| 6,158,156 A | 12/2000 | Patrick |
| 6,160,833 A | 12/2000 | Floyd et al. |
| 6,171,945 B1 | 1/2001 | Mandal et al. |
| 6,172,797 B1 | 1/2001 | Huibers |
| 6,180,428 B1 | 1/2001 | Peeters et al. |
| 6,195,196 B1 | 2/2001 | Kimura et al. |
| 6,201,633 B1 | 3/2001 | Peeters et al. |
| 6,215,221 B1 | 4/2001 | Cabuz et al. |
| 6,219,015 B1 | 4/2001 | Bloom et al. |
| 6,232,936 B1 | 5/2001 | Gove et al. |
| 6,239,777 B1 | 5/2001 | Sugahara et al. |
| 6,242,932 B1 | 6/2001 | Hembree |
| 6,243,149 B1 | 6/2001 | Swanson et al. |
| 6,262,697 B1 | 7/2001 | Stephenson |
| 6,282,010 B1 | 8/2001 | Sulzbach et al. |
| 6,285,424 B1 | 9/2001 | Yoshida |
| 6,288,472 B1 | 9/2001 | Cabuz et al. |
| 6,288,824 B1 | 9/2001 | Kastalsky |
| 6,295,154 B1 | 9/2001 | Laor et al. |

(56) References Cited

U.S. PATENT DOCUMENTS

| | | |
|---|---|---|
| 6,297,811 B1 | 10/2001 | Kent et al. |
| 6,301,000 B1 | 10/2001 | Johnson |
| 6,316,289 B1 | 11/2001 | Chung |
| 6,323,923 B1 | 11/2001 | Hoshino et al. |
| 6,323,982 B1 | 11/2001 | Hornbeck |
| 6,323,987 B1 | 11/2001 | Rinaudo et al. |
| 6,327,071 B1 | 12/2001 | Kimura |
| 6,331,909 B1 | 12/2001 | Dunfield |
| 6,335,235 B1 | 1/2002 | Bhekta et al. |
| 6,335,831 B2 | 1/2002 | Kowarz et al. |
| 6,339,417 B1 | 1/2002 | Quanrud |
| 6,351,329 B1 | 2/2002 | Greywall |
| 6,353,489 B1 | 3/2002 | Popovich et al. |
| 6,356,254 B1 | 3/2002 | Kimura |
| 6,356,378 B1 | 3/2002 | Huibers |
| 6,358,021 B1 | 3/2002 | Cabuz |
| 6,376,787 B1 | 4/2002 | Martin et al. |
| 6,377,233 B2 | 4/2002 | Colgan et al. |
| 6,381,022 B1 | 4/2002 | Zavracky |
| 6,384,952 B1 | 5/2002 | Clark et al. |
| 6,400,738 B1 | 6/2002 | Tucker et al. |
| 6,407,851 B1 | 6/2002 | Islam et al. |
| 6,417,868 B1 | 7/2002 | Bock |
| 6,433,917 B1 | 8/2002 | Mei et al. |
| 6,437,583 B1 | 8/2002 | Tartagni et al. |
| 6,438,282 B1 | 8/2002 | Takeda et al. |
| 6,447,126 B1 | 9/2002 | Hornbeck |
| 6,449,084 B1 | 9/2002 | Guo |
| 6,452,712 B2 | 9/2002 | Atobe et al. |
| 6,456,420 B1 | 9/2002 | Goodwin-Johansson |
| 6,465,355 B1 | 10/2002 | Horsley |
| 6,466,190 B1 | 10/2002 | Evoy |
| 6,466,354 B1 | 10/2002 | Gudeman |
| 6,466,358 B2 | 10/2002 | Tew |
| 6,473,072 B1 | 10/2002 | Comiskey et al. |
| 6,473,274 B1 | 10/2002 | Maimone et al. |
| 6,480,177 B2 | 11/2002 | Doherty et al. |
| 6,496,122 B2 | 12/2002 | Sampsell |
| 6,519,073 B1 | 2/2003 | Goossen |
| 6,535,663 B1 | 3/2003 | Chertkow |
| 6,545,335 B1 | 4/2003 | Chua et al. |
| 6,548,908 B2 | 4/2003 | Chua et al. |
| 6,549,338 B1 | 4/2003 | Wolverton et al. |
| 6,552,840 B2 | 4/2003 | Knipe |
| 6,556,338 B2 | 4/2003 | Han et al. |
| 6,574,033 B1 | 6/2003 | Chui et al. |
| 6,589,625 B1 | 7/2003 | Kothari et al. |
| 6,597,490 B2 | 7/2003 | Tayebati |
| 6,600,201 B2 | 7/2003 | Hartwell et al. |
| 6,606,175 B1 | 8/2003 | Sampsell et al. |
| 6,608,268 B1 | 8/2003 | Goldsmith |
| 6,624,944 B1 | 9/2003 | Wallace et al. |
| 6,625,047 B2 | 9/2003 | Coleman, Jr. |
| 6,630,786 B2 | 10/2003 | Cummings et al. |
| 6,632,698 B2 | 10/2003 | Ives |
| 6,635,919 B1 | 10/2003 | Melendez et al. |
| 6,643,069 B2 | 11/2003 | Dewald |
| 6,650,455 B2 | 11/2003 | Miles |
| 6,657,832 B2 | 12/2003 | Williams et al. |
| 6,660,656 B2 | 12/2003 | Cheung et al. |
| 6,661,561 B2 | 12/2003 | Fitzpatrick et al. |
| 6,666,561 B1 | 12/2003 | Blakley |
| 6,674,090 B1 | 1/2004 | Chua et al. |
| 6,674,562 B1 | 1/2004 | Miles et al. |
| 6,680,792 B2 | 1/2004 | Miles |
| 6,698,295 B1 | 3/2004 | Sherrer |
| 6,707,594 B2 | 3/2004 | Holmes |
| 6,710,908 B2 | 3/2004 | Miles et al. |
| 6,738,194 B1 | 5/2004 | Ramirez et al. |
| 6,741,377 B2 | 5/2004 | Miles |
| 6,741,383 B2 | 5/2004 | Huibers et al. |
| 6,741,384 B1 | 5/2004 | Martin et al. |
| 6,741,503 B1 | 5/2004 | Farris et al. |
| 6,747,785 B2 | 6/2004 | Chen et al. |
| 6,747,800 B1 | 6/2004 | Lin |
| 6,768,555 B2 | 7/2004 | Chen et al. |
| 6,775,174 B2 | 8/2004 | Huffman et al. |
| 6,778,155 B2 | 8/2004 | Doherty et al. |
| 6,787,438 B1 | 9/2004 | Nelson |
| 6,791,735 B2 | 9/2004 | Stappaerts |
| 6,794,119 B2 | 9/2004 | Miles |
| 6,806,557 B2 | 10/2004 | Ding |
| 6,807,892 B2 | 10/2004 | Biegelsen et al. |
| 6,809,788 B2 | 10/2004 | Yamada et al. |
| 6,811,267 B1 | 11/2004 | Allen et al. |
| 6,813,059 B2 | 11/2004 | Hunter et al. |
| 6,813,060 B1 | 11/2004 | Garcia et al. |
| 6,819,469 B1 | 11/2004 | Koba |
| 6,822,304 B1 | 11/2004 | Honer |
| 6,822,628 B2 | 11/2004 | Dunphy et al. |
| 6,822,780 B1 | 11/2004 | Long |
| 6,829,132 B2 | 12/2004 | Martin et al. |
| 6,836,366 B1 | 12/2004 | Flanders et al. |
| 6,841,081 B2 | 1/2005 | Chang et al. |
| 6,844,959 B2 | 1/2005 | Huibers et al. |
| 6,849,471 B2 | 2/2005 | Patel et al. |
| 6,853,129 B1 | 2/2005 | Cummings et al. |
| 6,855,610 B2 | 2/2005 | Tung et al. |
| 6,859,218 B1 | 2/2005 | Luman et al. |
| 6,861,277 B1 | 3/2005 | Monroe et al. |
| 6,862,022 B2 | 3/2005 | Slupe |
| 6,862,029 B1 | 3/2005 | D'Souza et al. |
| 6,862,127 B1 | 3/2005 | Ishii |
| 6,864,882 B2 | 3/2005 | Newton |
| 6,867,896 B2 | 3/2005 | Miles |
| 6,870,581 B2 | 3/2005 | Li et al. |
| 6,870,654 B2 | 3/2005 | Lin et al. |
| 6,876,047 B2 | 4/2005 | Cunningham et al. |
| 6,876,482 B2 | 4/2005 | DeReus |
| 6,881,535 B2 | 4/2005 | Yamaguchi |
| 6,882,458 B2 | 4/2005 | Lin et al. |
| 6,882,461 B1 | 4/2005 | Tsai et al. |
| 6,891,658 B2 | 5/2005 | Whitehead et al. |
| 6,912,022 B2 | 6/2005 | Lin et al. |
| 6,913,942 B2 | 7/2005 | Patel et al. |
| 6,940,630 B2 | 9/2005 | Xie |
| 6,947,200 B2 | 9/2005 | Huibers |
| 6,952,303 B2 | 10/2005 | Lin et al. |
| 6,958,847 B2 | 10/2005 | Lin |
| 6,959,990 B2 | 11/2005 | Penn |
| 6,960,305 B2 | 11/2005 | Doan et al. |
| 6,980,350 B2 | 12/2005 | Hung et al. |
| 6,982,820 B2 | 1/2006 | Tsai |
| 6,995,890 B2 | 2/2006 | Lin |
| 6,999,225 B2 | 2/2006 | Lin et al. |
| 7,002,441 B2 | 2/2006 | Pillans et al. |
| 7,002,726 B2 | 2/2006 | Patel et al. |
| 7,006,272 B2 | 2/2006 | Tsai |
| 7,008,812 B1 | 3/2006 | Carley |
| 7,009,754 B2 | 3/2006 | Huibers |
| 7,015,624 B1 | 3/2006 | Su et al. |
| 7,027,204 B2 | 4/2006 | Trisnadi et al. |
| 7,034,981 B2 | 4/2006 | Makigaki |
| 7,046,422 B2 | 5/2006 | Kimura et al. |
| 7,053,737 B2 | 5/2006 | Schwartz et al. |
| 7,072,093 B2 | 7/2006 | Piehl et al. |
| 7,075,700 B2 | 7/2006 | Muenter |
| 7,113,339 B2 | 9/2006 | Taguchi et al. |
| 7,119,945 B2 | 10/2006 | Kothari et al. |
| 7,123,216 B1 | 10/2006 | Miles |
| 7,126,738 B2 | 10/2006 | Miles |
| 7,126,741 B2 | 10/2006 | Wagner et al. |
| 7,130,104 B2 | 10/2006 | Cummings |
| 7,161,728 B2 | 1/2007 | Sampsell et al. |
| 7,184,195 B2 | 2/2007 | Yang |
| 7,184,202 B2 | 2/2007 | Miles et al. |
| 7,198,973 B2 | 4/2007 | Lin et al. |
| 7,205,722 B2 | 4/2007 | Koshio et al. |
| 7,221,495 B2 | 5/2007 | Miles et al. |
| 7,235,914 B2 | 6/2007 | Richards et al. |
| 7,236,284 B2 | 6/2007 | Miles |
| 7,245,285 B2 | 7/2007 | Yeh et al. |
| 7,250,930 B2 | 7/2007 | Hoffman et al. |
| 7,289,259 B2 | 10/2007 | Chui et al. |

(56) References Cited

U.S. PATENT DOCUMENTS

| | | |
|---|---|---|
| 7,301,704 B2 | 11/2007 | Miles |
| 7,302,157 B2 | 11/2007 | Chui |
| 7,304,784 B2 | 12/2007 | Chui et al. |
| 7,321,456 B2 | 1/2008 | Cummings |
| 7,321,457 B2 | 1/2008 | Heald |
| 7,327,510 B2 | 2/2008 | Cummings et al. |
| 7,329,917 B2 | 2/2008 | Patraw et al. |
| 7,372,613 B2 | 5/2008 | Chui et al. |
| 7,372,619 B2 | 5/2008 | Miles |
| 7,373,026 B2 | 5/2008 | Chui |
| 7,375,465 B2 | 5/2008 | Chen |
| 7,385,744 B2 | 6/2008 | Kogut et al. |
| 7,385,762 B2 | 6/2008 | Cummings |
| 7,400,488 B2 | 7/2008 | Lynch et al. |
| 7,405,852 B2 | 7/2008 | Brosnihan et al. |
| 7,405,863 B2 | 7/2008 | Tung et al. |
| 7,417,746 B2 | 8/2008 | Lin et al. |
| 7,420,725 B2 | 9/2008 | Kothari |
| 7,436,573 B2 | 10/2008 | Doan et al. |
| 7,439,943 B2 | 10/2008 | Nakanishi |
| 7,459,402 B2 | 12/2008 | Doan et al. |
| 7,460,291 B2 | 12/2008 | Sampsell et al. |
| 7,460,292 B2 | 12/2008 | Chou |
| 7,471,442 B2 | 12/2008 | Sampsell |
| 7,476,327 B2 | 1/2009 | Tung et al. |
| 7,477,440 B1 | 1/2009 | Huang et al. |
| 7,479,785 B2 | 1/2009 | Liu et al. |
| 7,492,503 B2 | 2/2009 | Chui |
| 7,508,566 B2 | 3/2009 | Feenstra et al. |
| 7,513,327 B1 | 4/2009 | Peterson |
| 7,527,995 B2 | 5/2009 | Sampsell |
| 7,527,998 B2 | 5/2009 | Tung et al. |
| 7,532,377 B2 | 5/2009 | Miles |
| 7,532,381 B2 | 5/2009 | Miles et al. |
| 7,535,621 B2 | 5/2009 | Chiang |
| 7,542,198 B2 | 6/2009 | Kothari |
| 7,545,552 B2 | 6/2009 | U'Ren |
| 7,550,794 B2 | 6/2009 | Miles et al. |
| 7,550,810 B2 | 6/2009 | Mignard et al. |
| 7,554,711 B2 | 6/2009 | Miles |
| 7,554,714 B2 | 6/2009 | Chui et al. |
| 7,561,321 B2 | 7/2009 | Heald |
| 7,564,612 B2 | 7/2009 | Chui |
| 7,564,613 B2 | 7/2009 | Sasagawa et al. |
| 7,566,664 B2 | 7/2009 | Yan et al. |
| 7,566,940 B2 | 7/2009 | Sasagawa et al. |
| 7,567,373 B2 | 7/2009 | Chui et al. |
| 7,569,488 B2 | 8/2009 | Rafanan |
| 7,583,350 B2 | 9/2009 | Chang et al. |
| 7,612,932 B2 | 11/2009 | Chui et al. |
| 7,612,933 B2 | 11/2009 | Djordjev |
| 7,623,287 B2 | 11/2009 | Sasagawa et al. |
| 7,629,197 B2 | 12/2009 | Luo et al. |
| 7,630,119 B2 | 12/2009 | Tung et al. |
| 7,630,121 B2 | 12/2009 | Endisch et al. |
| 7,643,199 B2 | 1/2010 | Lan |
| 7,643,202 B2 | 1/2010 | Sasagawa |
| 7,649,671 B2 | 1/2010 | Kothari et al. |
| 7,656,391 B2 | 2/2010 | Kimura et al. |
| 7,660,058 B2 | 2/2010 | Qiu et al. |
| 7,663,794 B2 | 2/2010 | Cummings |
| 7,672,035 B2 | 3/2010 | Sampsell et al. |
| 7,684,104 B2 | 3/2010 | Chui et al. |
| 7,684,106 B2 | 3/2010 | Sampsell |
| 7,692,844 B2 | 4/2010 | Miles |
| 7,704,772 B2 | 4/2010 | Tung et al. |
| 7,715,079 B2 | 5/2010 | Kogut et al. |
| 7,715,085 B2 | 5/2010 | Sasagawa |
| 7,719,500 B2 | 5/2010 | Chui |
| 7,719,747 B2 | 5/2010 | Tung et al. |
| 7,738,157 B2 | 6/2010 | Miles |
| 7,742,220 B2 | 6/2010 | Kogut et al. |
| 7,746,539 B2 | 6/2010 | Sampsell |
| 7,747,109 B2 | 6/2010 | Zhong et al. |
| 7,768,690 B2 | 8/2010 | Sampsell |
| 7,773,286 B2 | 8/2010 | Mignard |
| 7,782,517 B2 | 8/2010 | Griffiths et al. |
| 7,782,523 B2 | 8/2010 | Ishii |
| 7,787,173 B2 | 8/2010 | Chui |
| 7,795,061 B2 | 9/2010 | Wang et al. |
| 7,808,694 B2 | 10/2010 | Miles |
| 7,808,695 B2 | 10/2010 | Sampsell |
| 7,813,029 B2 | 10/2010 | Kothari et al. |
| 7,826,120 B2 | 11/2010 | Miles |
| 7,830,586 B2 | 11/2010 | Miles |
| 7,830,587 B2 | 11/2010 | Miles |
| 7,830,588 B2 | 11/2010 | Miles |
| 7,835,061 B2 | 11/2010 | Kogut et al. |
| 7,839,557 B2 | 11/2010 | Chui et al. |
| 7,847,999 B2 | 12/2010 | Lee et al. |
| 7,848,003 B2 | 12/2010 | Kothari et al. |
| 7,852,544 B2 | 12/2010 | Sampsell |
| 7,852,545 B2 | 12/2010 | Miles |
| 7,855,826 B2 | 12/2010 | de Groot |
| 7,859,740 B2 | 12/2010 | Tung |
| 7,872,792 B2 | 1/2011 | Miles |
| RE42,119 E | 2/2011 | Chui et al. |
| 7,884,989 B2 | 2/2011 | Gally et al. |
| 7,889,415 B2 | 2/2011 | Kothari |
| 7,889,417 B2 | 2/2011 | Sasagawa |
| 7,893,919 B2 | 2/2011 | Kothari et al. |
| 7,898,722 B2 | 3/2011 | Miles |
| 7,898,723 B2 | 3/2011 | Khazeni et al. |
| 7,898,725 B2 | 3/2011 | Sampsell |
| 7,916,980 B2 | 3/2011 | Lasiter |
| 7,924,494 B2 | 4/2011 | Tung et al. |
| 7,936,497 B2 | 5/2011 | Chui et al. |
| 7,944,599 B2 | 5/2011 | Chui et al. |
| 7,944,604 B2 | 5/2011 | Ganti et al. |
| 7,948,671 B2 | 5/2011 | Tung et al. |
| 7,952,787 B2 | 5/2011 | Tung et al. |
| 8,098,417 B2 | 1/2012 | Sasagawa |
| 8,174,752 B2 | 5/2012 | Ganti et al. |
| 2001/0001080 A1 | 5/2001 | Eldridge et al. |
| 2001/0003487 A1 | 6/2001 | Miles |
| 2001/0028503 A1 | 10/2001 | Flanders et al. |
| 2001/0043171 A1 | 11/2001 | Van Gorkom et al. |
| 2001/0055208 A1 | 12/2001 | Kimura |
| 2002/0014579 A1 | 2/2002 | Dunfield |
| 2002/0021485 A1 | 2/2002 | Pilossof |
| 2002/0027636 A1 | 3/2002 | Yamada |
| 2002/0051281 A1 | 5/2002 | Ueda et al. |
| 2002/0054424 A1 | 5/2002 | Miles |
| 2002/0070931 A1 | 6/2002 | Ishikawa |
| 2002/0075555 A1 | 6/2002 | Miles |
| 2002/0114558 A1 | 8/2002 | Nemirovsky |
| 2002/0126364 A1 | 9/2002 | Miles |
| 2002/0139981 A1 | 10/2002 | Young |
| 2002/0146200 A1 | 10/2002 | Kurdle et al. |
| 2002/0149828 A1 | 10/2002 | Miles |
| 2002/0149834 A1 | 10/2002 | Mei et al. |
| 2002/0149850 A1 | 10/2002 | Heffner et al. |
| 2002/0154422 A1 | 10/2002 | Sniegowski et al. |
| 2002/0167072 A1 | 11/2002 | Andosca |
| 2002/0167730 A1 | 11/2002 | Needham et al. |
| 2002/0186209 A1 | 12/2002 | Cok |
| 2002/0186483 A1 | 12/2002 | Hagelin et al. |
| 2002/0197761 A1 | 12/2002 | Patel et al. |
| 2003/0011864 A1 | 1/2003 | Flanders |
| 2003/0015936 A1 | 1/2003 | Yoon et al. |
| 2003/0016428 A1 | 1/2003 | Kato et al. |
| 2003/0021004 A1 | 1/2003 | Cunningham et al. |
| 2003/0029705 A1 | 2/2003 | Qiu et al. |
| 2003/0035196 A1 | 2/2003 | Walker |
| 2003/0036215 A1 | 2/2003 | Reid |
| 2003/0043157 A1 | 3/2003 | Miles |
| 2003/0053078 A1 | 3/2003 | Missey et al. |
| 2003/0119221 A1 | 6/2003 | Cunningham et al. |
| 2003/0123125 A1 | 7/2003 | Little |
| 2003/0138669 A1 | 7/2003 | Kojima et al. |
| 2003/0156315 A1 | 8/2003 | Li et al. |
| 2003/0173504 A1 | 9/2003 | Cole et al. |
| 2003/0202264 A1 | 10/2003 | Weber et al. |
| 2003/0202265 A1 | 10/2003 | Reboa et al. |

(56) References Cited

U.S. PATENT DOCUMENTS

| | | |
|---|---|---|
| 2003/0202266 A1 | 10/2003 | Ring et al. |
| 2003/0210851 A1 | 11/2003 | Fu et al. |
| 2004/0008396 A1 | 1/2004 | Stappaerts |
| 2004/0008438 A1 | 1/2004 | Sato |
| 2004/0027671 A1 | 2/2004 | Wu et al. |
| 2004/0027701 A1 | 2/2004 | Ishikawa |
| 2004/0043552 A1 | 3/2004 | Strumpell et al. |
| 2004/0056742 A1 | 3/2004 | Dabbaj |
| 2004/0066477 A1 | 4/2004 | Morimoto et al. |
| 2004/0075967 A1 | 4/2004 | Lynch et al. |
| 2004/0076802 A1 | 4/2004 | Tompkin et al. |
| 2004/0080035 A1 | 4/2004 | Delapierre |
| 2004/0080807 A1 | 4/2004 | Chen et al. |
| 2004/0100594 A1 | 5/2004 | Huibers et al. |
| 2004/0100677 A1 | 5/2004 | Huibers et al. |
| 2004/0100680 A1 | 5/2004 | Huibers et al. |
| 2004/0107775 A1 | 6/2004 | Kim |
| 2004/0124483 A1 | 7/2004 | Partridge et al. |
| 2004/0125281 A1 | 7/2004 | Lin et al. |
| 2004/0125347 A1 | 7/2004 | Patel et al. |
| 2004/0136045 A1 | 7/2004 | Tran |
| 2004/0140557 A1 | 7/2004 | Sun et al. |
| 2004/0145049 A1 | 7/2004 | McKinnell et al. |
| 2004/0145811 A1 | 7/2004 | Lin et al. |
| 2004/0147056 A1 | 7/2004 | McKinnell et al. |
| 2004/0147198 A1 | 7/2004 | Lin et al. |
| 2004/0150939 A1 | 8/2004 | Huff |
| 2004/0160143 A1 | 8/2004 | Shreeve et al. |
| 2004/0174583 A1 | 9/2004 | Chen et al. |
| 2004/0175577 A1 | 9/2004 | Lin et al. |
| 2004/0179281 A1 | 9/2004 | Reboa |
| 2004/0179445 A1 | 9/2004 | Park et al. |
| 2004/0184134 A1 | 9/2004 | Makigaki |
| 2004/0184766 A1 | 9/2004 | Kim et al. |
| 2004/0188599 A1 | 9/2004 | Viktorovitch et al. |
| 2004/0201908 A1 | 10/2004 | Kaneko |
| 2004/0207497 A1 | 10/2004 | Hsu et al. |
| 2004/0207897 A1 | 10/2004 | Lin |
| 2004/0209195 A1 | 10/2004 | Lin |
| 2004/0212026 A1 | 10/2004 | Van Brocklin et al. |
| 2004/0217264 A1 | 11/2004 | Wood et al. |
| 2004/0217378 A1 | 11/2004 | Martin et al. |
| 2004/0217919 A1 | 11/2004 | Pichi et al. |
| 2004/0218251 A1 | 11/2004 | Piehl et al. |
| 2004/0218334 A1 | 11/2004 | Martin et al. |
| 2004/0218341 A1 | 11/2004 | Martin et al. |
| 2004/0227493 A1 | 11/2004 | Van Brocklin et al. |
| 2004/0233503 A1 | 11/2004 | Kimura |
| 2004/0240138 A1 | 12/2004 | Martin et al. |
| 2004/0245588 A1 | 12/2004 | Nikkel et al. |
| 2004/0259010 A1 | 12/2004 | Kanbe |
| 2005/0001797 A1 | 1/2005 | Miller et al. |
| 2005/0001828 A1 | 1/2005 | Martin et al. |
| 2005/0002082 A1 | 1/2005 | Miles |
| 2005/0003667 A1 | 1/2005 | Lin et al. |
| 2005/0014374 A1 | 1/2005 | Partridge et al. |
| 2005/0024557 A1 | 2/2005 | Lin |
| 2005/0035699 A1 | 2/2005 | Tsai |
| 2005/0036095 A1 | 2/2005 | Yeh et al. |
| 2005/0038950 A1 | 2/2005 | Adelmann |
| 2005/0042117 A1 | 2/2005 | Lin |
| 2005/0046919 A1 | 3/2005 | Taguchi et al. |
| 2005/0046922 A1 | 3/2005 | Lin et al. |
| 2005/0046948 A1 | 3/2005 | Lin |
| 2005/0057442 A1 | 3/2005 | Way |
| 2005/0068583 A1 | 3/2005 | Gutkowski et al. |
| 2005/0068627 A1 | 3/2005 | Nakamura et al. |
| 2005/0069209 A1 | 3/2005 | Damera-Vankata et al. |
| 2005/0078348 A1 | 4/2005 | Lin |
| 2005/0098840 A1 | 5/2005 | Fuertsch et al. |
| 2005/0117190 A1 | 6/2005 | Iwauchi et al. |
| 2005/0117623 A1 | 6/2005 | Shchukin et al. |
| 2005/0122294 A1 | 6/2005 | Ben-David et al. |
| 2005/0122306 A1 | 6/2005 | Wilcox et al. |
| 2005/0128543 A1 | 6/2005 | Phillips et al. |
| 2005/0133761 A1 | 6/2005 | Thielemans |
| 2005/0167597 A1 | 8/2005 | Yokura et al. |
| 2005/0168849 A1 | 8/2005 | Lin |
| 2005/0179378 A1 | 8/2005 | Oooka et al. |
| 2005/0195462 A1 | 9/2005 | Lin |
| 2005/0236260 A1 | 10/2005 | Pasch et al. |
| 2005/0239275 A1 | 10/2005 | Muthukumar et al. |
| 2005/0241394 A1 | 11/2005 | Clark |
| 2005/0275930 A1 | 12/2005 | Patel et al. |
| 2006/0007517 A1 | 1/2006 | Tsai |
| 2006/0017379 A1 | 1/2006 | Su et al. |
| 2006/0017689 A1 | 1/2006 | Faase et al. |
| 2006/0022966 A1 | 2/2006 | Mar |
| 2006/0024880 A1 | 2/2006 | Chui et al. |
| 2006/0038643 A1 | 2/2006 | Xu et al. |
| 2006/0044654 A1 | 3/2006 | Vandorpe et al. |
| 2006/0065622 A1 | 3/2006 | Floyd et al. |
| 2006/0065940 A1 | 3/2006 | Kothari |
| 2006/0066641 A1 | 3/2006 | Gally et al. |
| 2006/0066938 A1 | 3/2006 | Chui |
| 2006/0067028 A1* | 3/2006 | Floyd ............................ 361/278 |
| 2006/0077155 A1 | 4/2006 | Chui et al. |
| 2006/0082588 A1 | 4/2006 | Mizuno et al. |
| 2006/0082863 A1 | 4/2006 | Piehl et al. |
| 2006/0103643 A1 | 5/2006 | Mathew et al. |
| 2006/0132927 A1 | 6/2006 | Yoon |
| 2006/0144681 A1 | 7/2006 | Lee et al. |
| 2006/0171628 A1 | 8/2006 | Naniwada |
| 2006/0180886 A1 | 8/2006 | Tsang |
| 2006/0203325 A1 | 9/2006 | Faase et al. |
| 2006/0220160 A1 | 10/2006 | Miles |
| 2006/0227404 A1 | 10/2006 | Faase et al. |
| 2007/0020948 A1 | 1/2007 | Piehl et al. |
| 2007/0042521 A1 | 2/2007 | Yama |
| 2007/0077525 A1 | 4/2007 | Davis et al. |
| 2007/0086078 A1 | 4/2007 | Hagood et al. |
| 2007/0097694 A1 | 5/2007 | Faase et al. |
| 2007/0138391 A1 | 6/2007 | Garber et al. |
| 2007/0138608 A1 | 6/2007 | Ikehashi |
| 2007/0153860 A1 | 7/2007 | Chang-Hasnain et al. |
| 2007/0190886 A1 | 8/2007 | Satoh et al. |
| 2007/0205969 A1 | 9/2007 | Hagood et al. |
| 2007/0216987 A1 | 9/2007 | Hagood et al. |
| 2007/0247401 A1 | 10/2007 | Sasagawa et al. |
| 2007/0247696 A1 | 10/2007 | Sasagawa et al. |
| 2007/0249078 A1 | 10/2007 | Tung et al. |
| 2007/0249081 A1 | 10/2007 | Luo et al. |
| 2007/0253054 A1 | 11/2007 | Miles |
| 2007/0268211 A1 | 11/2007 | Whitehead et al. |
| 2007/0279730 A1 | 12/2007 | Heald |
| 2007/0279753 A1 | 12/2007 | Tung et al. |
| 2007/0285761 A1 | 12/2007 | Zhong et al. |
| 2008/0002299 A1 | 1/2008 | Thurn |
| 2008/0030657 A1 | 2/2008 | Wu et al. |
| 2008/0043315 A1 | 2/2008 | Cummings |
| 2008/0055706 A1 | 3/2008 | Chui et al. |
| 2008/0062148 A1 | 3/2008 | Hotelling et al. |
| 2008/0068697 A1 | 3/2008 | Haluzak et al. |
| 2008/0068699 A1 | 3/2008 | Miles |
| 2008/0080043 A1 | 4/2008 | Chui et al. |
| 2008/0088910 A1 | 4/2008 | Miles |
| 2008/0110855 A1 | 5/2008 | Cummings |
| 2008/0151353 A1 | 6/2008 | Haskett |
| 2008/0158645 A1 | 7/2008 | Chiang |
| 2008/0186581 A1 | 8/2008 | Bita et al. |
| 2008/0218834 A1* | 9/2008 | Wang ............................ 359/238 |
| 2008/0278788 A1* | 11/2008 | Sasagawa .................... 359/224 |
| 2008/0283374 A1 | 11/2008 | Naito |
| 2008/0288225 A1 | 11/2008 | Djordjev et al. |
| 2008/0297880 A1 | 12/2008 | Steckl et al. |
| 2009/0009444 A1 | 1/2009 | Heald et al. |
| 2009/0021884 A1 | 1/2009 | Nakamura |
| 2009/0078316 A1 | 3/2009 | Khazeni |
| 2009/0101192 A1 | 4/2009 | Kothari et al. |
| 2009/0103166 A1 | 4/2009 | Khazeni et al. |
| 2009/0122384 A1 | 5/2009 | Felnhofer et al. |
| 2009/0126777 A1 | 5/2009 | Khazeni et al. |
| 2009/0159123 A1 | 6/2009 | Kothari |
| 2009/0174651 A1 | 7/2009 | Jacobson et al. |

(56) References Cited

U.S. PATENT DOCUMENTS

| | | |
|---|---|---|
| 2009/0211885 A1 | 8/2009 | Steeneken et al. |
| 2009/0213450 A1 | 8/2009 | Sampsell |
| 2009/0213451 A1 | 8/2009 | Tung et al. |
| 2009/0231496 A1 | 9/2009 | Nishino et al. |
| 2009/0231666 A1 | 9/2009 | Gudlavalleti et al. |
| 2009/0256218 A1 | 10/2009 | Mignard et al. |
| 2009/0257105 A1 | 10/2009 | Xu et al. |
| 2009/0275163 A1* | 11/2009 | Lacey et al. ............. 438/51 |
| 2009/0279162 A1 | 11/2009 | Chui |
| 2009/0293955 A1 | 12/2009 | Kothari et al. |
| 2009/0323153 A1 | 12/2009 | Sampsell |
| 2010/0014148 A1 | 1/2010 | Djordjev |
| 2010/0051089 A1 | 3/2010 | Khazeni et al. |
| 2010/0053148 A1 | 3/2010 | Khazeni et al. |
| 2010/0079847 A1 | 4/2010 | Patel et al. |
| 2010/0096006 A1 | 4/2010 | Griffiths |
| 2010/0096011 A1 | 4/2010 | Griffiths |
| 2010/0118382 A1 | 5/2010 | Kothari et al. |
| 2010/0182675 A1 | 7/2010 | Sampsell et al. |
| 2010/0236624 A1 | 9/2010 | Khazeni et al. |
| 2010/0238572 A1 | 9/2010 | Tao et al. |
| 2010/0309572 A1 | 12/2010 | Mignard |
| 2011/0019380 A1 | 1/2011 | Miles |
| 2011/0026095 A1 | 2/2011 | Kothari et al. |
| 2011/0026096 A1 | 2/2011 | Miles |
| 2011/0038027 A1 | 2/2011 | Miles |
| 2011/0044496 A1 | 2/2011 | Chui et al. |
| 2011/0063712 A1 | 3/2011 | Kothari et al. |
| 2011/0069371 A1 | 3/2011 | Kothari et al. |
| 2011/0075241 A1 | 3/2011 | Mienko et al. |
| 2011/0075245 A1 | 3/2011 | Hashimura et al. |
| 2011/0080632 A1 | 4/2011 | Miles |
| 2011/0090554 A1 | 4/2011 | Tung |
| 2011/0115762 A1 | 5/2011 | Sasagawa et al. |
| 2011/0116156 A1 | 5/2011 | Kothari |
| 2011/0169724 A1 | 7/2011 | Tao et al. |
| 2011/0170166 A1 | 7/2011 | Miles |
| 2011/0170167 A1 | 7/2011 | Miles |
| 2011/0170168 A1 | 7/2011 | Endisch et al. |
| 2011/0177745 A1 | 7/2011 | Lasiter |
| 2011/0188109 A1 | 8/2011 | Chui et al. |
| 2011/0188110 A1 | 8/2011 | Miles |
| 2011/0194169 A1 | 8/2011 | Ganti et al. |
| 2012/0122259 A1 | 5/2012 | Tung et al. |
| 2012/0242638 A1 | 9/2012 | Zhong et al. |
| 2012/0248478 A1 | 10/2012 | Lee et al. |
| 2012/0249558 A1 | 10/2012 | Lee et al. |

FOREIGN PATENT DOCUMENTS

| | | |
|---|---|---|
| DE | 10 2006 039 071 | 2/2008 |
| EP | 0 071 287 | 2/1983 |
| EP | 0 035 299 | 9/1983 |
| EP | 0 310 176 | 4/1989 |
| EP | 0 332 953 | 9/1989 |
| EP | 0 361 981 | 4/1990 |
| EP | 0 667 548 | 8/1995 |
| EP | 0 668 490 | 8/1995 |
| EP | 0 695 959 | 2/1996 |
| EP | 0 788 005 | 8/1997 |
| EP | 0 879 991 | 11/1998 |
| EP | 0 969 306 | 1/2000 |
| EP | 0 986 077 | 3/2000 |
| EP | 1 122 577 | 8/2001 |
| EP | 1 146 533 | 10/2001 |
| EP | 1 172 681 | 1/2002 |
| EP | 1 205 782 | 5/2002 |
| EP | 1 227 346 | 7/2002 |
| EP | 1 275 997 | 1/2003 |
| EP | 1 403 212 | 3/2004 |
| EP | 1 435 336 | 7/2004 |
| EP | 1 439 515 | 7/2004 |
| EP | 1 473 581 | 11/2004 |
| EP | 1 473 691 | 11/2004 |
| EP | 1 486 999 | 12/2004 |
| EP | 1 802 114 | 6/2007 |
| EP | 1 928 028 | 6/2008 |
| FR | 2 824 643 | 11/2002 |
| FR | 2 843 230 | 2/2004 |
| JP | 56-088111 | 7/1981 |
| JP | 62 082454 | 4/1987 |
| JP | 03180890 | 8/1991 |
| JP | 4-009625 | 1/1992 |
| JP | 04276721 | 10/1992 |
| JP | 5-49238 | 2/1993 |
| JP | 05-275401 | 10/1993 |
| JP | 5-281479 | 10/1993 |
| JP | 08-051230 | 2/1996 |
| JP | 08-292382 | 11/1996 |
| JP | 09-127439 | 5/1997 |
| JP | 11-211999 | 8/1999 |
| JP | 2000 147262 | 5/2000 |
| JP | 2000-306515 | 11/2000 |
| JP | 2001-221913 | 8/2001 |
| JP | 2001 249283 | 9/2001 |
| JP | 2002-062490 | 2/2002 |
| JP | 2002052500 A | 2/2002 |
| JP | 2002174721 A | 6/2002 |
| JP | 2002-221678 | 8/2002 |
| JP | 2002-243937 | 8/2002 |
| JP | 2002-277771 | 9/2002 |
| JP | 2002 287047 | 10/2002 |
| JP | 2003-340795 | 2/2003 |
| JP | 2003 177336 | 6/2003 |
| JP | 2003-195201 | 7/2003 |
| JP | 2003-315732 | 11/2003 |
| JP | 2004-012642 | 1/2004 |
| JP | 2004-141995 | 5/2004 |
| JP | 2004-157527 | 6/2004 |
| JP | 2004-212638 | 7/2004 |
| JP | 2004-212680 | 7/2004 |
| JP | 2004-235465 | 8/2004 |
| JP | 2004261884 A | 9/2004 |
| JP | 2004-286825 | 10/2004 |
| JP | 2005118944 A | 5/2005 |
| JP | 2005-157133 | 6/2005 |
| JP | 2005215323 A | 8/2005 |
| JP | 2005 279831 | 10/2005 |
| JP | 2005-308871 | 11/2005 |
| JP | 2006099018 A | 4/2006 |
| JP | 2006100795 | 4/2006 |
| JP | 2006269127 A | 10/2006 |
| JP | 2007 027150 | 2/2007 |
| KR | 2002-010322 | 2/2002 |
| TW | 157313 | 5/1991 |
| WO | WO 91/05284 | 4/1991 |
| WO | WO 95/03562 | 2/1995 |
| WO | WO 98/14804 | 4/1998 |
| WO | WO 98/43129 | 10/1998 |
| WO | WO 98/52224 | 11/1998 |
| WO | 9859382 A1 | 12/1998 |
| WO | WO 99/52006 | 10/1999 |
| WO | WO 01/53113 | 7/2001 |
| WO | WO 02/24570 | 3/2002 |
| WO | WO 02/063602 | 8/2002 |
| WO | WO 02/063682 | 8/2002 |
| WO | WO 02/071132 | 9/2002 |
| WO | WO 02/079853 | 10/2002 |
| WO | WO 02/086582 | 10/2002 |
| WO | WO-02096796 A2 | 12/2002 |
| WO | WO 03/014789 | 2/2003 |
| WO | WO 03/041133 | 5/2003 |
| WO | WO 03/046508 | 6/2003 |
| WO | WO 03/054925 | 7/2003 |
| WO | WO 03/073151 | 9/2003 |
| WO | WO 03/079384 | 9/2003 |
| WO | WO 03/085728 | 10/2003 |
| WO | WO 03/105198 | 12/2003 |
| WO | WO 2004/000717 | 12/2003 |
| WO | WO 2004/042687 | 5/2004 |
| WO | WO 2005/006364 | 1/2005 |
| WO | WO 2005/010566 | 2/2005 |
| WO | WO 2006/035698 | 4/2006 |

(56) References Cited

FOREIGN PATENT DOCUMENTS

| WO | WO 2006/036386 | 4/2006 |
|---|---|---|
| WO | WO-2007022476 A1 | 2/2007 |
| WO | WO 2007/036422 | 4/2007 |
| WO | WO 2007/045875 | 4/2007 |
| WO | WO 2007/053438 | 5/2007 |
| WO | WO 2007/072998 | 6/2007 |
| WO | WO 2008/062363 | 5/2008 |
| WO | WO-2010006213 A1 | 1/2010 |

OTHER PUBLICATIONS

Qualcomm MEMS Technologies, Inc., May 2008, Interferometric Modulator (IMOD) Technology Overview, White Paper, 14 pp.
ISR and WO dated Jun. 14, 2011 in PCT/US11/031010.
Akasaka, Three-Dimensional IC Trends, Proceedings of IEEE, vol. 74, No. 12, pp. 1703-1714, (Dec. 1986).
Aratani et al., Process and Design Considerations for Surface Micromachined Beams for a Tuneable Interferometer Array in Silicon, Proc. IEEE Microelectromechanical Workshop, Fort Lauderdale, FL, pp. 230-235 (Feb. 1993).
Aratani K., et al., Surface micromachined tuneable interferometer array, Sensors and Actuators, pp. 17-23. (1994).
Bass, Handbook of Optics, vol. I, Fundamentals, Techniques, and Design, Second Edition, McGraw-Hill, Inc., New York, pp. 2.29-2.36 (1995).
Bouchaud et al., Sep. 2003, RF MEMS analysis, forecasts and technology review, Chip Unasix, pp. 26-29 [online] retrieved from the internet: ,URL:http//semiconductors.unaxis.com/en/download/RF%20MEMS.pdf>.
Butler et al., An Embedded Overlay Concept for Microsystems Packaging, IEEE Transactions on Advanced Packaging IEEE USA, 23(4):617-622, (2000).
Cacharelis et al., 1997, A Reflective-mode PDLC Light Valve Display Technology, Proceedings of European Solid State Device Research Conference (ESSDERC), pp. 596-599.
Chan et al., Oct. 2003, Low-actuation voltage RF MEMS shunt switch with cold switching lifetime of seven billion cycles, Journal of Microelectromechanical Systems, 12(5).
Chiou et al., A Novel Capacitance Control Design of Tunable Capacitor Using Multiple Electrostatic Driving Electrodes, IEEE NANO 2001, M 3.1, Nanoelectronics and Giga-Scale Systems (Special Session), Oct. 29, 2001, pp. 319-324.
Fan et al., Channel Drop Filters in Photonic Crystals, Optics Express, 3(1) 1998.
Fork, et al., Chip on Glass Bonding Using StressedMetalTM Technology, SID 05 Digest, pp. 534-537, 2005.
Giles et al., A Silicon MEMS Optical Switch Attenuator and Its Use in Lightwave Subsystems, IEEE Journal of Selected Topics in Quantum Electronics, 5(1):18-25, (Jan./Feb. 1999).
Goossen et al., Possible Display Applications of the Silicon Mechanical Anti-Reflection Switch, Society for Information Display (1994).
Goossen et al., Silicon Modulator Based on Mechanically-Active Anti-Reflection Layer with 1Mbit/sec Capability for Fiber-in-the-Loop Applications, IEEE Photonics Technology Letters, pp. 1119-1121 (Sep. 1994).
Goossen, MEMS-based variable optical interference devices, Optical MEMS, 2000 IEEE/LEDS Int'l. Conf. on Aug. 21-24, 2000, Piscatawny, NJ, Aug. 21, 2000, pp. 17-18.
Gosch, West Germany Grabs the Lead in X-Ray Lithography, Electronics pp. 78-80 (Feb. 5, 1987).
Howard et al., Nanometer-Scale Fabrication Techniques, VLSI Electronics: Microstructure Science, 5:145-153 and 166-173 (1982).
Ibbotson et al., Comparison of XeF2 and F-atom reactions with Si and SiO2, Applied Physics Letters, 44(12):1129-1131 (Jun. 1984).
Jackson Classical Electrodynamics, John Wiley & Sons Inc., pp. 568-573, 1962.
Joannopoulos et al., "Molding the Flow of Light," Photonic Crystals. 1995.
Johnson Optical Scanners, Microwave Scanning Antennas, 1:251-261, (1964).
Kim et al., Feb. 15, 1999, Control of Optical Transmission Through metals Perforated With Subwave-Length Hole Arrays, Optic Letters, 24(4):256-258.
Li, 1999, On the design and fabrication of electrostatic RF MEMS switches, Final Report 1999-00 for MICRO Project 99-071, University of California, Irvine.
Li et al., Dec. 2006, CMOS micromachine capacitive cantilevers for mass sensing, Journal of Micromechanics and Microengineering, 16(12).
Light over Matter, Circle No. 36 (Jun. 1993).
Lin et al., Free-Space Micromachined Optical Switches for Optical Networking, IEEE Journal of Selected Topics in Quantum Electronics, 5(1):4-9 Jan./Feb. 1999.
Little et al., Vertically Coupled Microring Resonator Channel Dropping Filter, IEEE Photonics Technology Letters, 11(2) 1999.
Londergan et al., Advanced processes for MEMS-based displays, Proceedings of the Asia Display 2007, SID, 1:107-112.
Longhurst, 1963, Chapter IX: Multiple Beam Interferometry, in Geometrical and Physical Optics, pp. 153-157.
Magel, Integrated Optic Devices Using Micromachined Metal Membranes, SPIE vol. 2686, 0-8194-2060-3/1996, 1996.
Maier et al., 1996, 1.3" active matrix liquid crystal spatial light modulator with 508 dpi resolution, SPIE vol. 2754, pp. 171-179.
Mait, Nov. 15-18, 1993, Design of diffractive optical elements for optical signal processing, IEEE Lasers and Electro-Optics Society Annual Meeting, pp. 59-60.
Mehregany et al., 1996, MEMS applications in optical systems, IEEE/LEOS 1996 Summer Topical Meetings, pp. 75-76.
Miles et al, Oct. 21, 1997, A MEMS based interferometric modulator (IMOD) for display applications, Proceedings of Sensors Expo, pp. 281-284.
Miles, A New Reflective FPD Technology Using Interferometric Modulation, Journal of the SID, 5/4, 1997.
Miles, Interferometric modulation: MOEMS as an enabling technology for high performance reflective displays, Proceedings of SPIE, 4985:131-139, 2003.
Nagami et al., Plastic Cell Architecture: Towards Reconfigurable Computing for General-Purpose, Proc. IEEE Workshop on FPGA-based Custom Computing Machines, (1998).
Nakagawa et al., Feb. 1, 2002, Wide-field-of-view narrow-band spectral filters based on photonic crystal nanocavities, Optics Letters, 27(3):191-193.
Newsbreaks, Quantum-trench devices might operate at terahertz frequencies, Laser Focus World (May 1993).
Nieminen et al., 2004, Design of a temperature-stable RF MEM capacitor, IEEE Journal of Microelectromechanical Systems, 13(5):705-714.
Oliner et al., Radiating Elements and Mutual Coupling, Microwave Scanning Antennas, 2:131-141, (1966).
Pacheco et al., 2000, Design of low actuation voltage RF MEMS switch, Radiation Laboratory and Center for Microsystems Department of Electrical Engineering and Computer Science, University of Michigan, IEEE.
Panitz et al., Electrostatic actuated interference filters as optical switches for projection display applications, The 12th International Conference on Solid state Sensors, Actuators and Microsystems, Jun. 8-12, 2003, pp. 580-582.
Peerlings et al., Long Resonator Micromachined Tunable GaAs-A1As Fabry-Perot Filter, IEEE Photonics Technology Letters, IEEE Service Center, Piscatawny, NJ, 9(9):1235-1237, Sep. 1997.
Raley et al., A Fabry-Perot Microinterferometer for Visible Wavelengths, IEEE Solid-State Sensor and Actuator Workshop, Jun. 1992, Hilton Head, SC.
Schnakenberg, et al. TMAHW Etchants for Silicon Micromachining. 1991 International Conference on Solid State Sensors and Actuators—Digest of Technical Papers. pp. 815-818.
Science and Technology, The Economist, May 22, 1999, pp. 89-90.
Solgaard et al., Feb. 23-27, 2004, Interference-based optical MEMS filters, Optical 2004 Fiber Communication Conference, vol. 1.
Sperger et al., High Performance Patterned All-Dielectric Interference Colour Filter for Display Applications, SID Digest, pp. 81-83, (1994).

(56) References Cited

OTHER PUBLICATIONS

Stone, Radiation and Optics, An Introduction to the Classical Theory, McGraw-Hill, pp. 340-343, (1963).
Taii et al., A transparent sheet display by plastic MEMS, Journal of the SID 14(8):735-741, 2006.
Tan et al., 2003, RF MEMS simulation-high isolation CPW shunt switches, Ansoft: Global Seminars: Delivering Performance.
Tolansky, 1948, Chapter II: Multiple-Beam Interference, in Multiple-bean Interferometry of Surfaces and Films, Oxford at the Clarendon Press, pp. 8-11.
Walker, et al., Electron-beam-tunable Interference Filter Spatial Light Modulator, Optics Letters, 13(5):345-347, (May 1988).
Wang et al., Flexible Circuit-Based RF MEMS Switches, Proceedings of 2001 ASME International Mechanical Engineering Congress and Exposition, pp. 757-762, Nov. 11-16, 2001.
Wang, Jun. 29-Jul. 1, 2002, Design and fabrication of a novel two-dimension MEMS-based tunable capacitor, IEEE 2002 International Conference on Communications, Circuits and Systems and West Sino Expositions, 2:1766-1769.
Williams, et al. Etch Rates for Micromachining Processing. Journal of Microelectromechanical Systems, 5(4):256-259, (Dec. 1996).
Winters, et al. The etching of silicon with XeF2 vapor. Applied Physics Letters, 34(1):70-73, (Jan. 1979).
Winton, John M., A novel way to capture solar energy, Chemical Week, (May 1985).
Wu, Design of a Reflective Color LCD Using Optical Interference Reflectors, ASIA Display '95, pp. 929-931, (Oct. 1995).
Wu et al., MEMS Designed for Tunable Capacitors, Microwave Symposium Digest, 1998 IEEE MTT-S Int'l., Baltimore, MD, Jun. 7-12, 1998, 1:127-129.
Zhou et al., Waveguide Panel Display Using Electromechanical Spatial Modulators, SID Digest, vol. XXIX, 1998.
Written Opinion dated Apr. 13, 2012 in PCT/US11/031010.
Brosnihan et al., Jun. 2003, Optical IMEMS—a fabrication process for MEMS optical switches with integrated on-chip electronic, Transducers, Solid-State Sensors, Actuators and Microsystems, 12$^{th}$ International Conference 2003, 2(8-12):1638-1642.
Dokmeci et al., Dec. 2004, Two-axis single-crystal silicon micromirror arrays, Journal of Microelectromechanical Systems, 13(6):1006-1017.

Farooqui et al., A polysilicon-diaphragm-based pressure sensor technology, Journal of Physics E. Scientific Instruments, 20(12):1469-1471, Dec. 1, 1987.
Farooqui et al., Polysilicon microstructures, Proceedings of the Workshop on Micro Electro Mechanical Systems. Investigation of Micro Structures, Sensors, Actuators, Machines and Robots, Jan. 30, 1991, pp. 187-191.
Goldsmith et al., Aug. 1998, Performance of low-loss rf mems capacitive switches, IEEE Microwave and Guided Wave Letters, 8(8):269-271.
Heuer, Jan. 1, 2000, LPCVD polysilicon films with controlled curvature for optical MEMS: the MultiPoly™ process, International Conference on Optical MEMS, pp. 117-118.
Temple-Boyer et al., 1999, Properties of $SiO_xN_y$ films deposited by LPCVD from $SiH_4/N_2O/NH_3$ gaseous mixture, Sensors and Actuators, 74(1-3):52-55.
IPRP dated Jul. 25, 2012 in PCT/US11/031010.
Billard, Tunable Capacitor, 5th Annual Review of LETI, Jun. 24, 2003, p. 7.
Conner, Hybrid Color Display Using Optical Interference Filter Array, SID Digest, pp. 577-580 (1993).
Feenstra et al., Electrowetting displays, Liquavista BV, 16 pp., Jan. 2006.
Han et al., Dec. 20, 2010, Color display using micromechanically coupled mirrors, Applied Physics Letters 97(25):251105, 3 pp.
Hohlfeld et al., Jun. 2003, Micro-machined tunable optical filters with optimized band-pass spectrum, 12th International Conference on Transducers, Solid-State Sensors, Actuators and Microsystems, 2:1494-1497.
Jerman et al., A Miniature Fabry-Perot Interferometer with a Corrugated Silicon Diaphragm Support, (1988).
Jerman et al., Miniature Fabry-Perot Interferometers Micromachined in Silicon for Use in Optical Fiber WDM Systems, Transducers, San Francisco, Jun. 24-27, 1991, Proceedings on the Int'l. Conf. on Solid State Sensors and Actuators, Jun. 24, 1991, pp. 372-375.
Kowarz et al., Conformal grating electromechanical system (GEMS) for high-speed digital light modulation, Proceedings of the IEEEE 15th. Annual International Conference on Micro Electro Mechanical Systems, MEMS 2002, pp. 568-573.
Lezec, Submicrometer dimple array based interference color field displays and sensors, Nano Lett. 7(2):329-333, Dec. 23, 2006.

\* cited by examiner

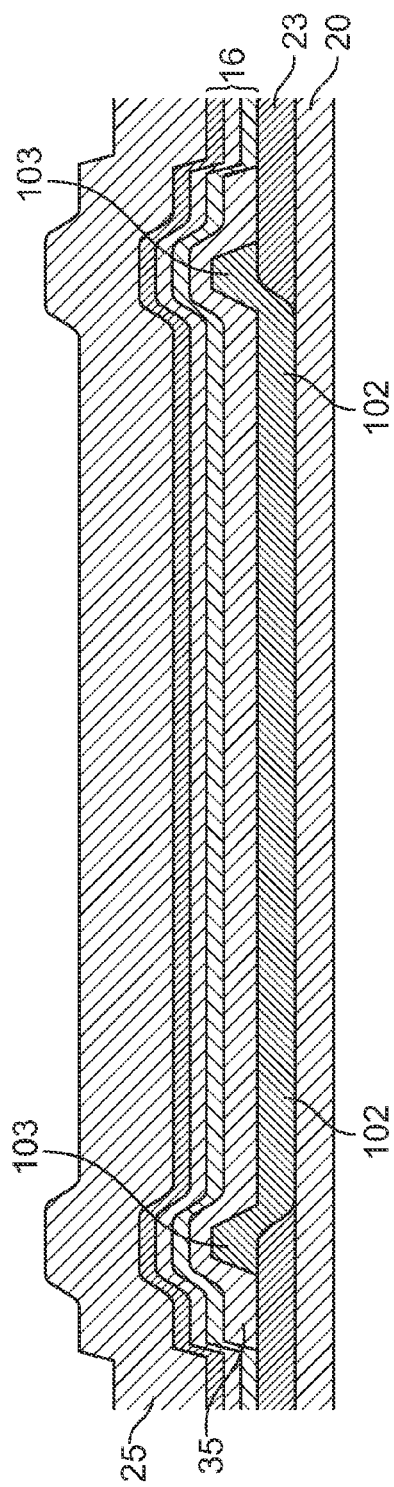
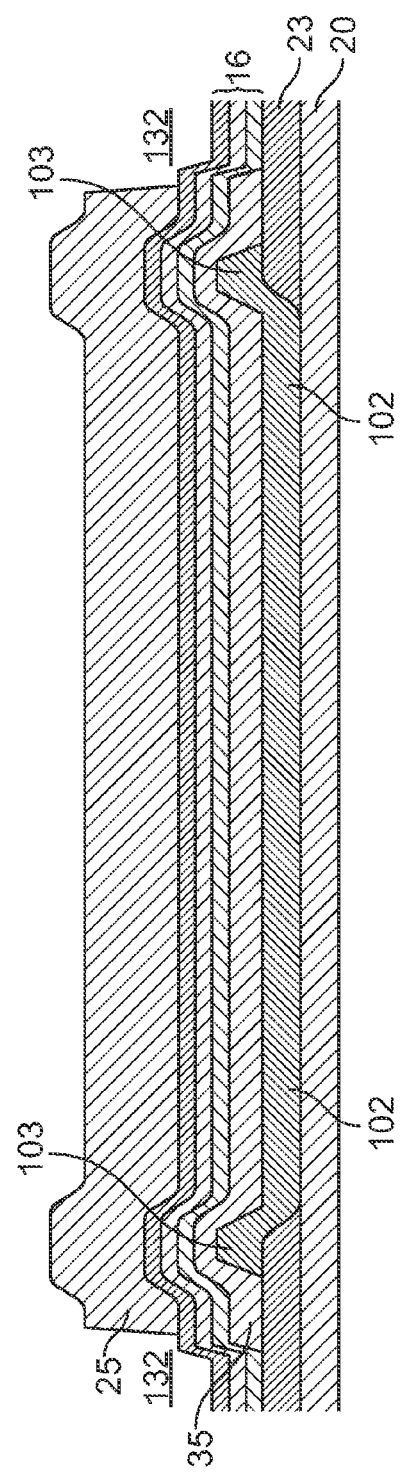

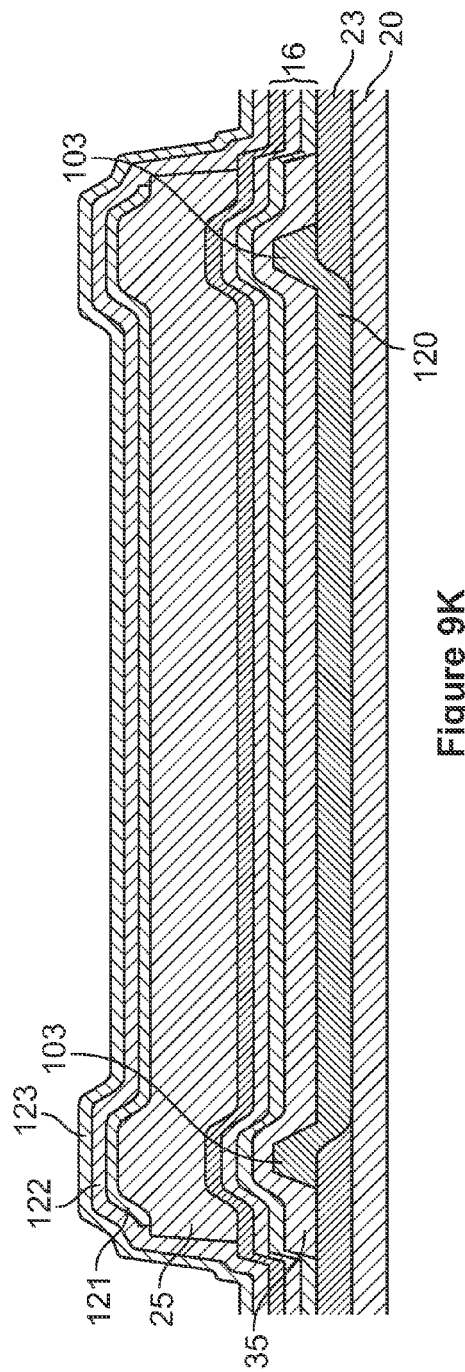
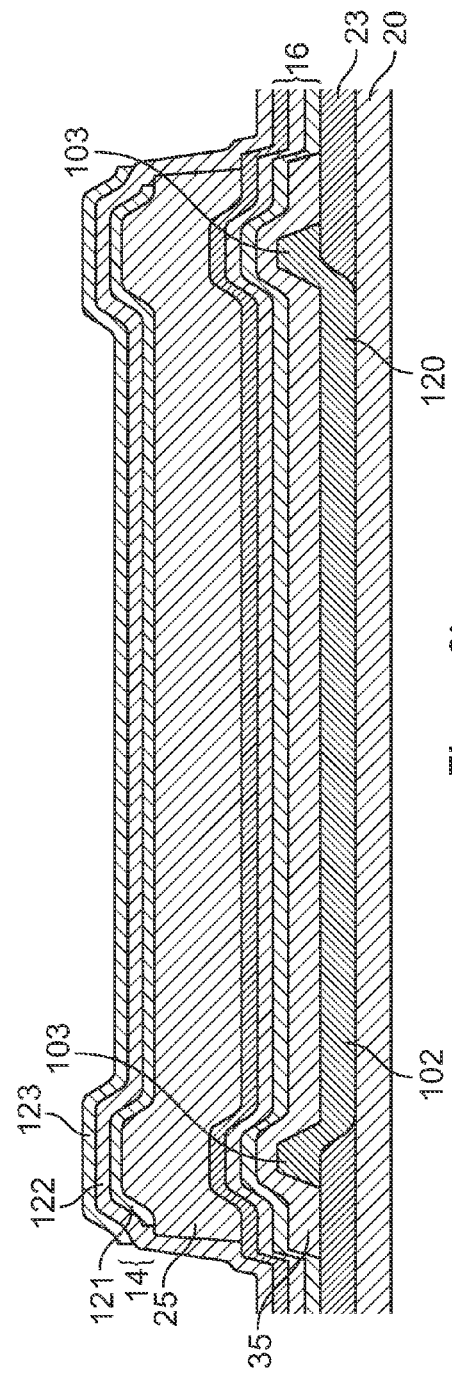

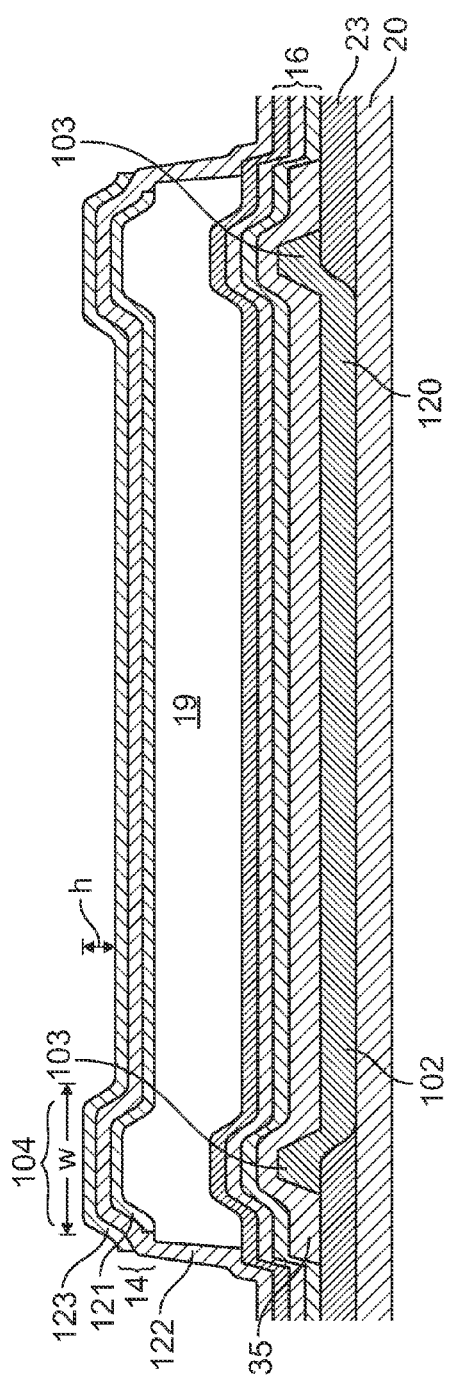
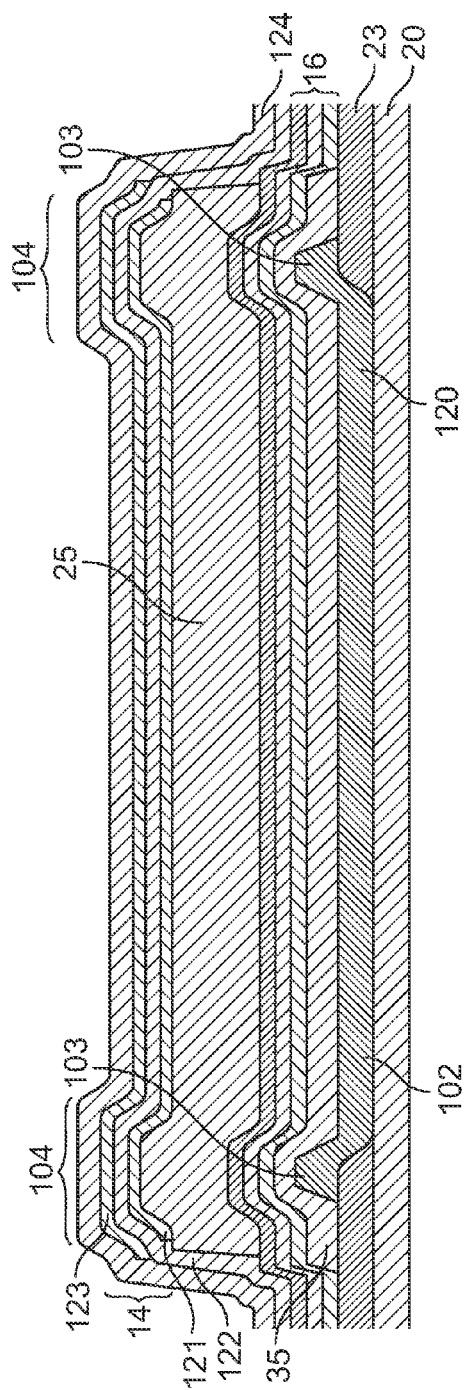

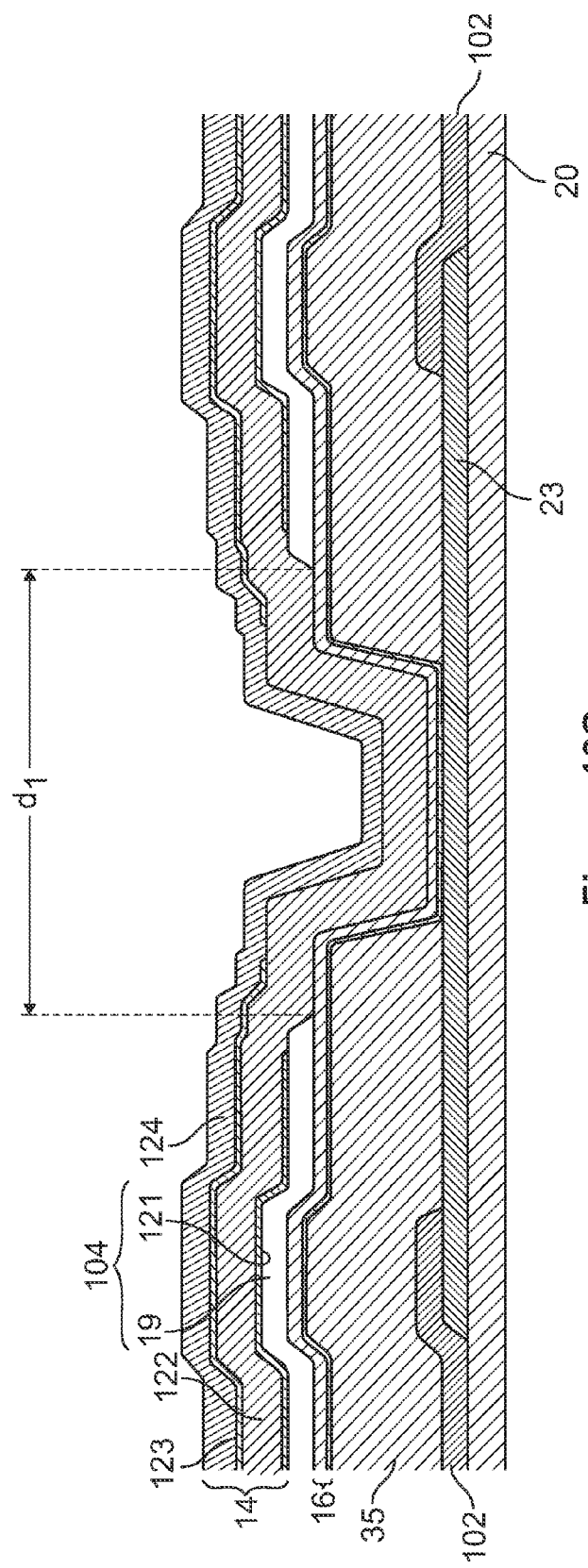

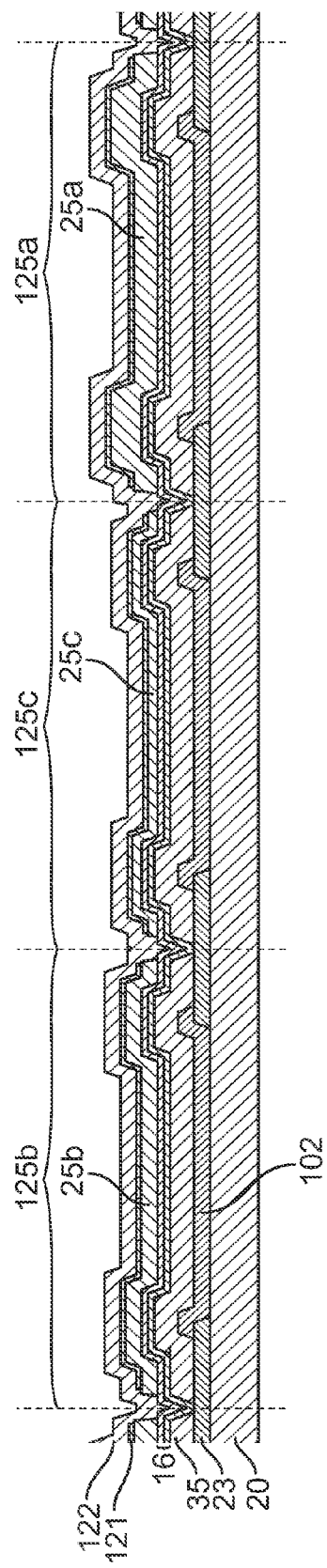
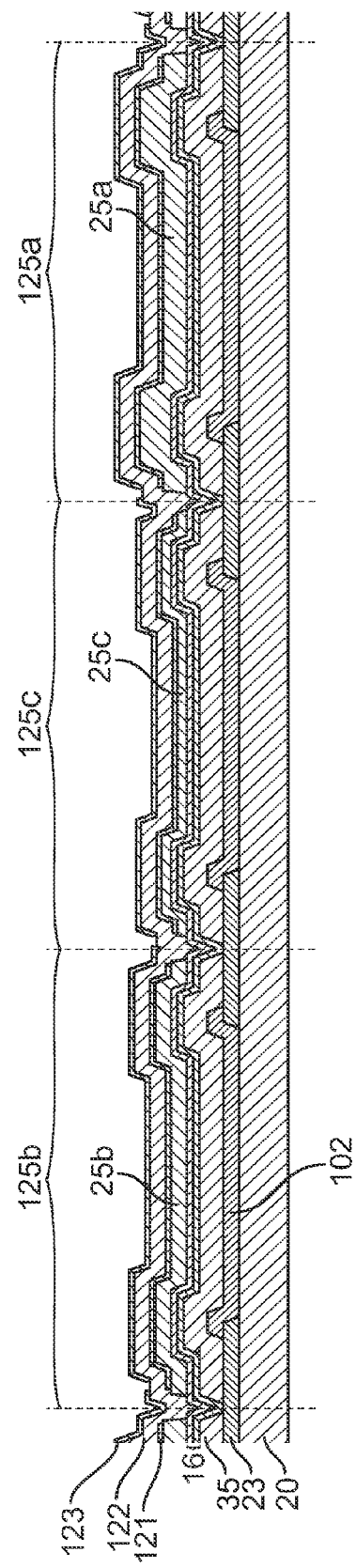
Figure 12C
Figure 12D

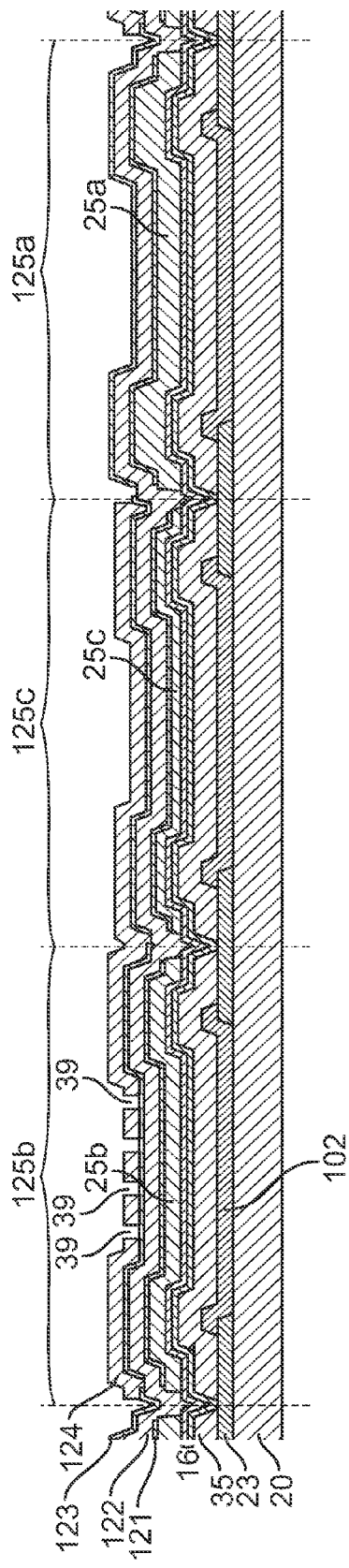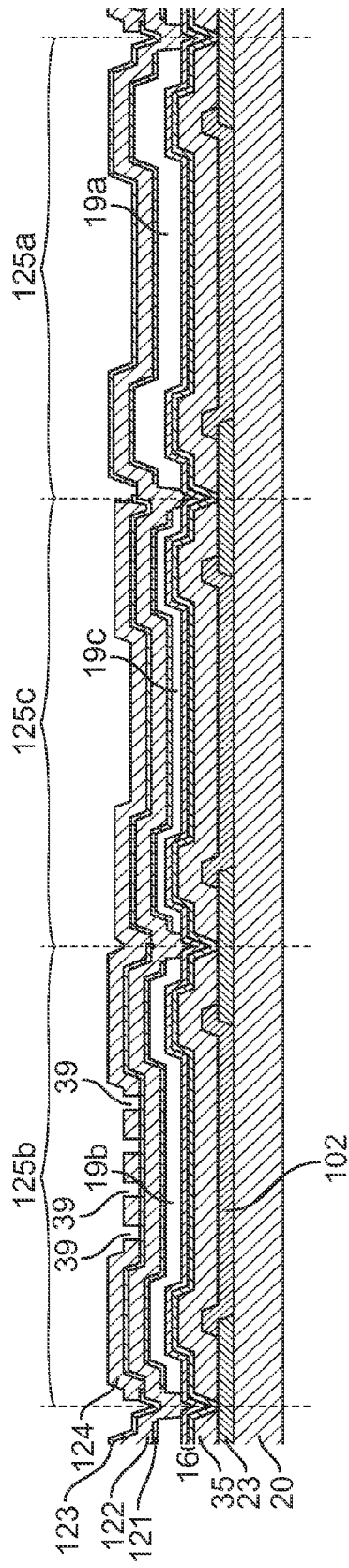

MECHANICAL LAYER AND METHODS OF FORMING THE SAME

CROSS-REFERENCE TO RELATED APPLICATIONS

The disclosure claims priority to U.S. Provisional Patent Application No. 61/322,776 filed Apr. 9, 2010 entitled "MECHANICAL LAYER AND METHODS OF FORMING THE SAME," and assigned to the assignee hereof. The disclosure of the prior application is considered part of, and is incorporated by reference in, this disclosure.

TECHNICAL FIELD

The disclosure relates to electromechanical systems.

DESCRIPTION OF THE RELATED TECHNOLOGY

Electromechanical systems include devices having electrical and mechanical elements, actuators, transducers, sensors, optical components (e.g., mirrors) and electronics. Electromechanical systems can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of electromechanical systems device is called an interferometric modulator (IMOD). As used herein, the term interferometric modulator or interferometric light modulator refers to a device that selectively absorbs and/or reflects light using the principles of optical interference. In some implementations, an interferometric modulator may include a pair of conductive plates, one or both of which may be transparent and/or reflective, wholly or in part, and capable of relative motion upon application of an appropriate electrical signal. In an implementation, one plate may include a stationary layer deposited on a substrate and the other plate may include a reflective membrane separated from the stationary layer by an air gap. The position of one plate in relation to another can change the optical interference of light incident on the interferometric modulator. Interferometric modulator devices have a wide range of applications, and are anticipated to be used in improving existing products and creating new products, especially those with display capabilities.

An interferometric device array can include a mechanical layer that is anchored at corners of each pixel. There is a need for interferometric devices having smaller anchoring areas for the mechanical layer and improved fill factor.

SUMMARY

The systems, methods and devices of the disclosure each have several innovative aspects, no single one of which is solely responsible for the desirable attributes disclosed herein.

One innovative aspect of the subject matter described in this disclosure can be implemented in an electromechanical device including a substrate, a partially reflective optical stack disposed on the substrate, and a movable mechanical layer positioned so that the partially reflective optical stack is between the mechanical layer and the substrate, the mechanical layer including a reflective layer, a conductive layer, and a supporting layer that is disposed between the reflective layer and the conductive layer. The supporting layer is anchored on the optical stack in an optically non-active anchor region and extends from the anchor region away from the optical stack spacing the mechanical layer from the optical stack to define a collapsible gap between the mechanical layer and the optical stack. The mechanical layer is movable to an actuated position and a relaxed position by applying a voltage across the mechanical layer and a stationary electrode disposed between the substrate and the collapsible gap. The collapsible gap is in a collapsed state when the mechanical layer is in the actuated position and the gap is in a non-collapsed state when the mechanical layer is in the relaxed position.

In some implementations, the mechanical layer further includes a kink disposed adjacent to the anchor region and in at least a portion of an optically non-active region. In some implementations, the kink in the mechanical layer includes a rising portion extending away from the gap and a falling portion extending towards the gap.

In some implementations, the reflective layer and the conductive layer include aluminum alloys. In some implementations, the supporting layer includes silicon oxynitride (SiON).

Another innovative aspect of the subject matter described in this disclosure can be implemented in a device including a substrate, means for partially reflecting light disposed on the substrate, and movable means for interferometrically reflecting light. The movable reflecting light means includes a means for supporting the movable reflecting means, the supporting means anchored on the partially reflecting means in an optically non-active anchor region. The supporting means extends from the anchor region away from the partially reflecting means spacing the movable reflecting means from the partially reflecting means to define a collapsible gap between the movable reflecting light means and the partially reflecting light means. The movable reflecting light means is movable to an actuated position and a relaxed position by applying a voltage across the movable reflecting light means and a stationary electrode disposed between the substrate and the collapsible gap. The collapsible gap is in a collapsed state when the movable reflecting light means is in the actuated position and the gap is in a non-collapsed state when the movable reflecting light means is in the relaxed position.

In some implementations, the movable reflecting light means includes a reflective layer and a conductive layer, and the support layer is disposed between the reflective layer and the conductive layer.

Another innovative aspect of the subject matter described in this disclosure can be implemented in a method of forming a mechanical layer in an electromechanical device. The method includes providing a substrate, forming an optical stack over the substrate, providing a sacrificial layer over the optical stack, removing a portion of the sacrificial layer that is disposed over an anchoring region, forming a mechanical layer over the sacrificial layer and the anchoring region, and removing the sacrificial layer to form a collapsible gap between the mechanical layer and the substrate. Forming the mechanical layer includes providing a reflective layer over the sacrificial layer, removing a portion of the reflective layer that is disposed over the anchoring region, providing a supporting layer over the reflective layer such that a portion of the supporting layer contacts the anchoring region, and providing a conductive layer over the supporting layer.

In some implementations, the method further includes depositing a shaping layer over at least a portion of the substrate, the shaping layer including at least one protrusion adjacent to the anchoring region. In some implementations, the method further includes forming the sacrificial layer as a conformal layer over the shaping layer including over the at least one protrusion, and forming the mechanical layer further includes forming the mechanical layer over the sacrificial layer and the shaping layer including the at least one protrusion as a conformal layer such that a kink is formed in a portion of the mechanical layer over each at least one protrusion.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIGS. 10A-10C show examples of cross-sectional schematic illustrations of various interferometric modulator devices.

FIGS. 12A-12F show examples of cross-sectional schematic illustrations of various stages in a method of making an interferometric modulator.

Like reference numbers and designations in the various drawings indicate like elements.

DETAILED DESCRIPTION

Figure 1:
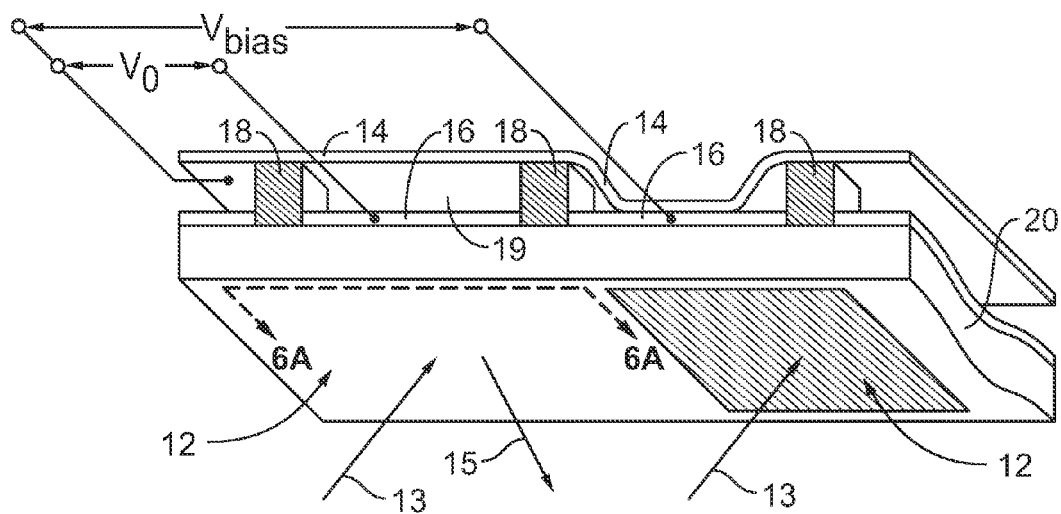
FIG. 1 shows an example of an isometric view depicting two adjacent pixels in a series of pixels of an interferometric modulator (IMOD) display device.

The following detailed description is directed to some implementations for the purposes of describing the innovative aspects. However, the teachings herein can be applied in a multitude of different ways. The described implementations may be implemented in any device that is configured to display an image, whether in motion (e.g., video) or stationary (e.g., still image), and whether textual, graphical or pictorial. More particularly, it is contemplated that the implementations may be implemented in or associated with a variety of electronic devices such as, but not limited to, mobile telephones, multimedia Internet enabled cellular telephones, mobile television receivers, wireless devices, smartphones, Bluetooth devices, personal data assistants (PDAs), wireless electronic mail receivers, hand-held or portable computers, netbooks, notebooks, smartbooks, printers, copiers, scanners, facsimile devices, GPS receivers/navigators, cameras, MP3 players, camcorders, game consoles, wrist watches, clocks, calculators, television monitors, flat panel displays, electronic reading devices (e.g., e-readers), computer monitors, auto displays (e.g., odometer display, etc.), cockpit controls and/or displays, camera view displays (e.g., display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (e.g., MEMS and non-MEMS), aesthetic structures (e.g., display of images on a piece of jewelry) and a variety of electromechanical systems devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes, electronic test equipment. Thus, the teachings are not intended to be limited to the implementations depicted solely in the Figures, but instead have wide applicability as will be readily apparent to one having ordinary skill in the art.

An electromechanical device is disclosed having a self-supporting mechanical layer. In some implementations described herein, electromechanical devices are provided that can be formed without a post or rivet structure, thereby reducing the area of the anchoring region and permitting a pixel array with improved fill factor. Additionally, the mechanical layer can be flexible so as to reduce the bending height of the mechanical layer when in the actuated position. Reducing the mechanical layer bending height can decrease the brightness of the portion of the mechanical layer that does not contact with the optical stack when the device is actuated, thereby improving the black state and increasing contrast ratio, gamut, and color saturation of a display that includes such devices.

Particular implementations of the subject matter described in this disclosure can be implemented to realize one or more of the following potential advantages. In some implementations, the subject matter described in this disclosure can be implemented to improve fill factor of a pixel array. Additionally, some implementations can reduce bending height of a mechanical layer. Furthermore, some implementations can increase contrast ratio, gamut, and/or color saturation of a display including such devices.

An example of a suitable electromechanical device, to which the described implementations may apply, is a reflective display device. Reflective display devices can incorporate interferometric modulators (IMODs) to selectively absorb and/or reflect light incident thereon using principles of optical interference. IMODs can include an absorber, a reflector that is movable with respect to the absorber, and an optical resonant cavity defined between the absorber and the reflector. The reflector can be moved to two or more different positions, which can change the size of the optical resonant cavity and thereby affect the reflectance of the interferometric modulator. The reflectance spectrums of IMODs can create fairly broad spectral bands which can be shifted across the visible wavelengths to generate different colors. The position of the spectral band can be adjusted by changing the thickness of the optical resonant cavity, i.e., by changing the position of the reflector.

FIG. 1 shows an example of an isometric view depicting two adjacent pixels in a series of pixels of an interferometric modulator (IMOD) display device. The IMOD display device includes one or more interferometric MEMS display elements. In these devices, the pixels of the MEMS display elements can be in either a bright or dark state. In the bright ("relaxed," "open" or "on") state, the display element reflects a large portion of incident visible light, e.g., to a user. Conversely, in the dark ("actuated," "closed" or "off") state, the display element reflects little incident visible light. In some implementations, the light reflectance properties of the on and off states may be reversed. MEMS pixels can be configured to reflect predominantly at particular wavelengths allowing for a color display in addition to black and white.

The IMOD display device can include a row/column array of IMODs. Each IMOD can include a pair of reflective layers, i.e., a movable reflective layer and a fixed partially reflective layer, positioned at a variable and controllable distance from each other to form an air gap (also referred to as an optical gap or cavity). The movable reflective layer may be moved between at least two positions. In a first position, i.e., a relaxed position, the movable reflective layer can be positioned at a relatively large distance from the fixed partially reflective layer. In a second position, i.e., an actuated position, the movable reflective layer can be positioned more closely to the partially reflective layer. Incident light that reflects from the two layers can interfere constructively or destructively depending on the position of the movable reflective layer, producing either an overall reflective or non-reflective state for each pixel. In some implementations, the IMOD may be in a reflective state when unactuated, reflecting light within the visible spectrum, and may be in a dark state when unactuated, reflecting light outside of the visible range (e.g., infrared light). In some other implementations, however, an IMOD may be in a dark state when unactuated, and in a reflective state when actuated. In some implementations, the introduction of an applied voltage can drive the pixels to change states. In some other implementations, an applied charge can drive the pixels to change states.

The depicted portion of the pixel array in FIG. 1 includes two adjacent interferometric modulators 12. In the IMOD 12 on the left (as illustrated), a mechanical layer or movable reflective layer 14 is illustrated in a relaxed position at a predetermined distance from an optical stack 16, which includes a partially reflective layer. The voltage $V_0$ applied across the IMOD 12 on the left is insufficient to cause actuation of the movable reflective layer 14. In the IMOD 12 on the right, the movable reflective layer 14 is illustrated in an actuated position near or adjacent the optical stack 16. The voltage $V_{bias}$ applied across the IMOD 12 on the right is sufficient to maintain the movable reflective layer 14 in the actuated position.

In FIG. 1, the reflective properties of pixels 12 are generally illustrated with arrows 13 indicating light incident upon the pixels 12, and light 15 reflecting from the pixel 12 on the left. Although not illustrated in detail, most of the light 13 incident upon the pixels 12 will be transmitted through the transparent substrate 20, toward the optical stack 16. A portion of the light incident upon the optical stack 16 will be transmitted through the partially reflective layer of the optical stack 16, and a portion will be reflected back through the transparent substrate 20. The portion of light 13 that is transmitted through the optical stack 16 will be reflected at the movable reflective layer 14, back toward (and through) the transparent substrate 20. Interference (constructive or destructive) between the light reflected from the partially reflective layer of the optical stack 16 and the light reflected from the movable reflective layer 14 will determine the wavelength(s) of light 15 reflected from the pixel 12.

The optical stack 16 can include a single layer or several layers. The layer(s) can include one or more of an electrode layer, a partially reflective and partially transmissive layer and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals, e.g., chromium (Cr), semiconductors, and dielectrics. The partially reflective layer can be formed of one or more layers of materials, and each of the layers can be formed of a single material or a combination of materials. In some implementations, the optical stack 16 can include a single semi-transparent thickness of metal or semiconductor which serves as both an optical absorber and conductor, while different, more conductive layers or portions (e.g., of the optical stack 16 or of other structures of the IMOD) can serve to bus signals between IMOD pixels. The optical stack 16 also can include one or more insulating or dielectric layers covering one or more conductive layers or a conductive/absorptive layer.

In some implementations, the layer(s) of the optical stack 16 can be patterned into parallel strips, and may form row electrodes in a display device as described further below. As will be understood by one having skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of posts 18 and an intervening sacrificial material deposited between the posts 18. When the sacrificial material is etched away, a defined gap 19, or optical cavity, can be formed between the movable reflective layer 14 and the optical stack 16. In some implementations, the spacing between posts 18 may be approximately 1-1000 um, while the gap 19 may be on the order of less than 10,000 Angstroms (Å).

In some implementations, each pixel of the IMOD, whether in the actuated or relaxed state, is essentially a capacitor formed by the fixed and moving reflective layers. When no voltage is applied, the movable reflective layer 14 remains in a mechanically relaxed state, as illustrated by the pixel 12 on the left in FIG. 1, with the gap 19 between the movable reflective layer 14 and optical stack 16. However, when a potential difference, e.g., voltage, is applied to at least one of a selected row and column, the capacitor formed at the intersection of the row and column electrodes at the corresponding pixel becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated pixel 12 on the right in FIG. 1. The behavior is the same regardless of the polarity of the applied potential difference. Though a series of pixels in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
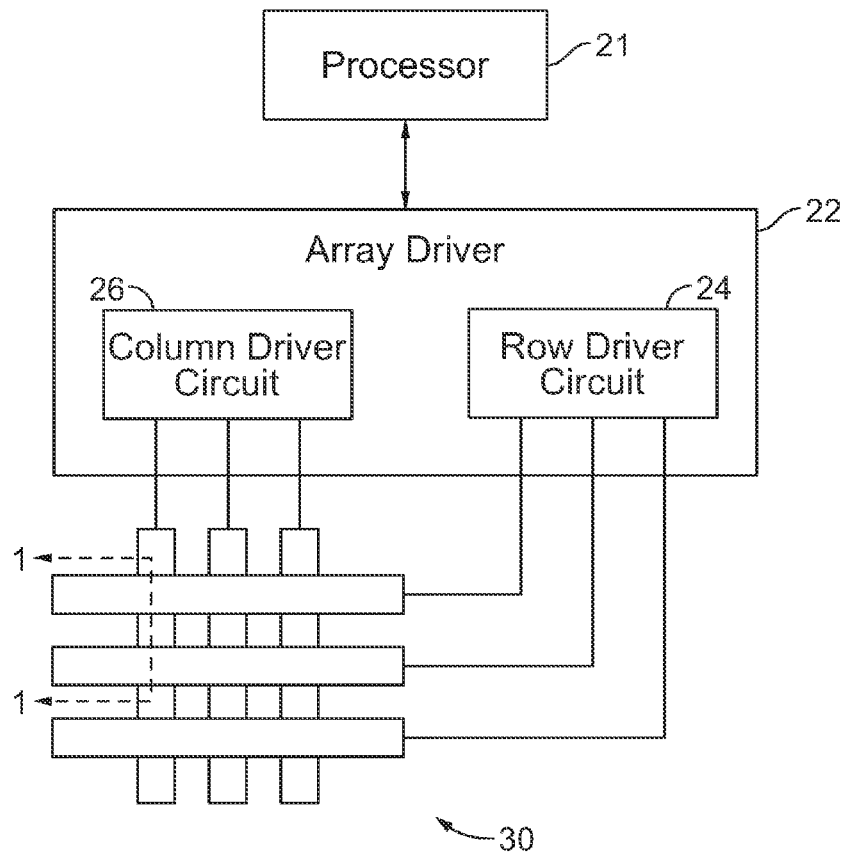
FIG. 2 shows an example of a system block diagram illustrating an electronic device incorporating a 3×3 interferometric modulator display.

FIG. 2 shows an example of a system block diagram illustrating an electronic device incorporating a 3×3 interferometric modulator display. The electronic device includes a processor 21 that may be configured to execute one or more software modules. In addition to executing an operating system, the processor 21 may be configured to execute one or more software applications, including a web browser, a telephone application, an email program, or any other software application.

The processor 21 can be configured to communicate with an array driver 22. The array driver 22 can include a row driver circuit 24 and a column driver circuit 26 that provide signals to, e.g., a display array or panel 30. The cross section of the IMOD display device illustrated in FIG. 1 is shown by the lines 1-1 in FIG. 2. Although FIG. 2 illustrates a 3×3 array of IMODs for the sake of clarity, the display array 30 may contain a very large number of IMODs, and may have a different number of IMODs in rows than in columns, and vice versa.

Figures 3, 4:
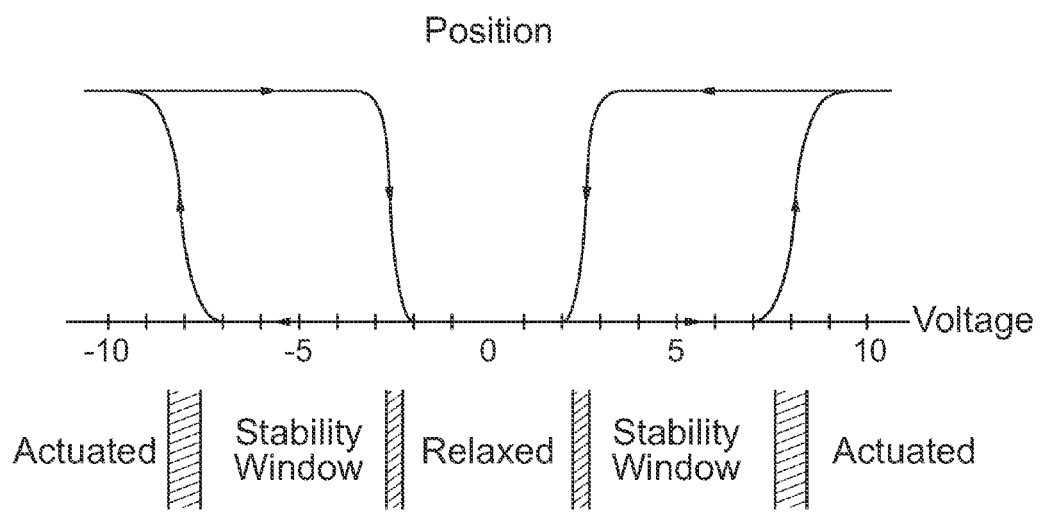
FIG. 3 shows an example of a diagram illustrating movable reflective layer position versus applied voltage for the interferometric modulator of FIG. 1.
FIG. 4 shows an example of a table illustrating various states of an interferometric modulator when various common and segment voltages are applied.

FIG. 3 shows an example of a diagram illustrating movable reflective layer position versus applied voltage for the interferometric modulator of FIG. 1. For MEMS interferometric modulators, the row/column (i.e., common/segment) write procedure may take advantage of a hysteresis property of these devices as illustrated in FIG. 3. An interferometric modulator may use, for example, about a 10-volt potential difference to cause the movable reflective layer, or mirror, to change from the relaxed state to the actuated state. When the voltage is reduced from that value, the movable reflective layer maintains its state as the voltage drops back below, e.g., 10-volts, however, the movable reflective layer does not relax completely until the voltage drops below 2-volts. Thus, a range of voltage, approximately 3 to 7-volts, as shown in FIG. 3, exists where there is a window of applied voltage within which the device is stable in either the relaxed or actuated state. This is referred to herein as the "hysteresis window" or "stability window." For a display array 30 having the hysteresis characteristics of FIG. 3, the row/column write procedure can be designed to address one or more rows at a time, such that during the addressing of a given row, pixels in the addressed row that are to be actuated are exposed to a voltage difference of about 10-volts, and pixels that are to be relaxed are exposed to a voltage difference of near zero volts. After addressing, the pixels are exposed to a steady state or bias voltage difference of approximately 5-volts such that they remain in the previous strobing state. In this example, after being addressed, each pixel sees a potential difference within the "stability window" of about 3-7-volts. This hysteresis property feature enables the pixel design, e.g., illustrated in FIG. 1, to remain stable in either an actuated or relaxed pre-existing state under the same applied voltage conditions. Since each IMOD pixel, whether in the actuated or relaxed state, is essentially a capacitor formed by the fixed and moving reflective layers, this stable state can be held at a steady voltage within the hysteresis window without substantially consuming or losing power. Moreover, essentially little or no current flows into the IMOD pixel if the applied voltage potential remains substantially fixed.

In some implementations, a frame of an image may be created by applying data signals in the form of "segment" voltages along the set of column electrodes, in accordance with the desired change (if any) to the state of the pixels in a given row. Each row of the array can be addressed in turn, such that the frame is written one row at a time. To write the desired data to the pixels in a first row, segment voltages corresponding to the desired state of the pixels in the first row can be applied on the column electrodes, and a first row pulse in the form of a specific "common" voltage or signal can be applied to the first row electrode. The set of segment voltages can then be changed to correspond to the desired change (if any) to the state of the pixels in the second row, and a second common voltage can be applied to the second row electrode. In some implementations, the pixels in the first row are unaffected by the change in the segment voltages applied along the column electrodes, and remain in the state they were set to during the first common voltage row pulse. This process may be repeated for the entire series of rows, or alternatively, columns, in a sequential fashion to produce the image frame. The frames can be refreshed and/or updated with new image data by continually repeating this process at some desired number of frames per second.

The combination of segment and common signals applied across each pixel (that is, the potential difference across each pixel) determines the resulting state of each pixel. FIG. 4 shows an example of a table illustrating various states of an interferometric modulator when various common and segment voltages are applied. As will be readily understood by one having ordinary skill in the art, the "segment" voltages can be applied to either the column electrodes or the row electrodes, and the "common" voltages can be applied to the other of the column electrodes or the row electrodes.

As illustrated in FIG. 4 (as well as in the timing diagram shown in FIG. 5B), when a release voltage $VC_{REL}$ is applied along a common line, all interferometric modulator elements along the common line will be placed in a relaxed state, alternatively referred to as a released or unactuated state, regardless of the voltage applied along the segment lines, i.e., high segment voltage $VS_H$ and low segment voltage $VS_L$. In particular, when the release voltage $VC_{REL}$ is applied along a common line, the potential voltage across the modulator (alternatively referred to as a pixel voltage) is within the relaxation window (see FIG. 3, also referred to as a release window) both when the high segment voltage $VS_H$ and the low segment voltage $VS_L$ are applied along the corresponding segment line for that pixel.

When a hold voltage is applied on a common line, such as a high hold voltage $VC_{HOLD\_H}$ or a low hold voltage $VC_{HOLD\_L}$, the state of the interferometric modulator will remain constant. For example, a relaxed IMOD will remain in a relaxed position, and an actuated IMOD will remain in an actuated position. The hold voltages can be selected such that the pixel voltage will remain within a stability window both when the high segment voltage $VS_H$ and the low segment voltage $VS_L$ are applied along the corresponding segment line. Thus, the segment voltage swing, i.e., the difference between the high $VS_H$ and low segment voltage $VS_L$, is less than the width of either the positive or the negative stability window.

When an addressing, or actuation, voltage is applied on a common line, such as a high addressing voltage $VC_{ADD\_H}$ or a low addressing voltage $VC_{ADD\_L}$, data can be selectively written to the modulators along that line by application of segment voltages along the respective segment lines. The segment voltages may be selected such that actuation is dependent upon the segment voltage applied. When an addressing voltage is applied along a common line, application of one segment voltage will result in a pixel voltage within a stability window, causing the pixel to remain unactuated. In contrast, application of the other segment voltage will result in a pixel voltage beyond the stability window, resulting in actuation of the pixel. The particular segment voltage which causes actuation can vary depending upon which addressing voltage is used. In some implementations, when the high addressing voltage $VC_{ADD\_H}$ is applied along the common line, application of the high segment voltage $VS_H$ can cause a modulator to remain in its current position, while application of the low segment voltage $VS_L$ can cause actuation of the modulator. As a corollary, the effect of the segment voltages can be the opposite when a low addressing voltage $VC_{ADD\_L}$ is applied, with high segment voltage $VS_H$ causing actuation of the modulator, and low segment voltage $VS_L$ having no effect (i.e., remaining stable) on the state of the modulator.

In some implementations, hold voltages, address voltages, and segment voltages may be used which produce the same polarity potential difference across the modulators. In some other implementations, signals can be used which alternate the polarity of the potential difference of the modulators. Alternation of the polarity across the modulators (that is, alternation of the polarity of write procedures) may reduce or inhibit charge accumulation which could occur after repeated write operations of a single polarity.

Figure 5A:
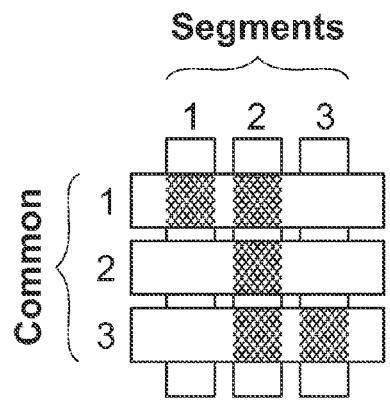
FIG. 5A shows an example of a diagram illustrating a frame of display data in the 3×3 interferometric modulator display of FIG. 2.
Figure 5B:
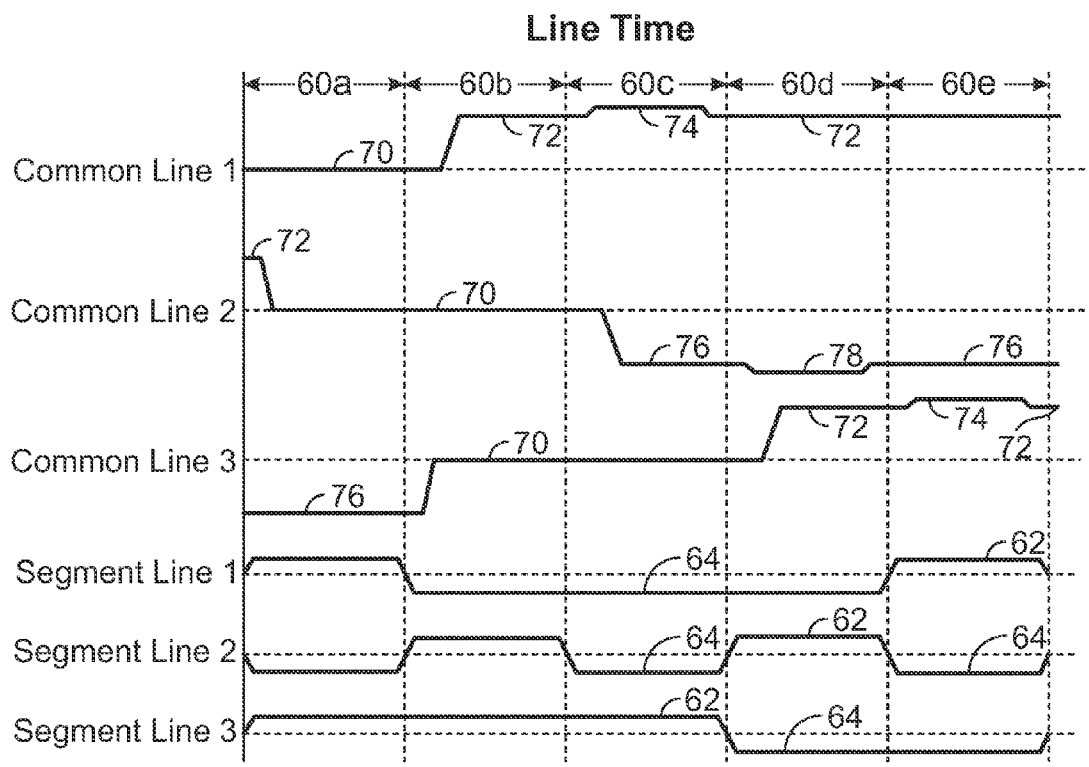
FIG. 5B shows an example of a timing diagram for common and segment signals that may be used to write the frame of display data illustrated in FIG. 5A.

FIG. 5A shows an example of a diagram illustrating a frame of display data in the 3×3 interferometric modulator display of FIG. 2. FIG. 5B shows an example of a timing diagram for common and segment signals that may be used to write the frame of display data illustrated in FIG. 5A. The signals can be applied to the, e.g., 3×3 array of FIG. 2, which will ultimately result in the line time 60e display arrangement illustrated in FIG. 5A. The actuated modulators in FIG. 5A are in a dark-state, i.e., where a substantial portion of the reflected light is outside of the visible spectrum so as to result in a dark appearance to, e.g., a viewer. Prior to writing the frame illustrated in FIG. 5A, the pixels can be in any state, but the write procedure illustrated in the timing diagram of FIG. 5B presumes that each modulator has been released and resides in an unactuated state before the first line time 60a.

During the first line time 60a, a release voltage 70 is applied on common line 1; the voltage applied on common line 2 begins at a high hold voltage 72 and moves to a release voltage 70; and a low hold voltage 76 is applied along common line 3. Thus, the modulators (common 1, segment 1), (1,2) and (1,3) along common line 1 remain in a relaxed, or unactuated, state for the duration of the first line time 60a, the modulators (2,1), (2,2) and (2,3) along common line 2 will move to a relaxed state, and the modulators (3,1), (3,2) and (3,3) along common line 3 will remain in their previous state. With reference to FIG. 4, the segment voltages applied along segment lines 1, 2 and 3 will have no effect on the state of the interferometric modulators, as none of common lines 1, 2 or 3 are being exposed to voltage levels causing actuation during line time 60a (i.e., $VC_{REL}$-relax and $VC_{HOLD\_L}$-stable).

During the second line time 60b, the voltage on common line 1 moves to a high hold voltage 72, and all modulators along common line 1 remain in a relaxed state regardless of the segment voltage applied because no addressing, or actuation, voltage was applied on the common line 1. The modulators along common line 2 remain in a relaxed state due to the application of the release voltage 70, and the modulators (3,1), (3,2) and (3,3) along common line 3 will relax when the voltage along common line 3 moves to a release voltage 70.

During the third line time 60c, common line 1 is addressed by applying a high address voltage 74 on common line 1. Because a low segment voltage 64 is applied along segment lines 1 and 2 during the application of this address voltage, the pixel voltage across modulators (1,1) and (1,2) is greater than the high end of the positive stability window (i.e., the voltage differential exceeded a predefined threshold) of the modulators, and the modulators (1,1) and (1,2) are actuated. Conversely, because a high segment voltage 62 is applied along segment line 3, the pixel voltage across modulator (1,3) is less than that of modulators (1,1) and (1,2), and remains within the positive stability window of the modulator; modulator (1,3) thus remains relaxed. Also during line time 60c, the voltage along common line 2 decreases to a low hold voltage 76, and the voltage along common line 3 remains at a release voltage 70, leaving the modulators along common lines 2 and 3 in a relaxed position.

During the fourth line time 60d, the voltage on common line 1 returns to a high hold voltage 72, leaving the modulators along common line 1 in their respective addressed states. The voltage on common line 2 is decreased to a low address voltage 78. Because a high segment voltage 62 is applied along segment line 2, the pixel voltage across modulator (2,2) is below the lower end of the negative stability window of the modulator, causing the modulator (2,2) to actuate. Conversely, because a low segment voltage 64 is applied along segment lines 1 and 3, the modulators (2,1) and (2,3) remain in a relaxed position. The voltage on common line 3 increases to a high hold voltage 72, leaving the modulators along common line 3 in a relaxed state.

Finally, during the fifth line time 60e, the voltage on common line 1 remains at high hold voltage 72, and the voltage on common line 2 remains at a low hold voltage 76, leaving the modulators along common lines 1 and 2 in their respective addressed states. The voltage on common line 3 increases to a high address voltage 74 to address the modulators along common line 3. As a low segment voltage 64 is applied on segment lines 2 and 3, the modulators (3,2) and (3,3) actuate, while the high segment voltage 62 applied along segment line 1 causes modulator (3,1) to remain in a relaxed position. Thus, at the end of the fifth line time 60e, the 3×3 pixel array is in the state shown in FIG. 5A, and will remain in that state as long as the hold voltages are applied along the common lines, regardless of variations in the segment voltage which may occur when modulators along other common lines (not shown) are being addressed.

In the timing diagram of FIG. 5B, a given write procedure (i.e., line times 60a-60e) can include the use of either high hold and address voltages, or low hold and address voltages. Once the write procedure has been completed for a given common line (and the common voltage is set to the hold voltage having the same polarity as the actuation voltage), the pixel voltage remains within a given stability window, and does not pass through the relaxation window until a release voltage is applied on that common line. Furthermore, as each modulator is released as part of the write procedure prior to addressing the modulator, the actuation time of a modulator, rather than the release time, may determine the line time. Specifically, in implementations in which the release time of a modulator is greater than the actuation time, the release voltage may be applied for longer than a single line time, as depicted in FIG. 5B. In some other implementations, voltages applied along common lines or segment lines may vary to account for variations in the actuation and release voltages of different modulators, such as modulators of different colors.

Figure 6A:
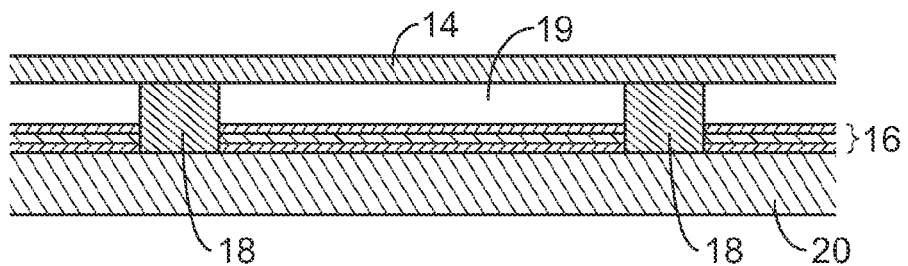
FIG. 6A shows an example of a partial cross-section of the interferometric modulator display of FIG. 1.
Figure 6B:
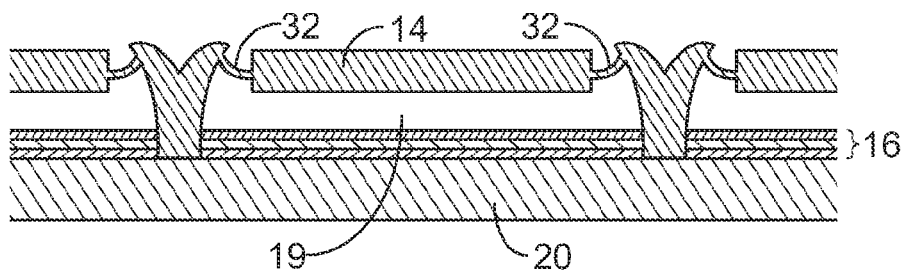
FIGS. 6B-6E show examples of cross-sections of varying implementations of interferometric modulators.
Figure 6C:
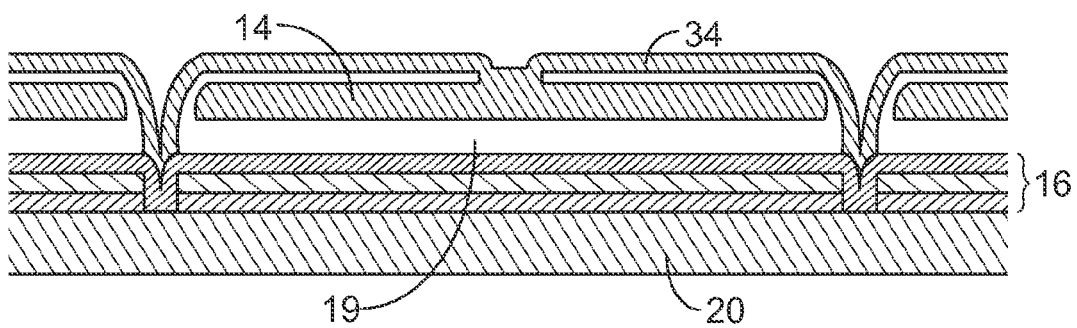

The details of the structure of interferometric modulators that operate in accordance with the principles set forth above may vary widely. For example, FIGS. 6A-6E show examples of cross-sections of varying implementations of interferometric modulators, including the movable reflective layer 14 and its supporting structures. FIG. 6A shows an example of a partial cross-section of the interferometric modulator display of FIG. 1, where a strip of metal material, i.e., the movable reflective layer 14 is deposited on supports 18 extending orthogonally from the substrate 20. In FIG. 6B, the movable reflective layer 14 of each IMOD is generally square or rectangular in shape and attached to supports at or near the corners, on tethers 32. In FIG. 6C, the movable reflective layer 14 is generally square or rectangular in shape and suspended from a deformable layer 34, which may include a flexible metal. The deformable layer 34 can connect, directly or indirectly, to the substrate 20 around the perimeter of the movable reflective layer 14. These connections are herein referred to as support posts. The implementation shown in FIG. 6C has additional benefits deriving from the decoupling of the optical functions of the movable reflective layer 14 from its mechanical functions, which are carried out by the deformable layer 34. This decoupling allows the structural design and materials used for the movable reflective layer 14 and those used for the deformable layer 34 to be optimized independently of one another.

Figure 6D:
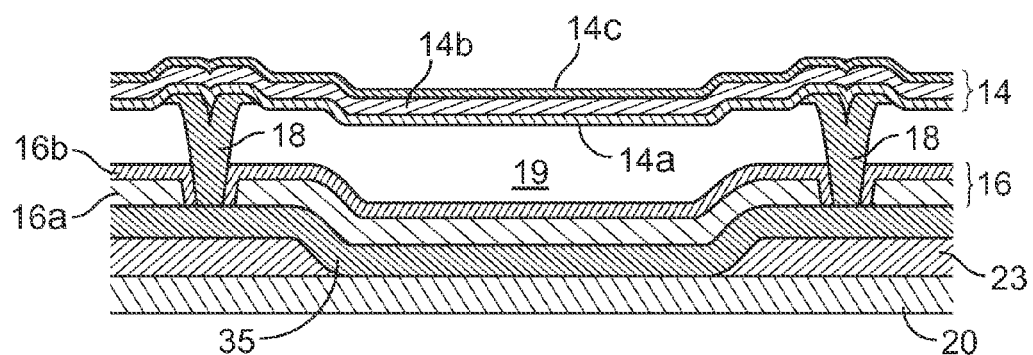

FIG. 6D shows another example of an IMOD, where the movable reflective layer 14 includes a reflective sub-layer 14a. The movable reflective layer 14 rests on a support structure, such as support posts 18. The support posts 18 provide separation of the movable reflective layer 14 from the lower stationary electrode (i.e., a portion of the optical stack 16 in the illustrated IMOD) so that a gap 19 is formed between the movable reflective layer 14 and the optical stack 16, for example when the movable reflective layer 14 is in a relaxed position. The movable reflective layer 14 also can include a conductive layer 14c, which may be configured to serve as an electrode, and a support layer 14b. In this example, the conductive layer 14c is disposed on one side of the support layer 14b, distal from the substrate 20, and the reflective sub-layer 14a is disposed on the other side of the support layer 14b, proximal to the substrate 20. In some implementations, the reflective sub-layer 14a can be conductive and can be disposed between the support layer 14b and the optical stack 16. The support layer 14b can include one or more layers of a dielectric material, for example, silicon oxynitride (SiON) or silicon dioxide ($SiO_2$). In some implementations, the support layer 14b can be a stack of layers, such as, for example, a $SiO_2$/SiON/$SiO_2$ tri-layer stack. Either or both of the reflective sub-layer 14a and the conductive layer 14c can include, e.g., an aluminum (Al) alloy with about 0.5% copper (Cu), or another reflective material. Employing conductive layers 14a, 14c above and below the dielectric support layer 14b can balance stresses and provide enhanced conduction. In some implementations, the reflective sub-layer 14a and the conductive layer 14c can be formed of different materials for a variety of design purposes, such as achieving specific stress profiles within the movable reflective layer 14.

As illustrated in FIG. 6D, some implementations also can include a black mask structure 23. The black mask structure 23 can be formed in optically inactive regions (e.g., between pixels or under posts 18) to absorb ambient or stray light. The black mask structure 23 also can improve the optical properties of a display device by inhibiting light from being reflected from or transmitted through inactive portions of the display, thereby increasing the contrast ratio. Additionally, the black mask structure 23 can be conductive and be configured to function as an electrical bussing layer. In some implementations, the row electrodes can be connected to the black mask structure 23 to reduce the resistance of the connected row electrode. The black mask structure 23 can be formed using a variety of methods, including deposition and patterning techniques. The black mask structure 23 can include one or more layers. For example, in some implementations, the black mask structure 23 includes a molybdenum-chromium (MoCr) layer that serves as an optical absorber, a silicon dioxide ($SiO_2$) layer, and an aluminum alloy that serves as a reflector and a bussing layer, with a thickness in the range of about 30-80 Å, 500-1000 Å, and 500-6000 Å, respectively. The one or more layers can be patterned using a variety of techniques, including photolithography and dry etching, including, for example, carbon tetrafluoromethane ($CF_4$) and/or oxygen ($O_2$) for the MoCr and $SiO_2$ layers and chlorine ($Cl_2$) and/or boron trichloride ($BCl_3$) for the aluminum alloy layer. In some implementations, the black mask 23 can be an etalon or interferometric stack structure. In such interferometric stack black mask structures 23, the conductive reflectors can be used to transmit or bus signals between lower, stationary electrodes in the optical stack 16 of each row or column. In some implementations, a spacer layer 35 can serve to generally electrically isolate the absorber layer 16a from the conductive layers in the black mask 23.

Figure 6E:
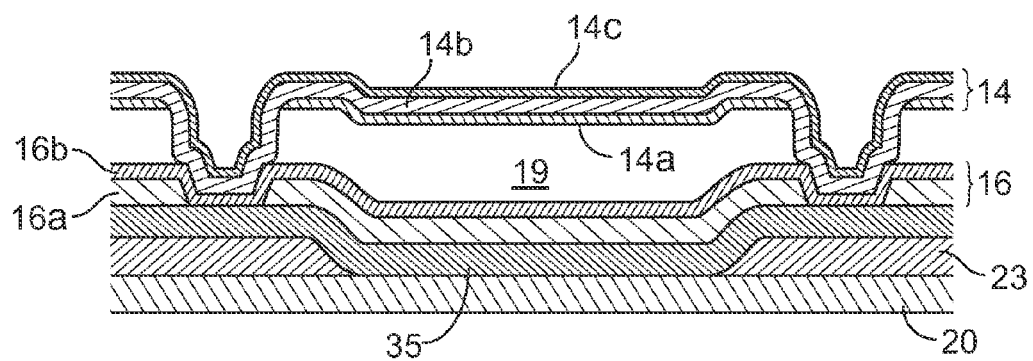

FIG. 6E shows another example of an IMOD, where the movable reflective layer 14 is self supporting. In contrast with FIG. 6D, the implementation of FIG. 6E does not include support posts 18. Instead, the movable reflective layer 14 contacts the underlying optical stack 16 at multiple locations, and the curvature of the movable reflective layer 14 provides sufficient support that the movable reflective layer 14 returns to the unactuated position of FIG. 6E when the voltage across the interferometric modulator is insufficient to cause actuation. The optical stack 16, which may contain a plurality of several different layers, is shown here for clarity including an optical absorber 16a, and a dielectric 16b. In some implementations, the optical absorber 16a may serve both as a fixed electrode and as a partially reflective layer.

In implementations such as those shown in FIGS. 6A-6E, the IMODs function as direct-view devices, in which images are viewed from the front side of the transparent substrate 20, i.e., the side opposite to that upon which the modulator is arranged. In these implementations, the back portions of the device (that is, any portion of the display device behind the movable reflective layer 14, including, for example, the deformable layer 34 illustrated in FIG. 6C) can be configured and operated upon without impacting or negatively affecting the image quality of the display device, because the reflective layer 14 optically shields those portions of the device. For example, in some implementations a bus structure (not illustrated) can be included behind the movable reflective layer 14 which provides the ability to separate the optical properties of the modulator from the electromechanical properties of the modulator, such as voltage addressing and the movements that result from such addressing. Additionally, the implementations of FIGS. 6A-6E can simplify processing, such as, e.g., patterning.

Figure 7:
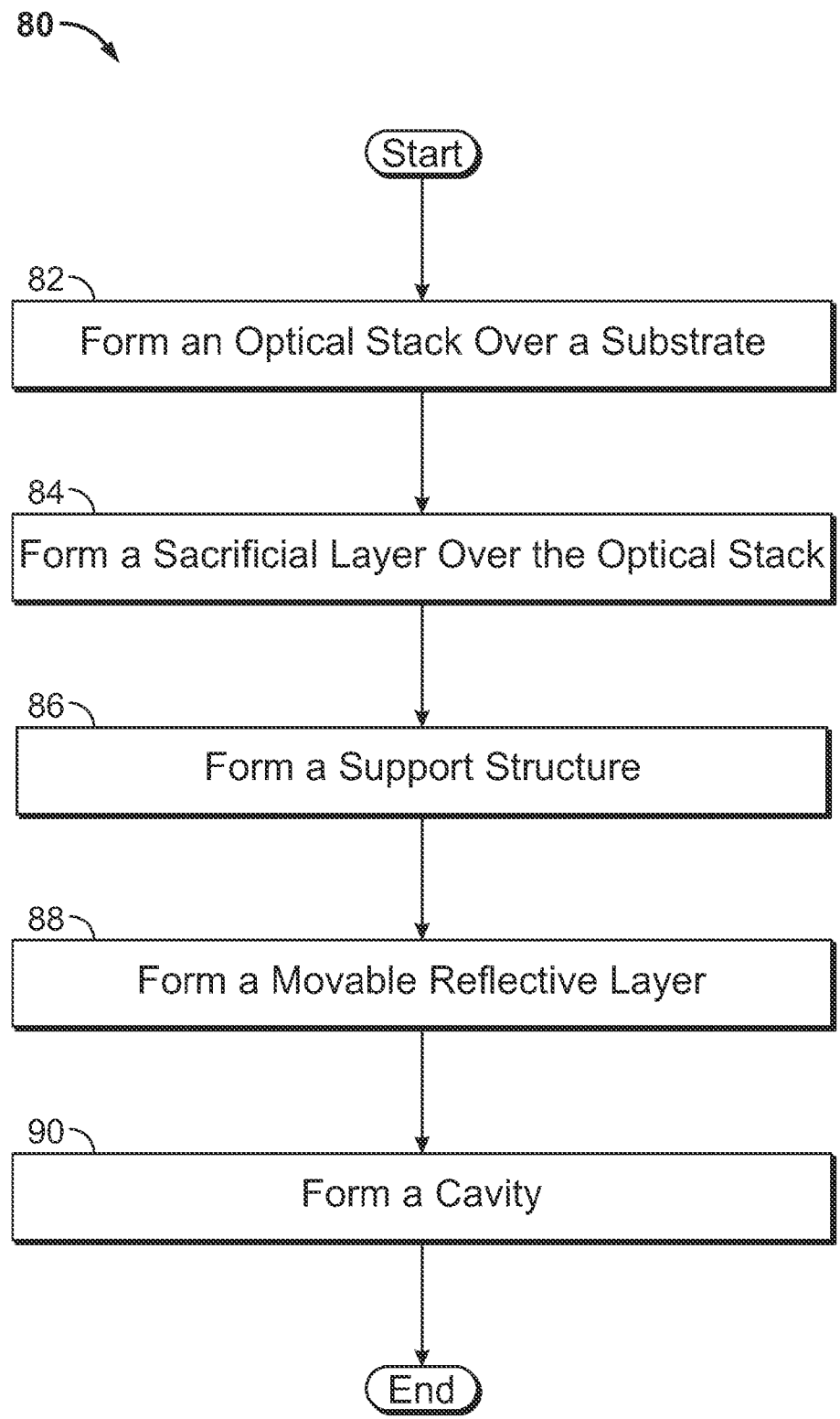
FIG. 7 shows an example of a flow diagram illustrating a manufacturing process for an interferometric modulator.
Figure 8A:
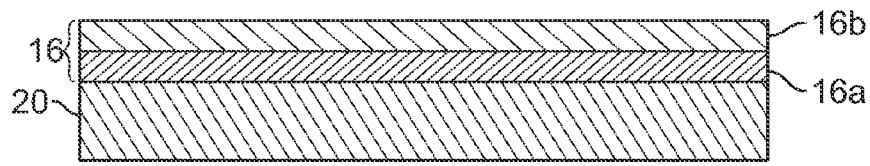
FIGS. 8A-8E show examples of cross-sectional schematic illustrations of various stages in a method of making an interferometric modulator.

FIG. 7 shows an example of a flow diagram illustrating a manufacturing process 80 for an interferometric modulator, and FIGS. 8A-8E show examples of cross-sectional schematic illustrations of corresponding stages of such a manufacturing process 80. In some implementations, the manufacturing process 80 can be implemented to manufacture, e.g., interferometric modulators of the general type illustrated in FIGS. 1 and 6, in addition to other blocks not shown in FIG. 7. With reference to FIGS. 1, 6 and 7, the process 80 begins at block 82 with the formation of the optical stack 16 over the substrate 20. FIG. 8A illustrates such an optical stack 16 formed over the substrate 20. The substrate 20 may be a transparent substrate such as glass or plastic, it may be flexible or relatively stiff and unbending, and may have been subjected to prior preparation processes, e.g., cleaning, to facilitate efficient formation of the optical stack 16. As discussed above, the optical stack 16 can be electrically conductive, partially transparent and partially reflective and may be fabricated, for example, by depositing one or more layers having the desired properties onto the transparent substrate 20. In FIG. 8A, the optical stack 16 includes a multilayer structure having sub-layers 16a and 16b, although more or fewer sub-layers may be included in some other implementations. In some implementations, one of the sub-layers 16a, 16b can be configured with both optically absorptive and conductive properties, such as the combined conductor/absorber sub-layer 16a. Additionally, one or more of the sub-layers 16a, 16b can be patterned into parallel strips, and may form row electrodes in a display device. Such patterning can be performed by a masking and etching process or another suitable process known in the art. In some implementations, one of the sub-layers 16a, 16b can be an insulating or dielectric layer, such as sub-layer 16b that is deposited over one or more metal layers (e.g., one or more reflective and/or conductive layers). In addition, the optical stack 16 can be patterned into individual and parallel strips that form the rows of the display.

Figure 8B:
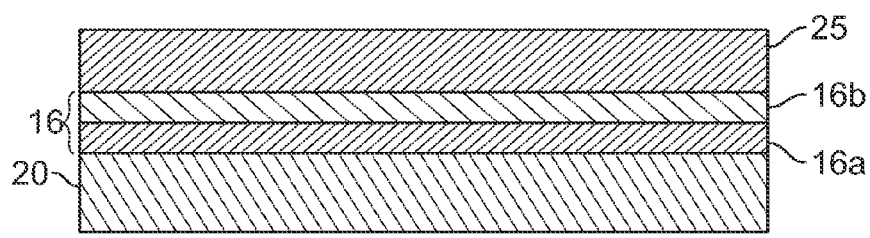

The process 80 continues at block 84 with the formation of a sacrificial layer 25 over the optical stack 16. The sacrificial layer 25 is later removed (e.g., at block 90) to form the cavity 19 and thus the sacrificial layer 25 is not shown in the resulting interferometric modulators 12 illustrated in FIG. 1. FIG. 8B illustrates a partially fabricated device including a sacrificial layer 25 formed over the optical stack 16. The formation of the sacrificial layer 25 over the optical stack 16 may include deposition of a xenon difluoride ($XeF_2$)-etchable material such as molybdenum (Mo) or amorphous silicon (a-Si), in a thickness selected to provide, after subsequent removal, a gap or cavity 19 (see also FIGS. 1 and 8E) having a desired design size. Deposition of the sacrificial material may be carried out using deposition techniques such as physical vapor deposition (PVD, e.g., sputtering), plasma-enhanced chemical vapor deposition (PECVD), thermal chemical vapor deposition (thermal CVD), or spin-coating.

Figure 8C:
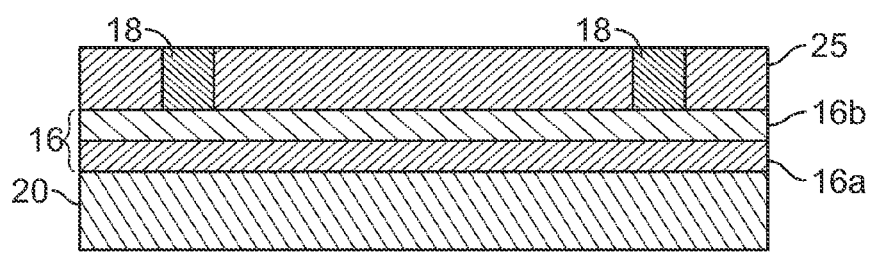

The process 80 continues at block 86 with the formation of a support structure e.g., a post 18 as illustrated in FIGS. 1, 6 and 8C. The formation of the post 18 may include patterning the sacrificial layer 25 to form a support structure aperture, then depositing a material (e.g., a polymer or an inorganic material, e.g., silicon oxide) into the aperture to form the post 18, using a deposition method such as PVD, PECVD, thermal CVD, or spin-coating. In some implementations, the support structure aperture formed in the sacrificial layer can extend through both the sacrificial layer 25 and the optical stack 16 to the underlying substrate 20, so that the lower end of the post 18 contacts the substrate 20 as illustrated in FIG. 6A. Alternatively, as depicted in FIG. 8C, the aperture formed in the sacrificial layer 25 can extend through the sacrificial layer 25, but not through the optical stack 16. For example, FIG. 8E illustrates the lower ends of the support posts 18 in contact with an upper surface of the optical stack 16. The post 18, or other support structures, may be formed by depositing a layer of support structure material over the sacrificial layer 25 and patterning to remove portions of the support structure material located away from apertures in the sacrificial layer 25. The support structures may be located within the apertures, as illustrated in FIG. 8C, but also can, at least partially, extend over a portion of the sacrificial layer 25. As noted above, the patterning of the sacrificial layer 25 and/or the support posts 18 can be performed by a patterning and etching process, but also may be performed by alternative etching methods.

Figure 8D:
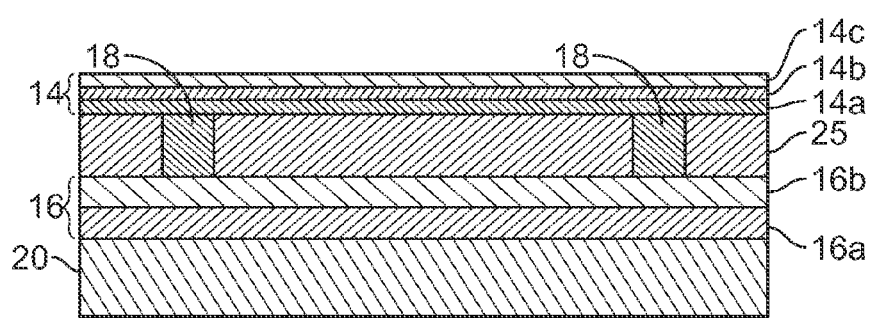
Figure 8E:
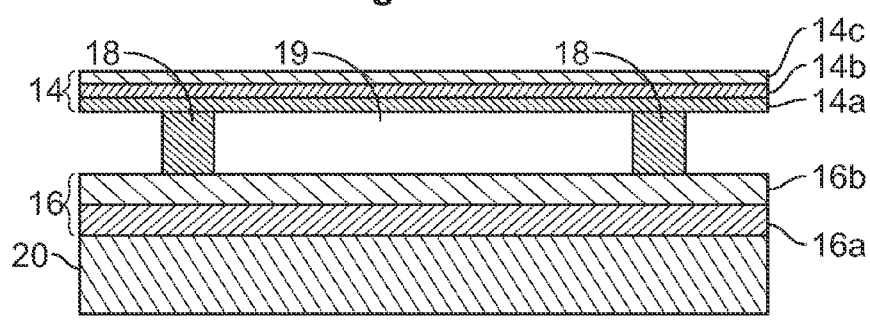

The process 80 continues at block 88 with the formation of a movable reflective layer or membrane such as the movable reflective layer 14 illustrated in FIGS. 1, 6 and 8D. The movable reflective layer 14 may be formed by employing one or more deposition steps, e.g., reflective layer (e.g., aluminum, aluminum alloy) deposition, along with one or more patterning, masking, and/or etching steps. The movable reflective layer 14 can be electrically conductive, and referred to as an electrically conductive layer. In some implementations, the movable reflective layer 14 may include a plurality of sub-layers 14a, 14b, 14c as shown in FIG. 8D. In some implementations, one or more of the sub-layers, such as sub-layers 14a, 14c, may include highly reflective sub-layers selected for their optical properties, and another sub-layer 14b may include a mechanical sub-layer selected for its mechanical properties. Since the sacrificial layer 25 is still present in the partially fabricated interferometric modulator formed at block 88, the movable reflective layer 14 is typically not movable at this stage. A partially fabricated IMOD that contains a sacrificial layer 25 may also be referred to herein as an "unreleased" IMOD. As described above in connection with FIG. 1, the movable reflective layer 14 can be patterned into individual and parallel strips that form the columns of the display.

The process 80 continues at block 90 with the formation of a cavity, e.g., cavity 19 as illustrated in FIGS. 1, 6 and 8E. The cavity 19 may be formed by exposing the sacrificial material 25 (deposited at block 84) to an etchant. For example, an etchable sacrificial material such as molybdenum (Mo) or amorphous silicon (a-Si) may be removed by dry chemical etching, e.g., by exposing the sacrificial layer 25 to a gaseous or vaporous etchant, such as vapors derived from solid xenon difluoride ($XeF_2$) for a period of time that is effective to remove the desired amount of material, typically selectively removed relative to the structures surrounding the cavity 19. Other etching methods, e.g. wet etching and/or plasma etching, also may be used. Since the sacrificial layer 25 is removed during block 90, the movable reflective layer 14 is typically movable after this stage. After removal of the sacrificial material 25, the resulting fully or partially fabricated IMOD may be referred to herein as a "released" IMOD.

In some implementations, self-supporting electromechanical devices can be formed that do not use a post or rivet structure, but instead use a portion of the mechanical layer to support the rest of the mechanical layer to be positioned above the optical stack. Some examples of implementations of self-supported mechanical layers are illustrated in FIGS. 6C, 6E, 9O, and 10C. Such devices can have a reduced bending height when in the actuated position, which can reduce the portion of the mechanical layer that is not in contact with the optical stack during actuation. In other words, reducing the bending height can increase the overall or side-to-side flatness of the portion of the mechanical layer that is in an optically active area of a pixel, in particular at the edges of the active area pixel. Having a more uniformly flat contact area in the active area of a pixel improves the uniformity of a reflection characteristic of the device when in the actuated state (for example, the "black" state) and can increase contrast ratio, gamut, and/or color saturation of a display using such devices. Additionally, mechanical layers that are configured to be self-supporting also can use a reduced area to anchor the mechanical layer over the substrate (e.g., on the substrate, the optical stack, or another intervening layer between the substrate and the particular regions that the mechanical layer contacts when anchored) at corners of pixels, thereby improving fill factor when the device is disposed in a pixel array.

Figure 9A:
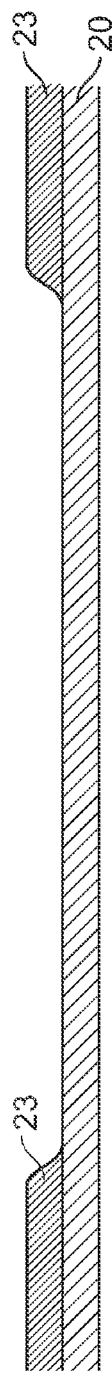
FIGS. 9A-9P show examples of cross-sectional schematic illustrations of various stages in methods of making interferometric modulators according to various implementations.
Figure 9B:
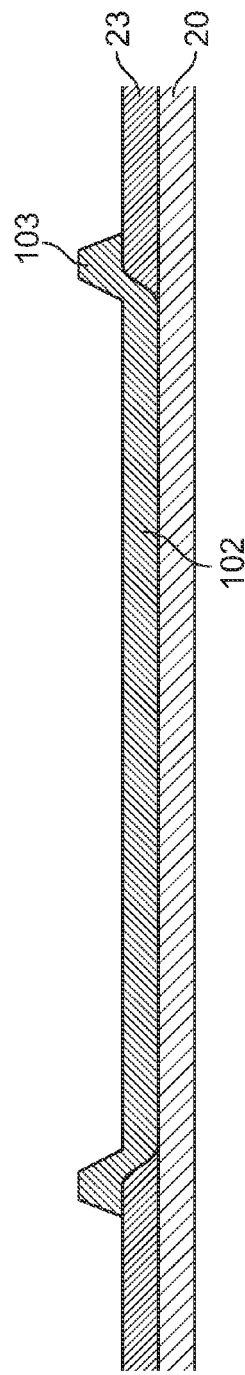
Figure 9C:
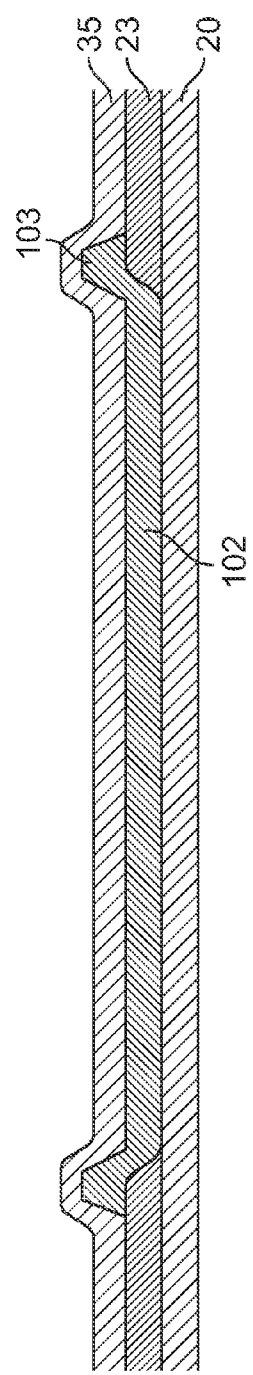
Figure 9D:
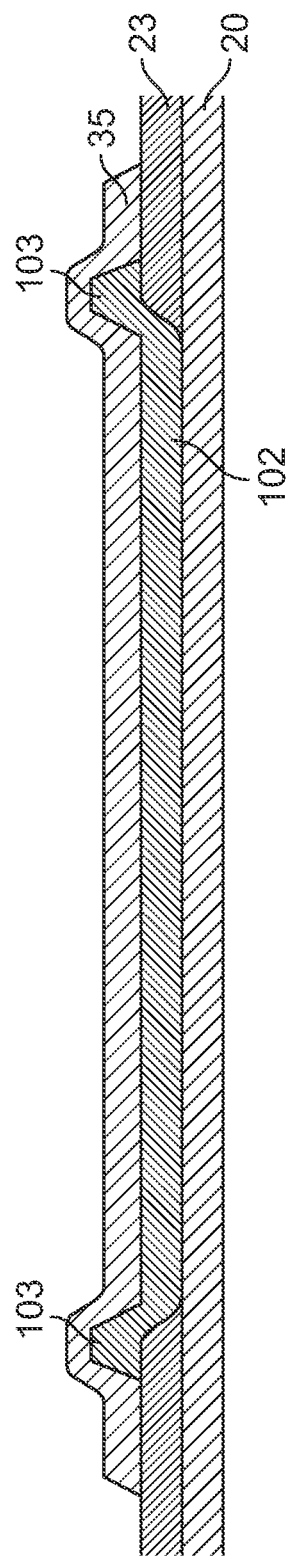
Figure 9E:
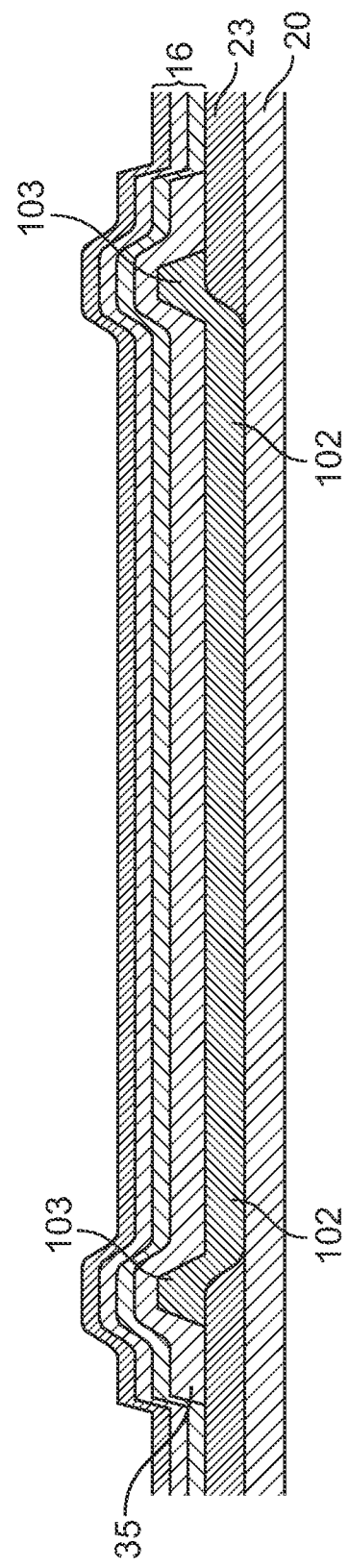
Figure 9H:
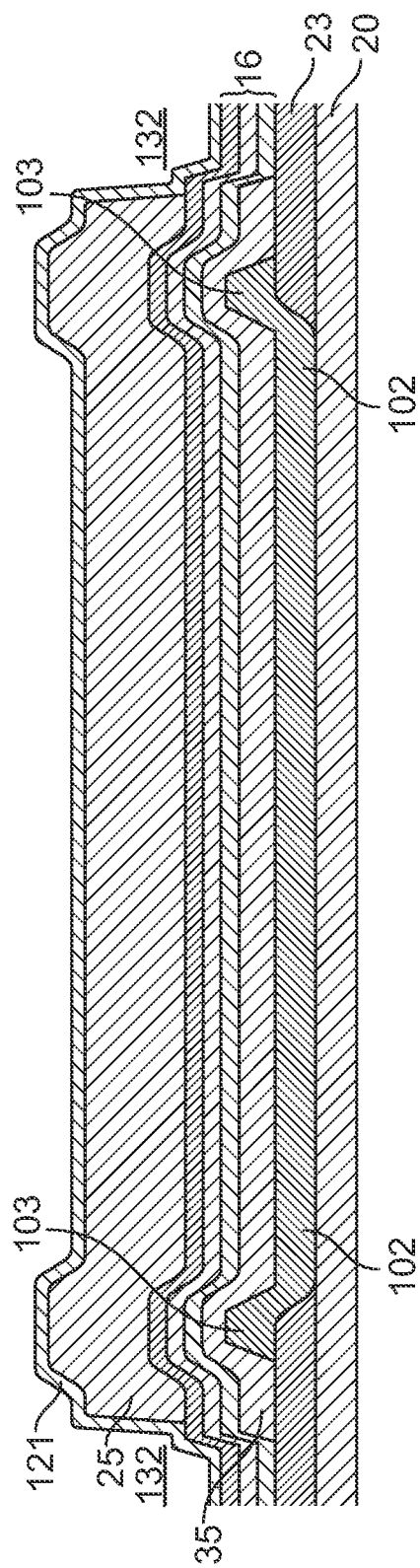
Figure 9I:
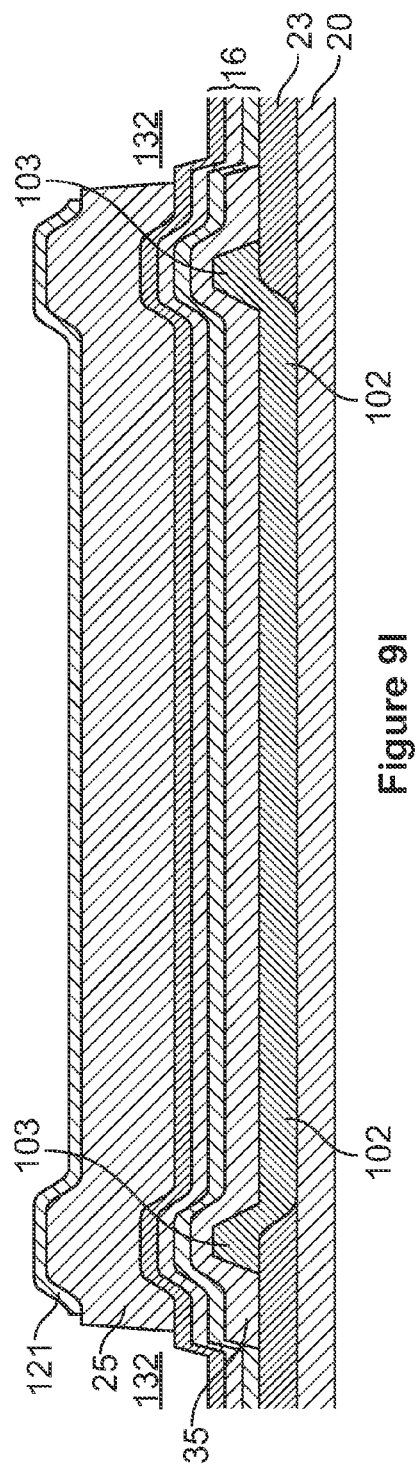
Figure 9J:
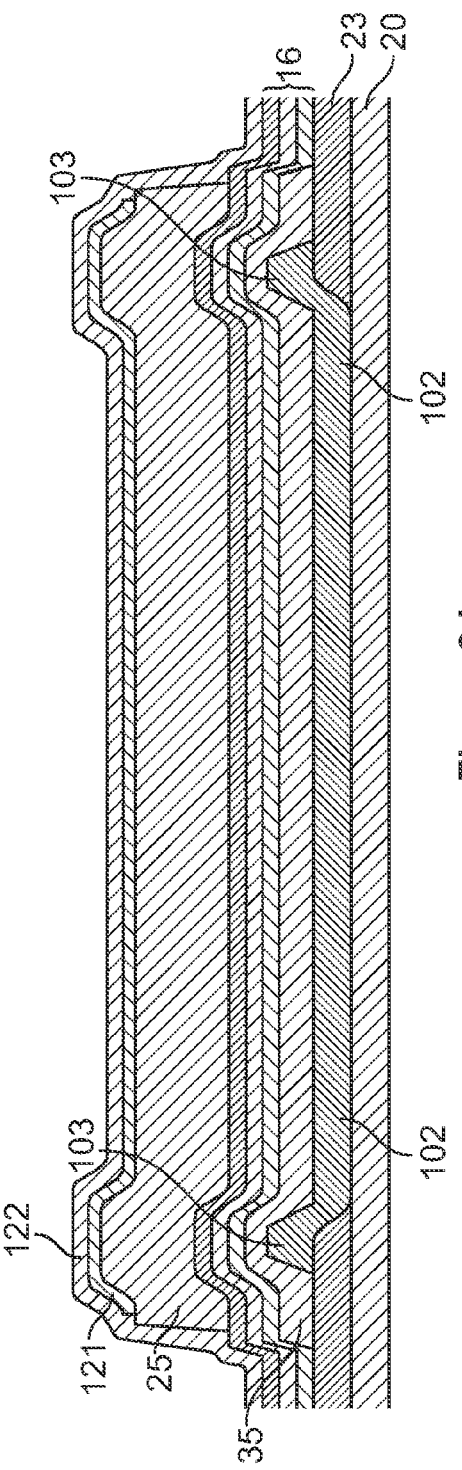
Figure 9O:
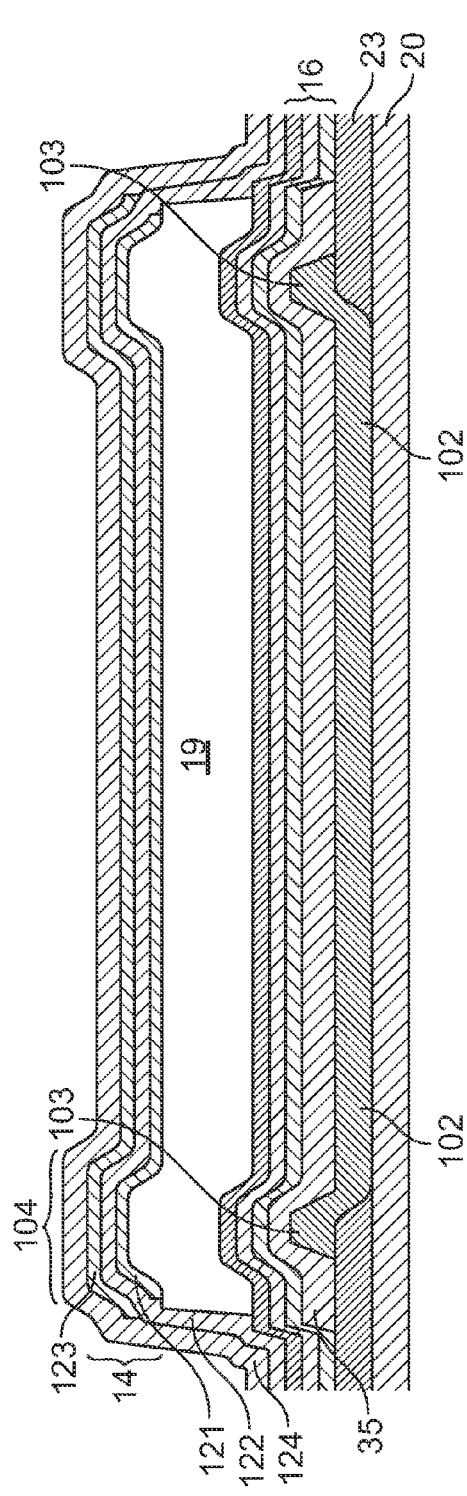
Figure 9P:
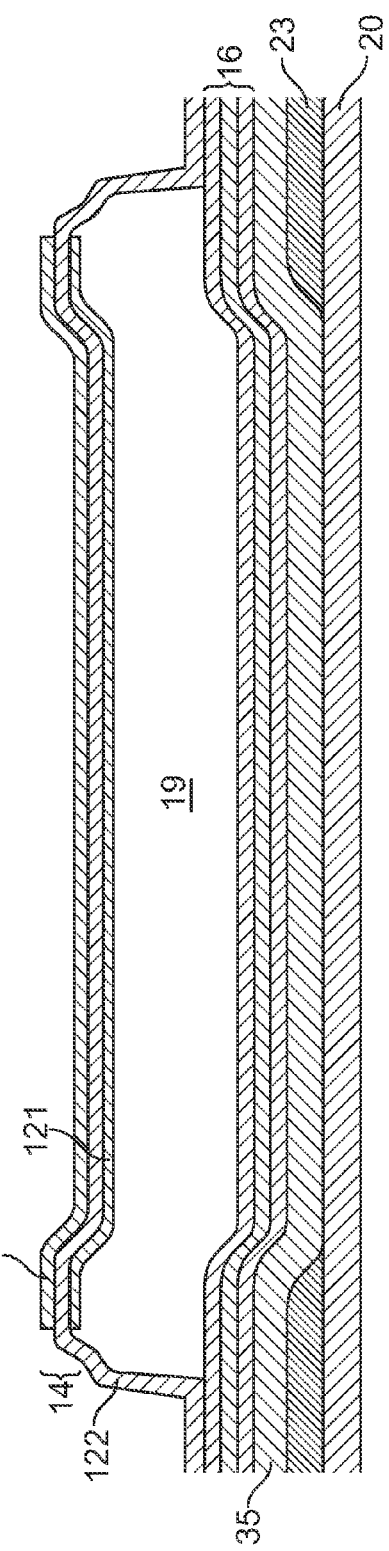

FIGS. 9A-9P show examples of cross-sectional schematic illustrations of various stages in methods of making interferometric modulators according to various implementations. While particular parts and steps are described as suitable for interferometric modulator implementations, in other electromechanical device implementations different materials can be used or parts can be modified, omitted, or added.

In FIG. 9A, a black mask structure 23 has been provided and patterned on a substrate 20. The substrate 20 can be formed from a variety of materials, including glass or a transparent polymeric material which permits images to be viewed through the substrate 20. The substrate 20 can be subjected to one or more prior preparation steps such as, for example, a cleaning step to facilitate efficient formation of black mask structure 23. Additionally, one or more layers can be provided on the substrate before providing the black mask structure 23. For example, in one embodiment, an aluminum oxide layer having a thickness in the range of about 50-250 Å is provided on the substrate before formation of the black mask structure 23, and the aluminum oxide layer can serve as an etch-stop when patterning the black mask structure.

The black mask structure 23 can be configured to absorb ambient or stray light in optically inactive regions (e.g., between pixels) to improve the optical properties of a display device by increasing the contrast ratio. Additionally, the black mask structure 23 can include a plurality of layers, including a conductive layer configured to function as an electrical bussing layer. In one embodiment, the row electrodes are connected to the black mask structure 23 to reduce the resistance of the connected row electrode. The black mask structure 23 can be formed using a variety of methods, including deposition and patterning techniques. As used herein, and as will be understood by one having skill in the art, the term "patterned" is used herein to refer to masking as well as etching processes. Although FIG. 9A is shown as including the black mask structure 23, methods of forming a mechanical layer as described herein also can be applicable to processes lacking the black mask structure 23.

FIG. 9B illustrates providing a shaping structure 102 over the substrate 20 and the black mask structure 23. The shaping structure 102 can include a buffer oxide, such as silicon dioxide ($SiO_2$) and/or silicon oxynitride (SiON), and can aid in maintaining a relatively planar profile across the substrate by filling in gaps between bussing or black mask structures 23. In one embodiment, the shaping structure 102 has a thickness in the range of about 500-6000 Å. However, the shaping structure 102 can have a variety of thicknesses depending on the desired optical properties of the interferometric modulator.

The shaping structure 102 can be used to form a kink in the mechanical layer, as will be described in detail below (for example, in reference to FIG. 9M). In particular, one or more layers, including the mechanical layer, can be deposited over the shaping structure 102, thereby substantially replicating one or more geometric features of the shaping structure 102. For example, as illustrated in FIG. 9B, the shaping structure 102 can overlap the black mask structure 23, thereby forming a protrusion 103. The protrusion 103 can produce an upwardly extending portion wave (or kink) in a subsequently deposited conformal layer, such as a subsequently deposited mechanical layer.

A thickness dimension of the shaping structure 102, including the protrusion 103, can be used to adjust the relative heights of the "rising" and "falling" structural portions of the kink 104. This can affect (or control) stress characteristics in a subsequently deposited mechanical layer to achieve a desired mirror curvature and/or a launch height, as will be described below. In the illustrated example, the thickness and shape of the shaping structure 102 and the thickness of the black mask 23, can affect characteristics or dimensions of the kink 104, for example, its height, symmetry, width and/or the angle of its non-flat portions.

Although various electromechanical systems devices illustrated herein are shown and described as including the shaping structure 102, the methods of forming a mechanical layer as described herein can be applicable to processes lacking the shaping structure 102. For example, the embodiment shown in FIG. 9P is one example of an electromechanical systems device produced as described herein without the shaping structure 102.

FIG. 9C illustrates an example of providing a dielectric structure 35, which is formed over the shaping structure 102 and the black mask 23. FIG. 9D illustrates an example of patterning the dielectric structure 35. Materials used for the dielectric structure 35 can include, for example, silicon dioxide ($SiO_2$), silicon oxynitride (SiON), and/or tetraethyl orthosilicate (TEOS). In one embodiment, the thickness of the dielectric structure 35 is in the range of about 3000-5000 Å. However, the dielectric structure 35 can be configured to have a variety of thicknesses depending on desired optical properties of the modulator. In some implementations, a portion of the dielectric structure 35 can be removed above the black mask structure 23 ("above" here refers to the side of the black mask structure 23 opposite the substrate 20), to permit routing of electrodes (e.g., row electrodes) to the black mask structure 23 in implementations in which the black mask structure 23 serves to bus signals. As illustrated in FIG. 9D, the dielectric structure 35 can be deposited conformally such that the protrusion 103 produces a kink in the dielectric structure 35, and this shape can be propagated up to subsequently deposited conformal layers, as illustrated in FIGS. 9E-9O.

FIG. 9E illustrates an example of providing an optical stack 16 formed over the dielectric structure 35 and the black mask structure 23. The optical stack 16 can include a plurality of layers, including, for example, a transparent conductor, such as indium tin oxide (ITO), a partially reflective optical absorber layer, such as chromium, and a transparent dielectric. The optical stack 16 can thus be electrically conductive, partially transparent and partially reflective. As illustrated in FIG. 9E, one or more layers of the optical stack 16 may physically and electrically contact the black mask structure 23.

FIGS. 9F and 9G illustrate examples of providing a sacrificial layer 25 over the optical stack 16 and patterning the sacrificial layer 25. The sacrificial layer 25 is later removed to form a gap (or cavity). In some implementations, the sacrificial layer 25 can include more than one layer, or include a layer of varying thickness, to aid in the formation of a display device having a multitude of display elements that include different size gaps between the mechanical layer and the optical layer 16. For an interferometric modulator array, each different gap size may produce different reflected color. As shown in FIG. 9G, the sacrificial layer 25 can be removed in the region between pixels to form anchoring holes or regions 132. The anchoring regions 132 is an area formed to permit a subsequently deposited layer, such as a dielectric or supporting layer of a mechanical layer to contact one or more layers underlying the sacrificial layer 25, thereby aiding in forming a self-supporting mechanical layer, as will be described below.

FIG. 9H illustrates implementations having a reflective layer 121 over the sacrificial layer 25 and optical stack 16. FIG. 9I illustrates an example of an implementation after patterning the reflective layer 121 to remove the portion of the reflective layer that is disposed over the anchor regions 132. As illustrated in FIG. 9H, the reflective layer 121 can be provided conformally over the sacrificial layer 25 and the optical stack 16. Thereafter, as shown in FIG. 9I, a portion of the reflective layer 121 over the anchor regions 132 can be removed to permit a subsequently deposited layer to contact the optical stack 16, thereby aiding in the formation of a self-supporting mechanical layer, as will be described in further detail below. The reflective layer 121 can be formed from any suitable reflective material, including, for example, a metal, such as an aluminum alloy. In one implementation, the reflective layer 121 includes aluminum-copper (AlCu) having copper by weight in the range of about 0.3% to 1.0%, for example, about 0.5%. The thickness of the reflective layer 121 can be any suitable thickness, such as a thickness in the range of about 200-500 Å, for example, about 300 Å.

FIG. 9J illustrates a supporting layer 122 formed over the reflective layer 121, the sacrificial layer 25, and the optical stack 16. The supporting layer 122 can be a dielectric layer of, for example, silicon oxynitride (SiON). As will be described in further detail below, characteristics (e.g., thickness) of the supporting layer 122 can be selected to provide at least partial support for the mechanical layer in the actuated and relaxed positions without the need for a post or rivet structure. Configuring the supporting layer 122 to provide at least partial support for the mechanical layer can increase the density of pixels as compared to a design in which the mechanical layer is supported by posts or rivets. In one implementation, the thickness of the supporting layer 122 can be in the range of about 500-8000 Å. The thickness of the supporting layer 122 can be determined based on a variety of factors, including, for example, the desired stiffness of the supporting layer 122, which can aid in achieving the same pixel actuation voltage for pixels having different sized air-gaps in color display applications.

FIG. 9K illustrates an implementation having a conductive or cap layer 123 formed (or provided) over the supporting layer 122. FIG. 9L illustrates an example of a patterned conductive layer 123 and patterning the conductive layer 123 to form a portion of a mechanical layer 14. The sacrificial layer 25 is still present so the mechanical layer 14 is typically not moveable at this stage. The conductive layer 123 can be provided conformally over the supporting layer 122 and patterned so as to substantially replicate the pattern of the reflective layer 121, thereby aiding in balancing stresses in the mechanical layer 14. The conductive layer 123 can include a metallic material, for example, the same aluminum alloy as the reflective layer 121. In one implementation, the conductive layer 123 includes aluminum-copper (AlCu) having copper by weight in the range of about 0.3% to 1.0%, for example, about 0.5%, and the thickness of the conductive layer 123 is selected to be in the range of about 200-500 Å, for example, about 300 Å.

The reflective layer 121 and the conductive layer 123 can be formed to have similar thickness and composition, thereby aiding in balancing stresses in the mechanical layer. Having balanced stresses in the mechanical layer can reduce the sensitivity of deformation of the mechanical layer, and correspondingly changes in the gap height due to temperature variation. Additionally, forming the reflective layer 121 and the conductive layer 123 from similar materials that have similar thermal coefficients of expansion can further reduce deformation of the mechanical layer, and variations in the gap height, caused by changes in temperature.

FIG. 9M illustrates the removal of the sacrificial layer 25 and the formation of a gap 19. The sacrificial layer 25 can be removed at this point to form the gap 19 using a variety of methods, as was described above. Before it is removed, the sacrificial layer 25 can provide a counterforce that can prevent the mechanical layer 14 from deflecting under the influence of residual stresses, such as residual stresses in one or more sub-layers of the mechanical layer 14. However, upon removal of the sacrificial layer 25, the stress-induced forces of the mechanical layer 14 can cause the mechanical layer 14 to change shape and/or curvature and to become displaced away from the pre-released position by a distance of a "launch height".

Having a particular distance or "launch height" of the mechanical layer 14 away from the pre-released position can be desirable to mitigate stiction. For example, forming a pixel in an interferometric modulator to have a selected pixel launch height to be in the range of about 500 Å to about 1000 Å away from the pre-released position can reduce pixel stiction between the mechanical layer 14 and the optical stack 16. However, a relatively large pixel launch height can decrease the sacrificial layer thickness needed for a particular gap size to a level which is not desirable from a fabrication standpoint.

Still referring to FIG. 9M, the mechanical layer 14 includes a bend, or a kink 104, that is formed by providing the mechanical layer 14 over the shaping structure 102, and particularly over the protrusion 103, with the intervening layers formed conformally. The kink 104 is aligned with the shaping structure, for example, the kink 104 is vertically aligned relative to the shaping structure 102 when the substrate 20 is oriented horizontally. In implementations having one or more layers that are formed over the shaping structure 102 and there are multiple layers formed over the protrusion 103 before the mechanical layer 14 is formed, the kink 104 in the mechanical layer is wider than the protrusion 103. The kink 104 can have certain geometric features. The geometric features can be controlled by varying the geometry of the shaping structure 102 and the protrusion 103 to form a mechanical layer having a desired shape that affects (or controls) the mechanical stresses in the mechanical layer 14. For example, the kink 104 can be shaped to control the launch height of the mechanical layer upon release. Control of the launch height can allow the selection of a sacrificial layer thickness needed for a particular gap size which is desirable from a fabrication and optical performance standpoint. Additionally, the kink 104 can be employed to control the curvature of the mechanical layer after release, and so that the mechanical layer is substantially flat when under bias. In some implementations, the height h of the kink 104 is selected to be about 100-6000 Å, or more particularly 400-5000 Å. The width w of the kink can be selected to be, for example, a width in the range of about 0.2 μm-5 μm, or more particularly, about 0.5 μm-2 μm. In some implementations, the kink 104 can be spaced from the anchoring region by, for example, a distance of less than about 5 μm.

FIG. 9M illustrates an example of an implementation having a supporting layer 122 configured to support the mechanical layer 14 without the need for a post or rivet structure. Such implementations can allow for arrangements of increased pixel density. This also can increases the fill factor of pixels for a certain area, as compared to implementations where the mechanical layer is supported by posts or rivets that use a larger anchor footprint.

FIGS. 9N-9O illustrates an example of another implementation of an interferometric device. Specifically, FIG. 9N illustrates a dielectric layer 124 that was provided (or formed) over the conductive layer 123 and the supporting layer 122, (shown in FIG. 9L) to form a mechanical layer 14. The dielectric layer 124 includes a dielectric material for example, silicon oxynitride (SiON). In implementation, The dielectric layer 124 can be configured to have a thickness in the range of about 500-4000 Å. FIG. 9O illustrates the device illustrated in FIG. 9N after forming a gap 19 (or cavity) between the optical stack 16 and the mechanical layer 14. The sacrificial layer can be removed in a manner similar to that described above with reference to FIG. 9M.

The dielectric layer 124 can aid in controlling the stresses in the mechanical layer 14. For example, the dielectric layer 124 can be formed to have a stress greater than or less than the stress of the supporting layer 122, which affects the launch height of the mechanical layer 14 when the sacrificial layer 25 is removed. Control of the launch height can determine the selection of a sacrificial layer thickness needed for a particular gap size which is desirable from a fabrication and optical performance standpoint. Additionally, the dielectric layer 124 can be configured (e.g., to have a certain thickness or stress) to control the curvature of the mechanical layer 14 after release, and so that the mechanical layer 14 is substantially flat when under bias. The dielectric layer 124 and the kink 104 each can be configured (e.g., with a certain height, width, and/or thickness dimension) to control the shaping and curvature of the mechanical layer 14 which can aid increasing design flexibility of the interferometric modulator.

In some implementations, one or more additional layers can be formed over the dielectric layer 124 of the electromechanical systems device shown in FIG. 9N before the mechanical layer is released. For example, an additional conductive layer can be provided over the dielectric layer 124 before release. The additional conductive layer can include a metallic material (for example an aluminum alloy), and can be patterned to have a similar shape as the reflective and cap layers 121, 123. In one implementation, the additional conductive layer includes aluminum-copper (AlCu) having copper by weight in the range of about 0.3% and 1.0%, for example, about 0.5%. The additional conductive layer can be configured to have a thickness of between about 200 and about 500 Å. In some particular implementations the additional conductive layer has a thickness of about 300 Å. The additional conductive layer can cause the mechanical layer to be substantially symmetric (e.g., the stress of the material forming the conductive layer, disposed on one side of the supporting layer, is the same or similar to the stress of the material forming the reflective layer) which aids in balancing stresses in the mechanical layer. Mechanical layers formed to have balanced stresses can reduce the amount of change in the gap height due to variations in temperature.

FIG. 9P illustrates an interferometric device according to another implementation. In contrast to the electromechanical systems device illustrated in FIG. 9M, the electromechanical systems device example illustrated in FIG. 9P does not include the shaping structure 102 and the kink 104. The supporting layer 122 can include a dielectric material, for example, silicon oxynitride (SiON). The thickness of the supporting layer 122 can be formed to have a thickness that is sufficient to provide support for the mechanical layer in the actuated and relaxed positions, without the need for a post or rivet supporting structure. Configuring the supporting layer 122 to provide support for the mechanical layer 14 can increase the density of pixels as compared to a design in which support is provided by posts or rivets. In one implementation, supporting layer 122 has a thickness of about 500-8000 Å.

Although not illustrated in the implementation shown in FIG. 9P, a dielectric layer can be included over the conductive layer 123 of the electromechanical systems device of FIG. 9P. The dielectric layer can be similar to the dielectric layer 124 of FIG. 9O, and can be configured to control the launch height and curvature of the mechanical layer 14 upon release. One or more additional layers, such as an additional conductive layer, can be provided over the dielectric layer to allow the mechanical layer to be substantially symmetric, thereby aiding in balancing stresses in the mechanical layer.

For clarity of illustration, the sequence and drawings have been simplified to omit some details. For example, as will be described with reference to FIGS. 12A-12F below, in a color interferometric display system, multiple different devices may have different gap sizes to interferometrically enhance, for example, red, green, and blue. Similarly, three different mechanical layer materials or thicknesses can be employed to allow use of the same actuation voltage for collapsing the mechanical layer in three different gap sizes.

Figure 10A:
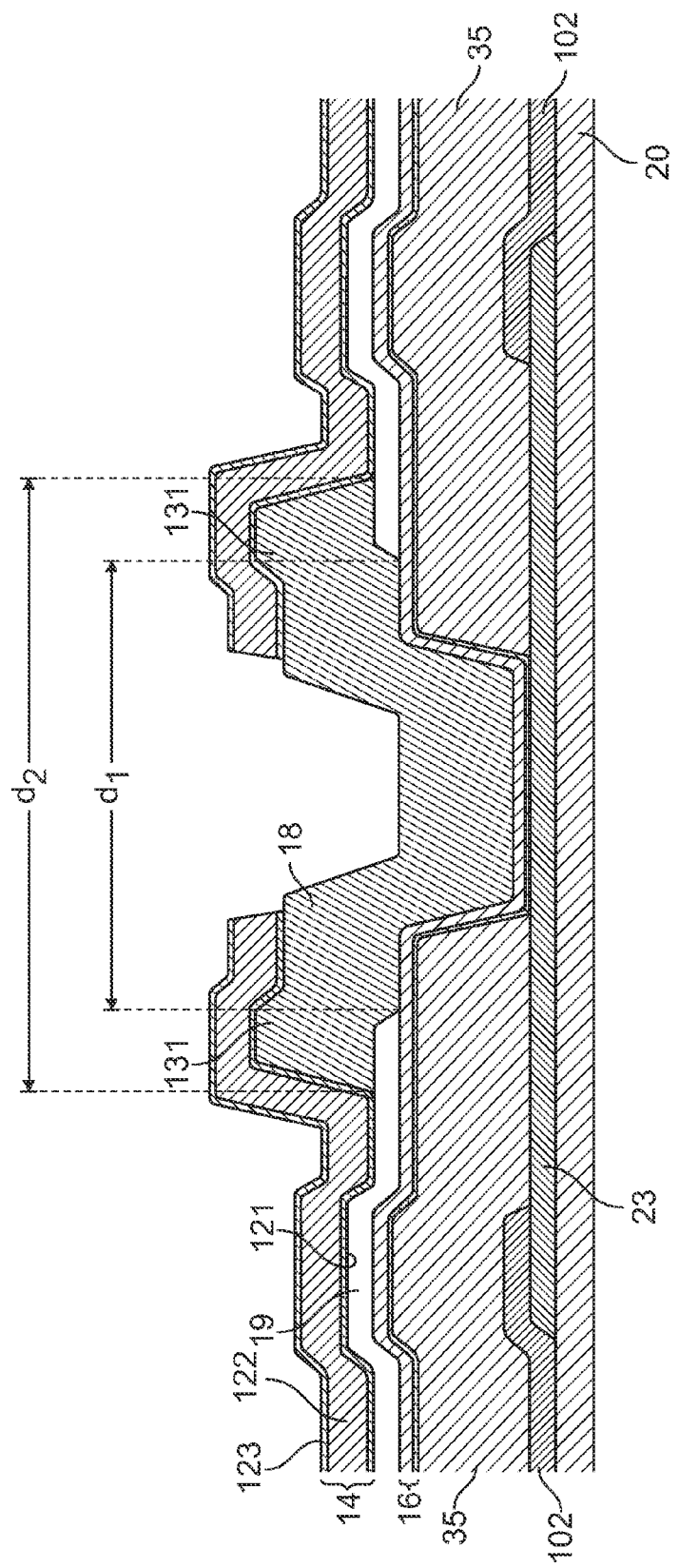
Figure 10B:
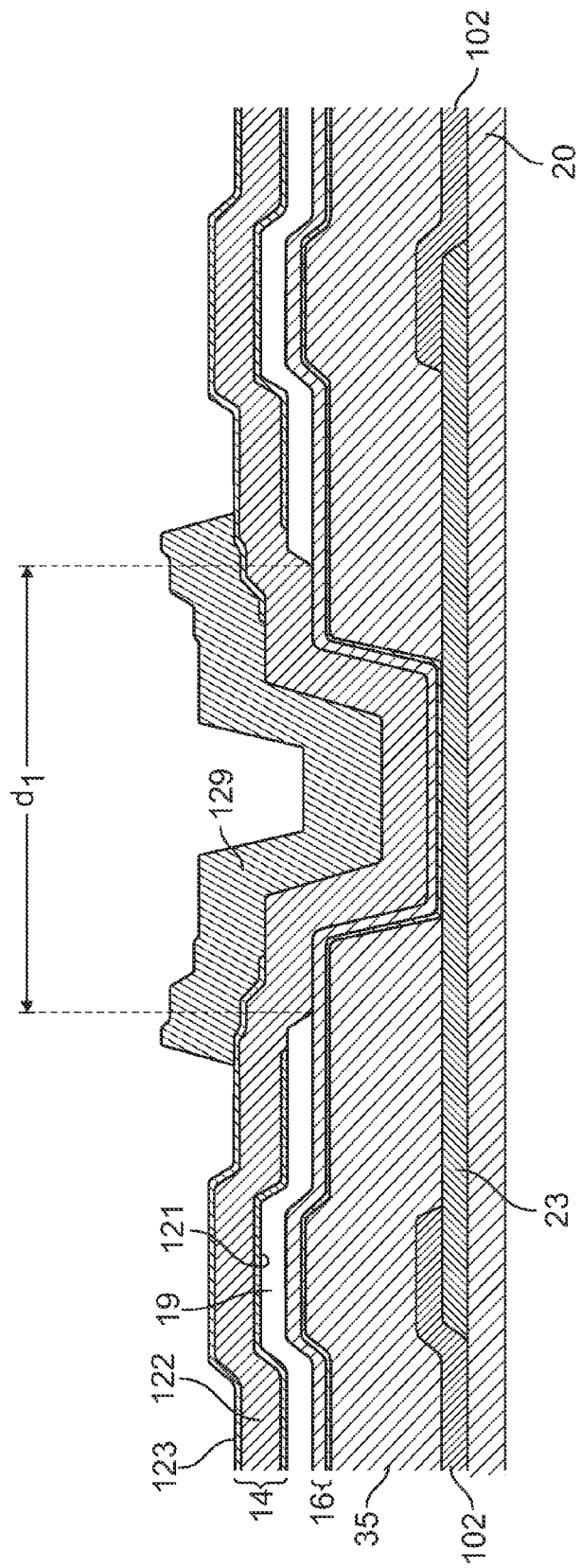

FIGS. 10A-10C show examples of cross-sectional schematic illustrations of various interferometric modulator devices.

FIG. 10A is a schematic cross-section illustration of one example of an interferometric modulator. As illustrated in FIG. 10, the interferometric modulator includes a substrate 20, a black mask structure 23, a shaping structure 102, a dielectric structure 35, an optical stack 16, a gap 19, a post structure 18, and a mechanical layer 14 that includes a reflective layer 121, a supporting layer 122, and a conductive layer 123. The post structure 18 can be positioned at each pixel corner to support the mechanical layer 14 over the substrate 20. The fill factor of the illustrated interferometric modulator can be constrained by the minimum size of the post structure 18, which can be determined by lithography resolution, layer to layer alignment accuracy and/or critical dimension bias. The post 18 can be formed by forming an anchor region or hole in a sacrificial layer, and includes wings 131 for supporting the mechanical layer 14. The minimum width $d_1$ of the anchor hole can be partially determined by the minimum resolvable lithography feature size of the fabrication tools, and the total width $d_2$ of the post 18 to the edges of the wings 131 can be partially determined by critical dimension bias of sacrificial and post etching, as well as the misalignment between the sacrificial layer 35 and the layer used to form the post 18. With reference to FIG. 10A, the total post width $d_2$ can be the critical dimension, since total post width $d_2$ should be larger than the anchor hole width $d_1$.

FIG. 10B is a schematic cross-section of another example of an interferometric modulator. The illustrated interferometric modulator includes a substrate 20, a black mask structure 23, a shaping structure 102, a dielectric structure 35, an optical stack 16, a gap 19, a rivet structure 129, and a mechanical layer 14 that includes a reflective layer 121, a supporting layer 122, and a conductive layer 123. In contrast to the interferometric modulator of FIG. 10A, the illustrated interferometric modulator includes the rivet structure 129 and does not include the post 18. The width $d_1$ of the anchor hole can be the critical dimension of the device, and thus, the illustrated interferometric modulator can have an improved fill factor relative to the interferometric modulator shown in FIG. 10A.

FIG. 10C is a schematic cross-section of yet another example of an interferometric modulator. The illustrated interferometric modulator includes a substrate 20, a black mask structure 23, a shaping structure 102, a dielectric structure 35, an optical stack 16, a gap 19, and a mechanical layer 14 that includes a reflective layer 121, a supporting layer 122, a conductive layer 123, and a dielectric layer 124. In contrast to the interferometric modulator devices of FIGS. 10A-10B, the interferometric modulator device of FIG. 10C does not include the post 18 or the rivet structure 129. Since the interferometric modulator device of FIG. 10C does not include the post structure 18, the interferometric modulator shown in FIG. 10C is not constrained by the total post width $d_2$ of FIG. 10A. Thus, a pixel array using the interferometric modulator of FIG. 10C can have a greater fill factor relative to a pixel array employing the device shown in FIG. 10A.

Additionally, the interferometric modulator in FIG. 10C can have a flexible anchoring structure, which can result in an improved dark state relative to the interferometric modulators of FIGS. 10A-10B. In particular, the dark state can be influenced by the bending height of the mechanical layer 14 between the relaxed and actuated positions near the anchoring hole. The flexible anchoring structure can reduce the bending height of the mechanical layer 14, thereby decreasing the brightness of the portion of the mechanical layer 14 out of contact with the optical stack during actuation and improving the color gamut and/or dark state of a display using the device. Brightness, color gamut, and dark state can be the three most critical performance parameters of a display, and in some implementations can only be improved by increasing fill factor, flattening mirror curvature, and/or decreasing the mechanical layer bending height. The lack of the rivet structure 129 in the interferometric modulator of FIG. 10C can reduce the bending height of the device relative to the interferometric modulator shown in FIG. 10B.

Furthermore, the interferometric modulator of FIG. 10C can have a continuous supporting layer 122 relative to the supporting posts 18 of the interferometric modulator of FIG. 10A. A continuous supporting layer 122 can reduce manufacturing defects, thereby increasing yield and reducing manufacturing cost.

Moreover, the interferometric modulator of FIG. 10C can, but need not, include both the supporting layer 122 and the dielectric layer 124. The supporting layer 122 and the dielectric layer 124 can be tuned to control the mechanical stresses of the interferometric modulator. Residual stresses among different layers in an unreleased interferometric modulator can affect mirror curvature, and can reduce display color gamut if not controlled. The dielectric layer 124 can have a stress selected to be greater than or less than the stress of the supporting layer 122, thereby permitting control of the curvature and launch height of the mechanical layer upon release. Control of the curvature of the interferometric modulator permits selection of a sacrificial layer thickness which can easily be deposited and which does not produce a large bending height of the mechanical layer 14. Reducing bending height of the mechanical layer 14 can decrease the brightness of the portion of the mechanical layer 14 out of contact with the optical stack 16 during actuation, thereby improving the device's black state and the display's contrast ratio, gamut, and color saturation.

Figure 11:
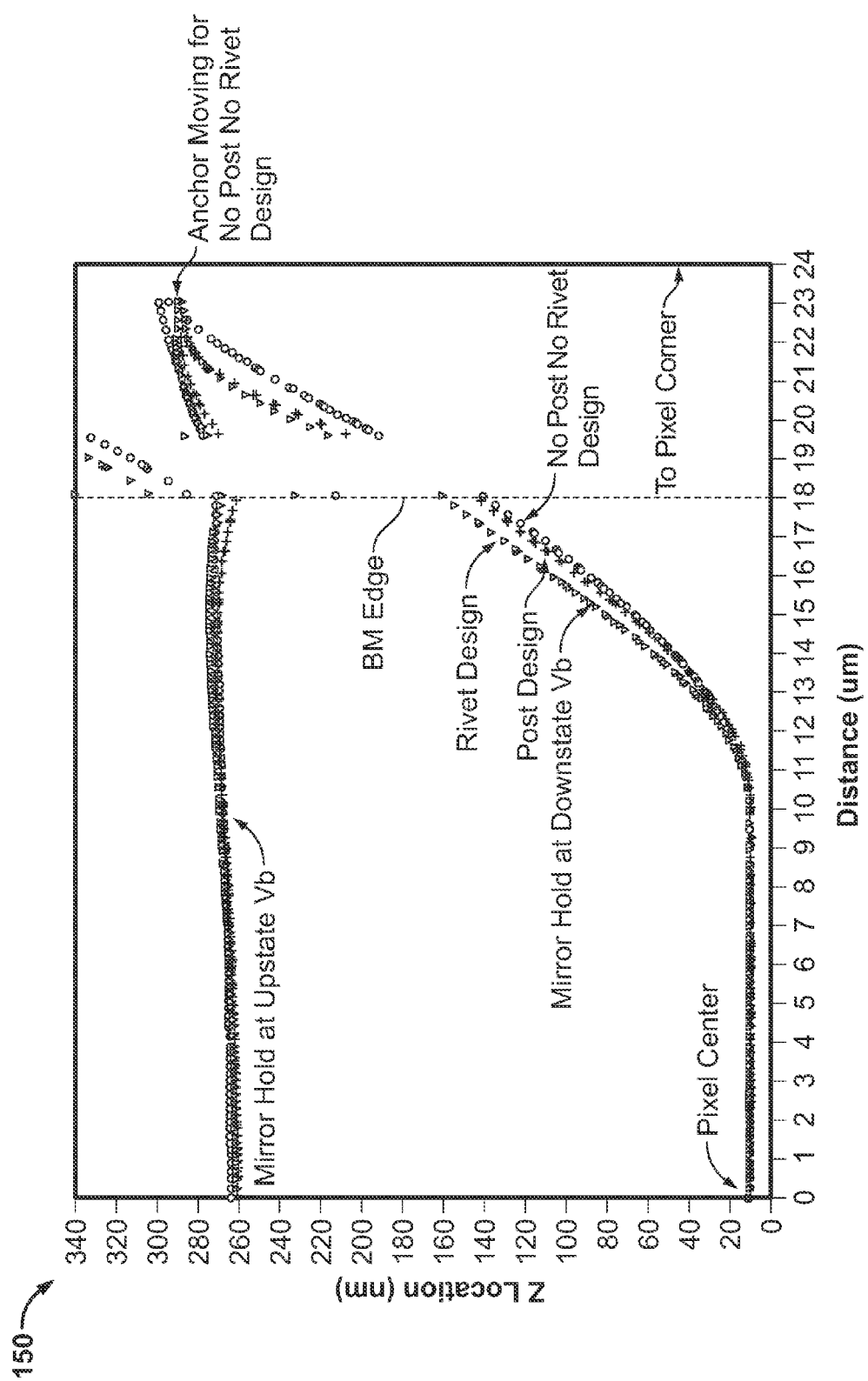
FIG. 11 is a graph of simulated mechanical layer position in the actuated and relaxed states for three examples of interferometric modulator devices.

FIG. 11 is a graph 150 of simulated mechanical layer position in the actuated and relaxed states for three examples of interferometric modulator devices. The three examples of interferometric modulator devices represent a device having a post structure (for example, FIG. 10A), a rivet structure (for example, FIG. 10B), and no post or rivet structure (for example, FIG. 10C). The graph 150 shows simulated mirror shape along a cross-section of the mechanical layer taken along a diagonal of a pixel, for both actuated and relaxed conditions when biased at the center of the stability window. The vertical line at a distance of about 18 μm represents the edge of the black mask 23. Thus, the region of the graph 150 to the left of the black mask edge can be the optically active area of the pixel, and the region to the right of the black mask edge can be the mechanical layer anchoring region. The upper three lines of the graph 150 are mechanical layer shapes of the interferometric modulator devices in the relaxed position, while the bottom three lines of the graph 150 are mechanical layer shapes of the devices in the actuated position. As shown in FIG. 11, an interferometric modulator device having no post or rivet structure can have a smaller bending height when in the actuated position relative to devices having post or rivet structures. The reduced bending height of the mechanical layer can decrease the brightness of the portion of the mechanical layer out of contact with the optical stack during actuation, thereby improving the black state of the device.

FIGS. 12A-12F show examples of cross-sectional schematic illustrations of various stages in a method of making an interferometric modulator. Not all of the illustrated steps are required, and this process can be modified without departing from the spirit and scope of the invention. Certain details of the process can be similar to those described earlier with reference to FIGS. 9A-9P.

Figure 12A:
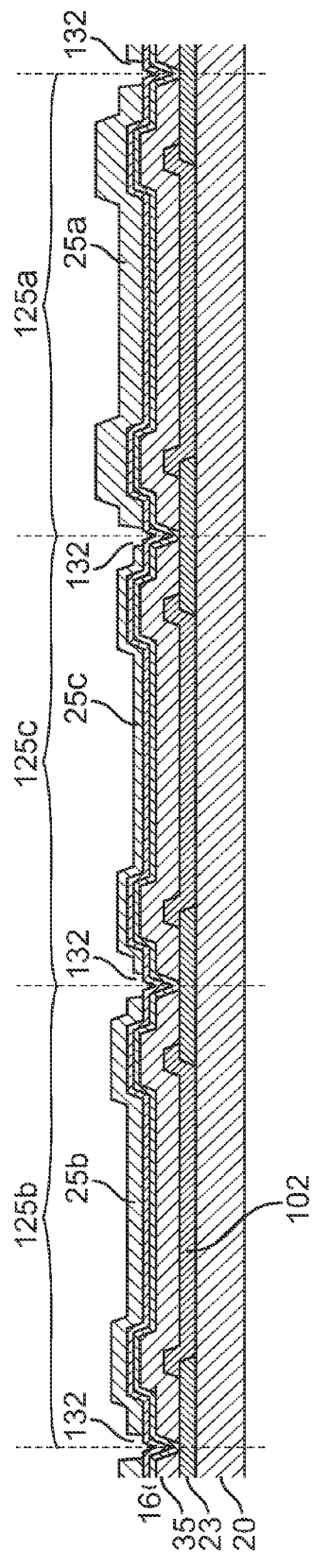

With reference to FIG. 12A, the cross-section illustrates the processing of sacrificial structure with deposition, lithography and etch to form a first sacrificial structure 25a, a second sacrificial structure 25b, and a third sacrificial structure 25c, each of which have a different thickness. The formation of the first, second and third sacrificial structures 25a-25c over the optical stack 16 can include deposition of molybdenum (Mo) or amorphous silicon (a-Si), and a plurality of layers can be used to form each structure.

In a color interferometric display system, the thickness of the sacrificial structures 25a-25c can correspond to a gap size configured to interferometrically enhance different colors. For example, the first sacrificial structure 25a can define the height a high gap sub-pixel 125a, the second sacrificial structure 25b can define the height of a mid gap sub-pixel 125b, and the third sacrificial structure 25c can define the height of a low gap sub-pixel 125c, and the first, second and third sacrificial structures 25a-25c can have heights selected to interferometrically enhance, for instance, blue, red, and green, respectively. In one implementation, the first sacrificial structure 25a includes Molybdenum (Mo) and has a thickness ranging between about 1000 Å to about 4,000 Å, for example, about 2,400 Å, the second sacrificial structure 25b includes Mo and has a thickness ranging between about 800 Å to about 3,000 Å, for example, about 2000 Å, and the third sacrificial structure 25c includes Mo and has a thickness ranging between about 600 Å to about 2,000 Å, for example, about 1,600 Å.

As illustrated in FIG. 12A, the sacrificial structures 25a-25c can be removed in regions between pixels to define anchor holes 132. The anchor holes 132 permit a subsequently deposited layer, such as a supporting layer of a mechanical layer, to reach the optical stack 16 and/or any other layer disposed beneath the sacrificial structures 25a-25c. Forming the anchor holes 132 in this manner can aid in forming a mechanical layer that can be supported without the use of post or rivet structures.

Figure 12B:
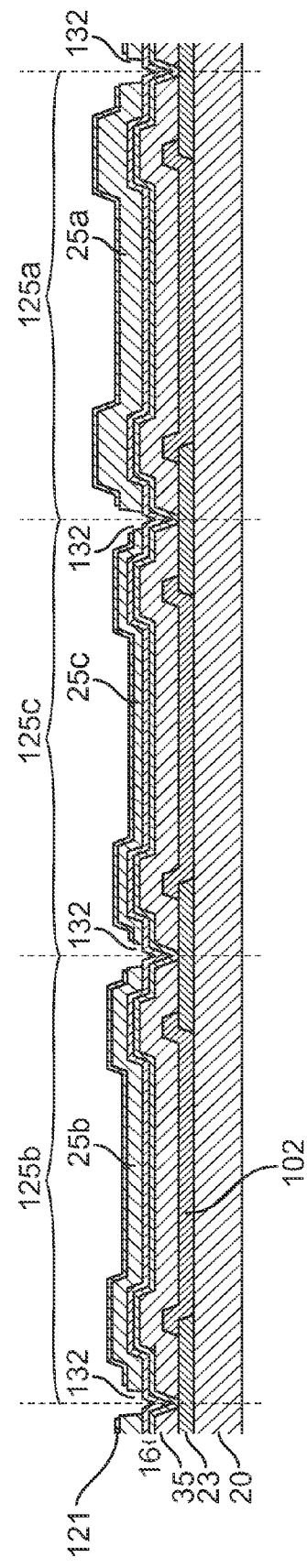

FIG. 12B illustrates providing and patterning a reflective layer 121 over the sacrificial structures 25a-25c. The reflective layer 121 can be, for example, an aluminum alloy (AlCu) mirror layer. Additional details of the reflective layer 121 can be as described above with reference to FIGS. 9H-9I.

FIG. 12C illustrates depositing a supporting layer 122 over the reflective layer 121 and the first, second and third sacrificial structures 25a-25c. Additional details of the supporting layer 122 can be as described above with reference to FIG. 9J.

With reference to FIG. 12D, the cross-section illustrates depositing and etching a conductive or cap layer 123 over the supporting layer 122. The conductive layer 123 can be, for example, an aluminum alloy layer, and can be as described above with reference to FIGS. 9K-9L.

FIG. 12E illustrates providing and patterning a dielectric layer 124 over the conductive layer 123. The dielectric layer 124 can have a stress different than that of the supporting layer 122, and, thus, can be employed to tune the launch height and curvature of the mechanical layer 14 upon release, as described above. The stress of the dielectric layer 124 can be controlled relative to the stress of the supporting layer 122 by selecting a different material and/or thickness for the dielectric layer 124 and the supporting layer 122. Additionally, by controlling certain processing parameters, including, for example, plasma power, pressure, process gas composition, plasma gas ratio, and/or temperature, the stress of the dielectric layer 124 and/or the supporting layer 122 can be controlled.

As shown in FIG. 12E, the dielectric layer 124 can selectively etched to form different patterns across the high gap, mid gap and low gap sub-pixels 125a-125c. In one implementation, the dielectric layer 124 over the high gap sub-pixel 125a is substantially etched away, while the dielectric layer 124 over the low gap sub-pixel 125c is kept substantially intact. Additionally, for the mid gap sub-pixel 125b, the dielectric layer 124 can be patterned with patterns 39 to meet a desired stiffness requirement, such as a stiffness that permits the same actuation voltage to collapse the mechanical layer 14 for high-gap and/or low-gap sub-pixels. When viewed from above the sub-pixel, the patterns 39 can include a variety of shapes, such as, for example, holes or slots.

FIG. 12F illustrates the release of the high gap, mid gap, and low gap sub-pixels 125a-125c to form gaps 19a-19c, respectively. The release of the sub-pixel devices can be similar to that described earlier with reference to FIG. 9M, and can include removal of the sacrificial structures 25a-25c. As shown in FIG. 12F, the sub-pixels 125a-125c have no post or rivet structures.

Although FIGS. 12A-12F is illustrated for the case of a supporting layer 122 and a dielectric layer 124, more or fewer dielectric layers can be employed. In one implementation, a supporting layer and first and second dielectric layers are used for high gap, mid gap, and low gap sub-pixels. For example, low gap sub-pixels can have the supporting layer and the first and second dielectric layers, mid gap sub-pixels can have the supporting layer and the first dielectric layer, and high gap sub-pixels can have the supporting layer. The supporting layer can be separated from the first dielectric layer by a conductive layer, such as a metallic layer including aluminum. Likewise, the first and second dielectric layers can be separated by another conductive layer. The tuning of each sub-pixel gap size for stiffness and mirror curvature can be facilitated by the use of first and second dielectric layers, rather than the use of a dielectric layer which is selectively patterned. However, in some implementations, use of a supporting layer and a patterned dielectric layer can be desired to reduce the number of photomasks.

Figure 13:
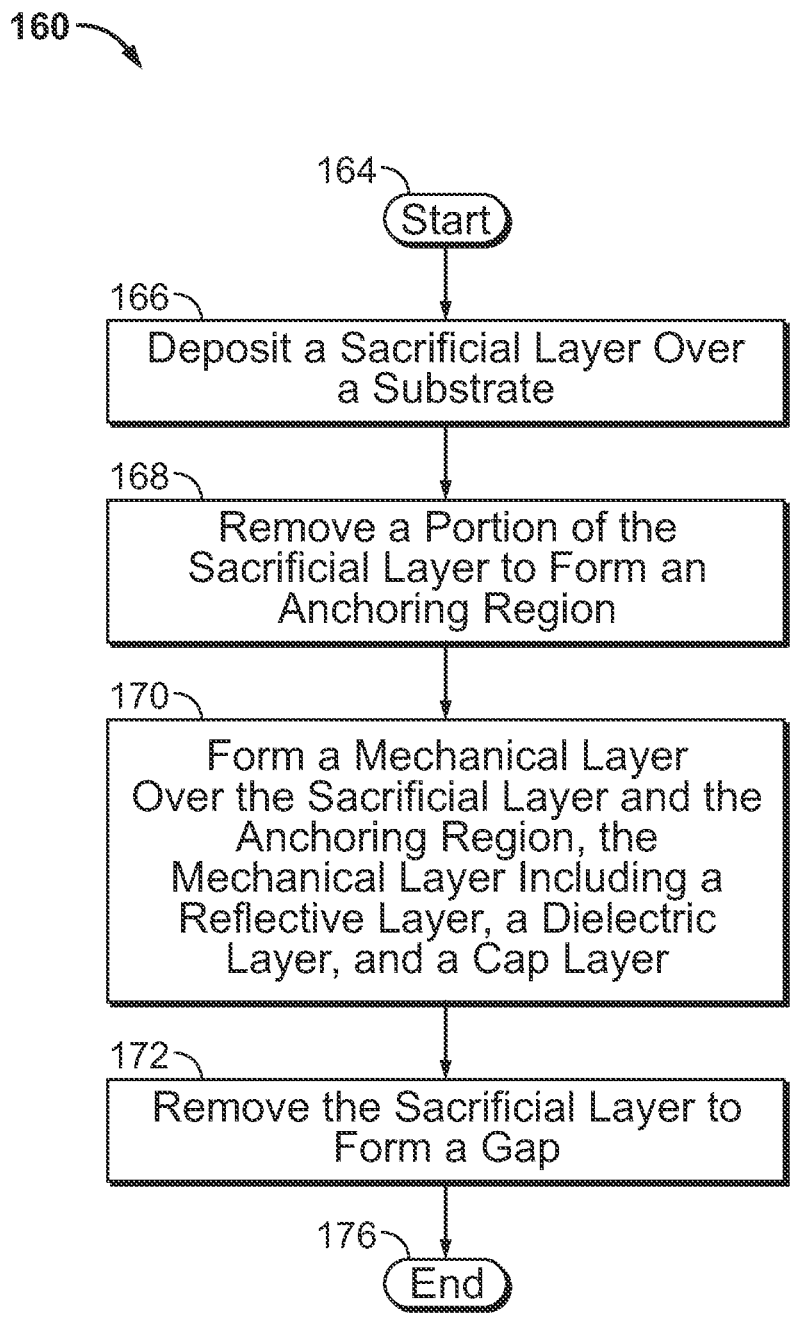
FIG. 13 shows an example of a flow diagram illustrating a manufacturing process for an interferometric modulator.

FIG. 13 shows an example of a flow diagram illustrating a manufacturing process 160 for an interferometric modulator. The process 160 starts at block 164.

The process 160 continues at a block 166, in which a sacrificial layer is deposited over a substrate. The sacrificial layer can include, for example, molybdenum (Mo) and/or amorphous silicon (a-Si), and can be used to define a height of an interferometric cavity.

In some implementations, a shaping layer is deposited over the substrate to form a protrusion. The shaping layer or structure can include, for example, an oxide, and can be used to maintain a relatively planar profile across the substrate, such as in implementations in which the substrate includes a black mask structure. The protrusion can be formed by an overlap of the shaping layer with another layer, such as a black mask layer, and can be used to produce an upwardly extending wave or kink in a subsequently deposited conformal layer, such as a subsequently deposited mechanical layer.

In block 168, a portion of the sacrificial layer is removed to form one or more anchoring regions. For example, the sacrificial layer can be etched at pixel corners to define an anchoring hole at each pixel corner.

In block 170, a multi-layer mechanical layer is formed over the sacrificial layer and the anchoring region. The mechanical layer includes a reflective layer, a dielectric layer, and a cap layer, and the dielectric layer can be disposed between the reflective layer and the cap layer. The reflective layer can be selectively etched over the anchor regions, thereby permitting the dielectric layer to contact one or more layers underlying the sacrificial layer, which can aid in forming a self-supporting mechanical layer.

The dielectric layer of the mechanical layer can be configured to support the mechanical layer. For example, the dielectric layer can be used to anchor the mechanical layer at the anchoring region of the pixel formed in block 168, and can have a thickness and composition selected to be sufficient to provide support for the mechanical layer after the sacrificial layer is removed. Thus, the dielectric layer can support the mechanical layer in the actuated and relaxed positions without the need for a post or rivet structure. Configuring the dielectric layer to provide support for the mechanical layer can increase the density of pixels as compared to a design in which support is provided by posts or rivets.

In implementations including a shaping layer deposited to form a protrusion, the mechanical layer can be conformally deposited over the shaping layer and can include a kink over the protrusion. The kink can be adjacent the anchoring region formed in block 168.

In a block 172, the sacrificial layer is removed to form a gap. Upon release of the mechanical layer, the mechanical layer can launch away from the pre-released location due to residual mechanical stresses, as was described above. The stresses in one or more sub-layers of the mechanical layer, such as the stress of the dielectric layer, can be used to tune the launch of the dielectric layer. Additionally, in implementations including a kink in the mechanical layer, the geometry of the kink can be used to fine-tune launch of the mechanical layer, as was described above. The process 160 ends at 176.

Figure 14A:
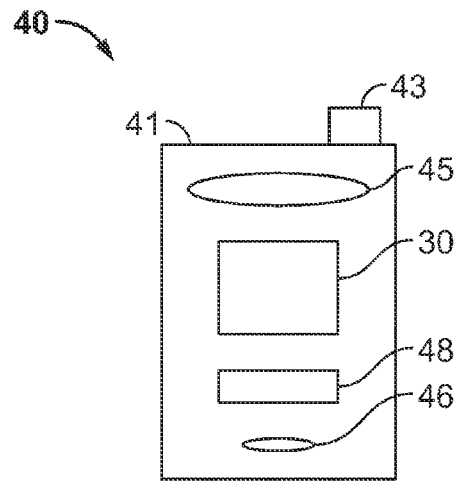
FIGS. 14A and 14B show examples of system block diagrams illustrating a display device that includes a plurality of interferometric modulators.
Figure 14B:
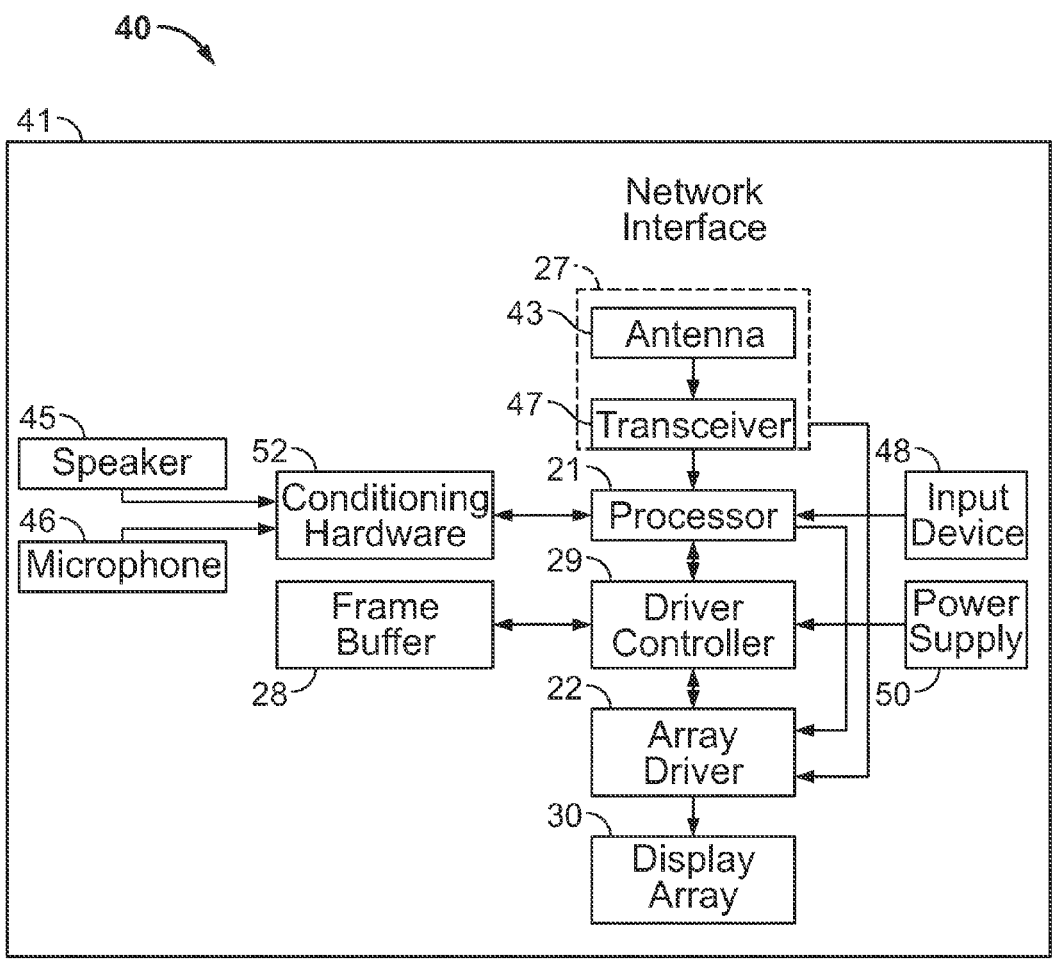

FIGS. 14A and 14B show examples of system block diagrams illustrating a display device 40 that includes a plurality of interferometric modulators. The display device 40 can be, for example, a cellular or mobile telephone. However, the same components of the display device 40 or slight variations thereof are also illustrative of various types of display devices such as televisions, e-readers and portable media players.

The display device 40 includes a housing 41, a display 30, an antenna 43, a speaker 45, an input device 48, and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber, and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an interferometric modulator display, as described herein.

The components of the display device 40 are schematically illustrated in FIG. 14B. The display device 40 includes a housing 41 and can include additional components at least partially enclosed therein. For example, the display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 can provide power to all components based on the particular display device 40 design.

The network interface 27 includes the antenna 43 and the transceiver 47 so that the display device 40 can communicate with one or more devices over a network. The network interface 27 also may have some processing capabilities to relieve, e.g., data processing requirements of the processor 21. The antenna 43 can transmit and receive signals. In some implementations, the antenna 43 transmits and receives RF signals according to the IEEE 16.11 standard, including IEEE 16.11(a), (b), or (g), or the IEEE 802.11 standard, including IEEE 802.11a, b, g or n. In some other implementations, the antenna 43 transmits and receives RF signals according to the BLUETOOTH standard. In the case of a cellular telephone, the antenna 43 is designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), NEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G or 4G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that is readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation, and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of pixels.

In some implementations, the driver controller 29, the array driver 22, and the display array 30 are appropriate for any of the types of displays described herein. For example, the driver controller 29 can be a conventional display controller or a bi-stable display controller (e.g., an IMOD controller). Additionally, the array driver 22 can be a conventional driver or a bi-stable display driver (e.g., an IMOD display driver). Moreover, the display array 30 can be a conventional display array or a bi-stable display array (e.g., a display including an array of IMODs). In some implementations, the driver controller 29 can be integrated with the array driver 22. Such an implementation is common in highly integrated systems such as cellular phones, watches and other small-area displays.

In some implementations, the input device 48 can be configured to allow, e.g., a user to control the operation of the display device 40. The input device 48 can include a keypad, such as a QWERTY keyboard or a telephone keypad, a button, a switch, a rocker, a touch-sensitive screen, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices as are well known in the art. For example, the power supply 50 can be a rechargeable battery, such as a nickel-cadmium battery or a lithium-ion battery. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" or provided as examples is not necessarily to be construed as preferred or advantageous over other implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An electromechanical device, comprising:
 a substrate;
 a partially reflective optical stack disposed on the substrate;
 a movable mechanical layer positioned so that the partially reflective optical stack is between the mechanical layer and the substrate, the mechanical layer including a reflective layer, a conductive layer, and a supporting layer that is disposed between the reflective layer and the conductive layer, wherein the supporting layer is anchored on the optical stack in an optically non-active anchor region and extends from the anchor region away from the optical stack spacing the mechanical layer from the optical stack to define a collapsible gap between the mechanical layer and the optical stack; and a dielectric layer disposed on the mechanical layer such that the mechanical layer is between the dielectric layer and the collapsible gap, wherein the mechanical layer is movable to an actuated position and a relaxed position by applying a voltage across the mechanical layer and a stationary electrode disposed between the substrate and the collapsible gap, and wherein the collapsible gap is in a collapsed state when the mechanical layer is in the actuated position and the gap is in a non-collapsed state when the mechanical layer is in the relaxed position, and wherein the mechanical layer further includes a kink disposed adjacent to the anchor region and in at least a portion of an optically non-active region, wherein the kink includes an upwardly extending portion of the mechanical layer configured to control at least one of a height of the collapsible gap and a curvature of the mechanical layer.

2. The device of claim 1, wherein the kink in the mechanical layer includes a rising portion extending away from the gap and a falling portion extending towards the gap.

3. The device of claim 1, wherein the reflective layer and the conductive layer include aluminum alloys.

4. The device of claim 1, wherein the supporting layer includes a dielectric material.

5. The device of claim 4, wherein the supporting layer includes silicon oxynitride (SiON).

6. The device of claim 4, wherein a portion of the supporting layer extends past the reflective layer and towards the optical stack, and wherein the supporting layer contacts the optical stack in the anchor region.

7. The device of claim 1, wherein the supporting layer is between about 500 Å and about 8000 Å thick.

8. The device of claim 1, wherein the dielectric layer is between about 500 Å and about 4000 Å thick.

9. The device of claim 1, wherein the reflective layer includes an aluminum-copper (AlCu) layer having a thickness of between about 200 Å and about 500 Å.

10. The device of claim 9, wherein the conductive layer includes an AlCu layer having a thickness of between about 200 Å and about 500 Å.

11. The device of claim 1, wherein a height dimension of the kink is between about 400 Å and about 5000 Å.

12. The device of claim 11, where a width dimension of the kink is between about 0.2 μm and about 5 μm.

13. The device of claim 1, wherein the optical stack includes the stationary electrode.

14. The device of claim 1, wherein the optical stack, the reflective layer of the mechanical layer, and the collapsible gap form an interferometric modulator.

15. The device of claim 1, further comprising:
a display including the substrate, the optical stack, and the mechanical layer;
a processor that is configured to communicate with the display, the processor being configured to process image data; and
a memory device that is configured to communicate with the processor.

16. The device of claim 15, further comprising a driver circuit configured to send at least one signal to the display.

17. The device of claim 16, further comprising a controller configured to send at least a portion of the image data to the driver circuit.

18. The device of claim 15, further comprising an image source module configured to send the image data to the processor.

19. The device of claim 18, wherein the image source module includes at least one of a receiver, transceiver, and transmitter.

20. The device of claim 15, further comprising an input device configured to receive input data and to communicate the input data to the processor.

21. A device, comprising:
a substrate;
means for partially reflecting light, the partially reflecting means disposed on the substrate;
movable means for reflecting light, the movable reflecting means positioned so that the partially reflecting means is between the movable reflecting means and the substrate, the movable reflecting means including a means for supporting the movable reflecting means, the supporting means anchored on the partially reflecting means in an optically non-active anchor region, wherein the supporting means extends from the anchor region away from the partially reflecting means spacing the movable reflecting means from the partially reflecting means to define a collapsible gap between the movable reflecting means and the partially reflecting means; and
a dielectric layer disposed on the movable reflecting means such that the supporting means is between the dielectric layer and the collapsible gap,
wherein the movable reflecting means is movable to an actuated position and a relaxed position by applying a voltage across the movable reflecting means and a stationary electrode disposed between the substrate and the collapsible gap, and wherein the collapsible gap is in a collapsed state when the movable reflecting means is in the actuated position and the gap is in a non-collapsed state when the movable reflecting means is in the relaxed position, wherein the movable reflecting means further includes a kink disposed adjacent to the anchor region and in at least a portion of an optically non-active region, wherein the kink includes an upwardly extending portion of the movable reflecting means configured to control at least one of a height of the collapsible gap and a curvature of the movable reflecting means.

22. The device of claim 21, wherein the partially reflecting means includes an optical stack, and the optical stack includes the stationary electrode.

23. The device of claim 22, wherein the movable reflecting means includes a reflective layer and a conductive layer, wherein the supporting means includes a support layer comprising a dielectric material, and wherein the support layer is disposed between the reflective layer and the conductive layer.

24. The device of claim 23, wherein a portion of the support layer in the anchor region extends past the reflective layer and towards the optical stack, and the optical layer contacts the optical stack in the anchor region.

25. A method of forming a mechanical layer in an electromechanical device, the method comprising:
providing a substrate;
forming an optical stack over the substrate;
providing a sacrificial layer over the optical stack;
removing a portion of the sacrificial layer that is disposed over an anchoring region;
forming a mechanical layer over the sacrificial layer and the anchoring region, wherein forming the mechanical layer includes providing a reflective layer over the sacrificial layer, removing a portion of the reflective layer that is disposed over the anchoring region, providing a supporting layer over the reflective layer such that a portion of the supporting layer contacts the anchoring region, and providing a conductive layer over the supporting layer;

depositing a dielectric layer over the conductive layer;

removing the sacrificial layer to form a collapsible gap between the mechanical layer and the substrate; and depositing a shaping layer over at least a portion of the substrate adjacent to the anchoring region, the shaping layer including at least one protrusion that extends away from the substrate, wherein the optical stack is formed over the shaping layer, and wherein forming the mechanical layer includes forming the mechanical layer over the at least one protrusion such that a kink is formed in a portion of the mechanical layer over the at least one protrusion, wherein the kink includes an upwardly extending portion of the mechanical layer configured to control at least one of a height of the collapsible gap after removing the sacrificial layer and a curvature of the mechanical layer after removing the sacrificial layer.

26. The method of claim 25, wherein providing the sacrificial layer includes forming the sacrificial layer as a conformal layer over the shaping layer including over the at least one protrusion, and wherein forming the mechanical layer further includes forming the mechanical layer over the sacrificial layer and the shaping layer, including the at least one protrusion, as a conformal layer such that the kink is formed in the portion of the mechanical layer over the at least one protrusion.

27. The method of claim 26, further comprising depositing a black mask over at least a portion of the substrate, wherein a portion of the shaping layer and a portion of the black mask overlap so as to define a height dimension of the protrusion.

28. The method of claim 25, wherein the supporting layer includes a dielectric material.

29. The method of claim 25, wherein the supporting layer directly contacts the optical stack over the anchoring region.

30. The method of claim 25, wherein the supporting layer has a thickness of between about 500 Å and about 8000 Å.

31. The method of claim 25, wherein the conductive layer includes an AlCu layer having a thickness of between about 200 Å and about 500 Å.

32. The method of claim 25, wherein the dielectric layer has a thickness of between about 500 Å to about 4000 Å.

33. The method of claim 25, wherein the shaping layer includes a buffer oxide layer having a thickness of about 500 Å to about 6000 Å.

34. The method of claim 27, further comprising depositing an aluminum oxide layer on the substrate before depositing the black mask.

35. The method of claim 34, wherein the aluminum oxide layer has a thickness of between about 50 Å and about 250 Å.

* * * * *